United States Patent
Nguyen et al.

(10) Patent No.: US 10,235,841 B2
(45) Date of Patent: Mar. 19, 2019

(54) TOURNAMENT GAME SYSTEM AND TOURNAMENT METHOD

(71) Applicant: IGT, Las Vegas, NV (US)

(72) Inventors: Binh T. Nguyen, Reno, NV (US); Craig A. Paulsen, Reno, NV (US)

(73) Assignee: IGT, Las Vegas, NV (US)

( * ) Notice: Subject to any disclaimer, the term of this patent is extended or adjusted under 35 U.S.C. 154(b) by 219 days.

(21) Appl. No.: 15/197,238

(22) Filed: Jun. 29, 2016

(65) Prior Publication Data

US 2016/0314660 A1 Oct. 27, 2016

Related U.S. Application Data

(63) Continuation of application No. 13/938,907, filed on Jul. 10, 2013, now Pat. No. 9,384,635, which is a (Continued)

(51) Int. Cl.
G07F 17/32 (2006.01)
A63F 13/30 (2014.01)
A63F 13/35 (2014.01)

(52) U.S. Cl.
CPC .......... G07F 17/3276 (2013.01); A63F 13/12 (2013.01); A63F 13/35 (2014.09);
(Continued)

(58) Field of Classification Search
CPC .. G07F 17/3276; G07F 17/3251; A63F 13/12; A63F 2300/409; A63F 2300/50;
(Continued)

(56) References Cited

U.S. PATENT DOCUMENTS 4,339,798 A 7/1982 Hedges et al.
4,467,424 A 8/1984 Hedges et al.
(Continued)

FOREIGN PATENT DOCUMENTS

DE 195 16 681 8/1996
EP 0 291 705 4/1988
(Continued)

OTHER PUBLICATIONS

Office Action dated Jul. 21, 2009 from Australian Patent Application No. 2004267734.
(Continued)

*Primary Examiner* — Jasson Yoo
(74) *Attorney, Agent, or Firm* — Neal, Gerber & Eisenberg LLP

(57) ABSTRACT

In an embodiment of a gaming method, an identifier may be received from a first gaming unit, wherein the identifier is associated with a tournament game card, wherein the tournament game card is provided to a player in response to paying a fee. Whether the identifier received from the first gaming unit is authentic may be determined. A duration the player may play in a tournament may be determined based on the identifier, and the first gaming unit may be enabled for play in the tournament for the duration if the identifier is authentic. A tournament score of the player may be received, and a winning player of the tournament, if any, may be determined. Data indicative of a value payout to be awarded to the winning player may be generated if the winning player of the tournament is determined.

20 Claims, 35 Drawing Sheets

Related U.S. Application Data continuation of application No. 13/167,951, filed on Jun. 24, 2011, now Pat. No. 8,485,892, which is a continuation of application No. 10/642,937, filed on Aug. 18, 2003, now Pat. No. 8,002,630.

(52) U.S. Cl.
CPC .......... *G07F 17/32* (2013.01); *G07F 17/3225* (2013.01); *G07F 17/3251* (2013.01); *A63F 2300/409* (2013.01); *A63F 2300/50* (2013.01); *A63F 2300/516* (2013.01); *A63F 2300/532* (2013.01); *A63F 2300/556* (2013.01); *A63F 2300/5513* (2013.01); *A63F 2300/5593* (2013.01); *A63F 2300/61* (2013.01); *A63F 2300/636* (2013.01)

(58) Field of Classification Search
CPC .......... A63F 2300/516; A63F 2300/532; A63F 2300/5513; A63F 2300/556; A63F 2300/5593; A63F 2300/61; A63F 2300/636
See application file for complete search history.

(56) References Cited

U.S. PATENT DOCUMENTS

| | | | |
|---|---|---|---|
| 4,760,527 A | 7/1988 | Sidley | |
| 4,926,327 A | 5/1990 | Sidley | |
| 4,958,835 A | 9/1990 | Tashiro | |
| 5,083,271 A | 1/1992 | Thacher et al. | |
| 5,231,568 A | 7/1993 | Cohen et al. | |
| 5,259,613 A | 11/1993 | Marnell, II | |
| 5,489,103 A | 2/1996 | Okamoto | |
| 5,544,892 A | 8/1996 | Breeding | |
| 5,655,961 A | 8/1997 | Acres et al. | |
| 5,711,715 A | 1/1998 | Ringo et al. | |
| 5,755,621 A | 5/1998 | Marks et al. | |
| 5,762,552 A | 6/1998 | Vuong et al. | |
| 5,768,382 A | 6/1998 | Schneier et al. | |
| 5,779,549 A | 7/1998 | Walker et al. | |
| 5,830,067 A | 11/1998 | Graves et al. | |
| 5,956,485 A | 9/1999 | Perlman | |
| 5,964,660 A | 10/1999 | James et al. | |
| 6,024,643 A | 2/2000 | Begis | |
| 6,039,648 A | 3/2000 | Guinn et al. | |
| 6,077,163 A * | 6/2000 | Walker .................. | G07F 17/32 463/25 |
| 6,106,395 A | 8/2000 | Begis | |
| 6,152,824 A | 11/2000 | Rothschild et al. | |
| 6,224,486 B1 | 5/2001 | Walker et al. | |
| 6,273,820 B1 | 8/2001 | Haste, III | |
| 6,280,325 B1 | 8/2001 | Fisk | |
| 6,287,202 B1 | 9/2001 | Pascal et al. | |
| 6,312,332 B1 | 11/2001 | Walker et al. | |
| 6,356,288 B1 | 3/2002 | Freeman et al. | |
| 6,425,828 B2 * | 7/2002 | Walker .................. | A63F 13/12 463/23 |
| 6,554,707 B1 | 4/2003 | Sinclair et al. | |
| 6,645,075 B1 | 11/2003 | Gatto et al. | |
| 7,198,571 B2 | 4/2007 | LeMay et al. | |
| 2001/0004609 A1 | 6/2001 | Walker et al. | |
| 2001/0019965 A1 | 9/2001 | Ochi | |
| 2002/0010025 A1 | 1/2002 | Kelly et al. | |
| 2002/0013173 A1 | 1/2002 | Walker et al. | |
| 2002/0034299 A1 | 3/2002 | Charrin | |
| 2002/0052229 A1 | 5/2002 | Hallburton et al. | |
| 2002/0094869 A1 | 7/2002 | Harkham | |
| 2002/0116615 A1 | 8/2002 | Parrott | |
| 2002/0123377 A1 | 9/2002 | Shulman | |
| 2002/0132660 A1 | 9/2002 | Taylor | |
| 2003/0064771 A1 | 4/2003 | Morrow et al. | |
| 2003/0070178 A1 | 4/2003 | Boyd et al. | |
| 2003/0186744 A1 | 10/2003 | Bradell | |
| 2004/0224773 A1 | 11/2004 | Sham | |
| 2004/0248652 A1 | 12/2004 | Massey et al. | |

FOREIGN PATENT DOCUMENTS

| | | |
|---|---|---|
| EP | 1 004 970 | 5/2000 |
| JP | 2001-029540 A | 2/2001 |
| JP | 2001-029629 A | 2/2001 |
| JP | 2001-297200 A | 10/2001 |
| JP | 2002-355430 A | 12/2002 |
| WO | WO 2002/013932 | 2/2002 |
| WO | WO 2003/017214 | 2/2003 |
| WO | WO 2003/053531 | 7/2003 |

OTHER PUBLICATIONS

Office Action dated Aug. 4, 2009 from Australian Patent Application No. 2004267733.
Non-Final Office Action from U.S. Appl. No. 10/642,934 dated Feb. 22, 2007.
Final Office Action from U.S. Appl. No. 10/642,934, dated Jul. 25, 2007.
Office Action from U.S. Appl. No. 10/642,934, dated Mar. 21, 2008.
Final Office Action from U.S. Appl. No. 10/642,934, dated Oct. 27, 2008.
Office Action from U.S. Appl. No. 10/642,898, dated Sep. 27, 2007.
Final Office Action from U.S. Appl. No. 10/642,898, dated Oct. 16, 2008.
Office Action from U.S. Appl. No. 10/642,898, dated Apr. 2, 2008.
Chinese Office Action from Chinese Patent Application No. 200480026962.9, dated Jan. 9, 2009.
Chinese Office Action from Chinese Patent Application No. 2004800269597, dated Jan. 9, 2009.
Chinese Office Action from Chinese Patent Application No. 200480026948, dated Jan. 9, 2009.
Chinese Office Action from Chinese Patent Application No. 200480026962.9 dated Jun. 26, 2009.
Chinese Office Action from Chinese Patent Application No. 2004800269597, dated Jun. 26, 2009.
Chinese Office Action from Chinese Patent Application No. 200480026948.2, dated Jun. 26, 2009.
Chinese Office Action from Chinese Patent Application No. 200480026962.9, dated Apr. 11, 2008.
Chinese Office Action from Chinese Patent Application No. 2004800269597, dated Apr. 25, 2008.
Chinese Office Action from Chinese Patent Application No. 200480026948.2, dated Apr. 11, 2008.
Office Action from U.S. Appl. No. 10/642,898, dated Apr. 2, 2009.
Office Action from U.S. Appl. No. 10/642,934 dated Jun. 24, 2009.
Final Office Action dated Dec. 10, 2009 for U.S. Appl. No. 10/642,934.
Examination Report dated Aug. 6, 2009 from Australian Patent Application No. 2004267746.
Notice of Allowance dated Apr. 27, 2010 from U.S. Appl. No. 10/642,898.
Office Action dated Apr. 22, 2010 from Australian Patent Application No. 2004267734.
Examination Report from counterpart European Application No. 04 780 672.4-1238, dated Aug. 8, 2006.
Examination Report from European Application No. 04 780 489.3-1238 dated Oct. 17, 2006.
International Search Report completed for PCT/US2004/025661 dated Feb. 23, 2005.
International Search Report and Written Opinion dated Dec. 10, 2004 for PCT/US2004/02876.
International Search Report and Written Opinion dated Dec. 8, 2004 for PCT/US2004025662.
U.S. Patent Application Pub. No. 2003/0036430, Cannon, published Feb. 20, 2003.
U.S. Patent Application Pub. No. 2003/0064771, Morrow et al, published Apr. 2, 2003.

(56) References Cited

OTHER PUBLICATIONS

Declaration of Jeffrey Lindo dated Jul. 2000 and filed in Patent Office in connection with U.S. Pat. No. 4,575,622.
"Roulabette: A New Concept", by Kenilworth, pp. 1-42, 19-79; 1979.
"Harrah's Entertainment Plans to Launch Online Gaming Venture, Subscription-based 'Lucky Me' Site to Begin Operations in 2004 First Quarter,", Harrah's Entertainment press release published Nov. 12, 2003 at http://biz.yahoo.com/prnews/031112/law067_1.html, printed Nov. 17, 2003.
"SkillJam Q&A," http://skill.skilljam.com//front/pop_upqa.asp, printed Aug. 6, 2003.
"Play Games, Win CA$H!," http://skill.skilljam.com/spash/spash.asp, printed Aug. 6, 2003.
"What Are CA$H Prize Tournaments?," http://skill.skilljam.com/front/popup_tourns.asp, printed Aug. 6, 2003.
"What Are Skill Games?." http://skill.skilljam.com/front/popup_whatis.asp, dated Aug. 6, 2003.
Letter from Marvin A. Motsenbocker of Mots Law dated Dec. 13, 2011 regarding Third Party Submission in Published Application Under 37 C.F.R. 1.99 filed for U.S. Appl. No. 13/167,951 (1 page).
Third Party Submission in Published Application Under 37 C.F.R. 1.99 filed for U.S. Appl. No. 13/167,951, dated Dec. 13, 2011 (3 pages).
Partially highlighted copy JP 2001-297200A and English translation of paragraphs [0008], [0009], and [0016] of same submitted with Third Party Submission in Published Application Under 37 C.F.R. 1.99 for U.S. Appl. No. 13/167,951, dated Dec. 13, 2011 (5 pages).
Partially highlighted copy of JP 2002-355430A and English translation of paragraphs [0015], [0016], and [0017] of same submitted with Third Party Submission in Published Application Under 37 C.F.R. 1.99 for U.S. Appl. No. 13/167,951, dated Dec. 13, 2011 (4 pages).
Partially highlighted copy of JP 2001-029629A and English translation of paragraph [0008] of same submitted with Third Party Submission in Published Application Under 37 C.F.R. 1.99 for U.S. Appl. No. 13/167,951, dated Dec. 13, 2011 (3 pages).
Partially highlighted copy JP 2001-029540A and English translation of paragraphs [0008] and [0009] of same submitted with Third Party Submission in Published Application Under 37 C.F.R. 1.99 for U.S. Appl. No. 13/167,951, dated Dec. 13, 2011 (4 pages).

* cited by examiner

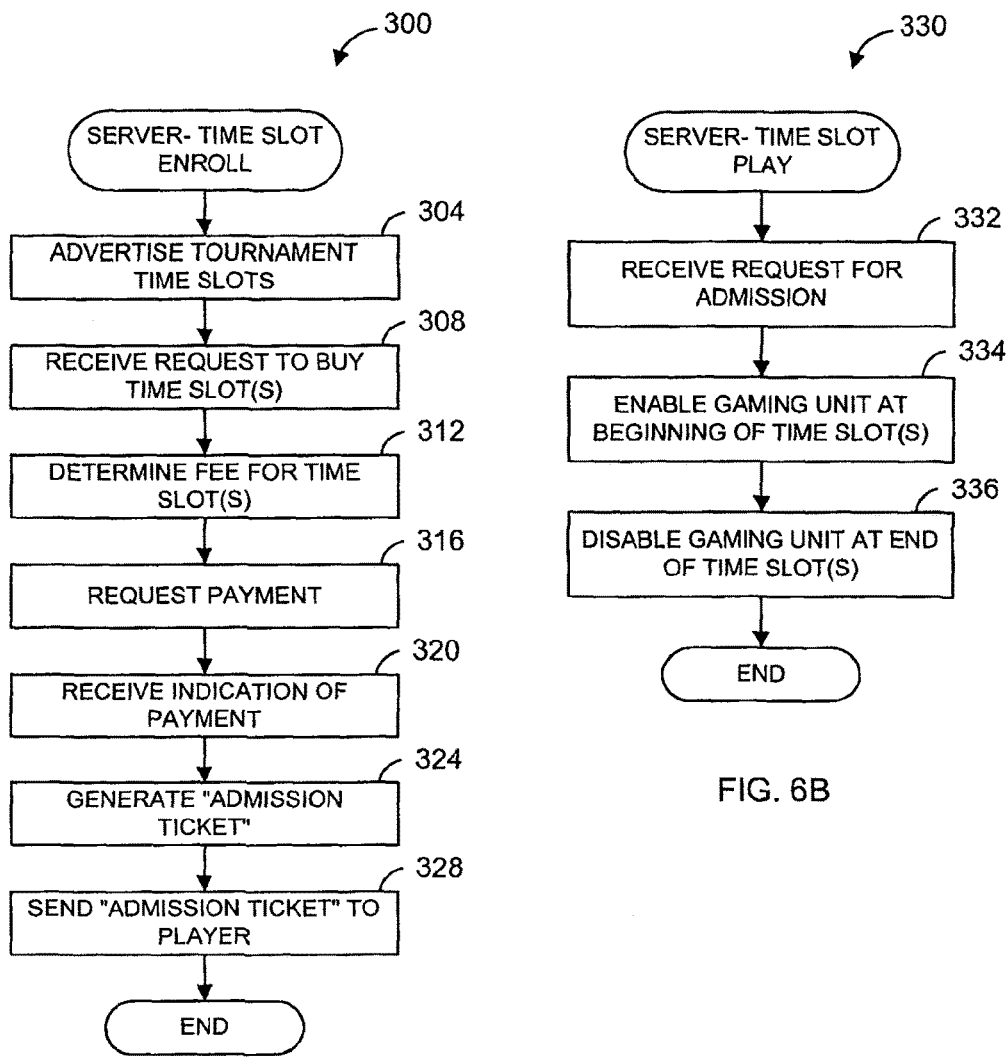

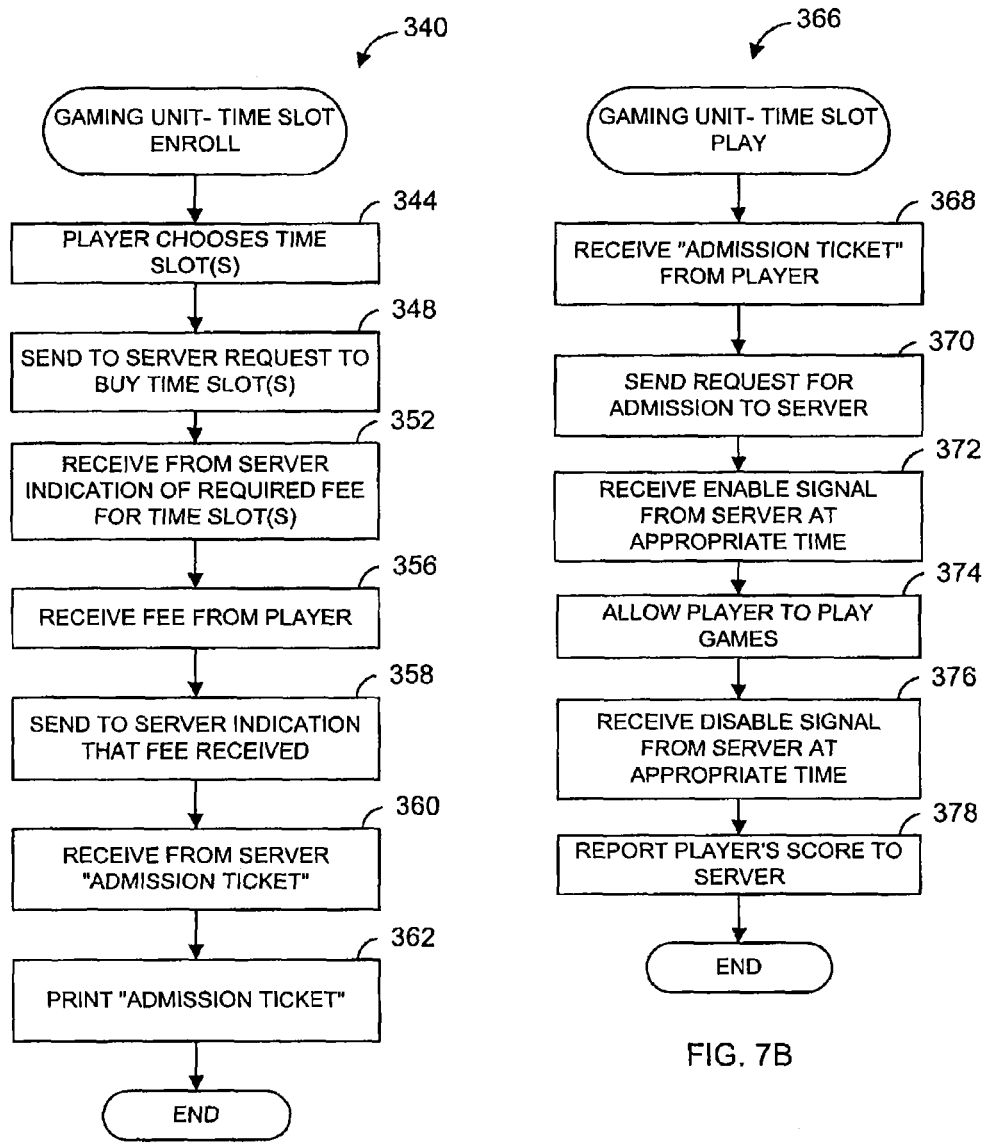

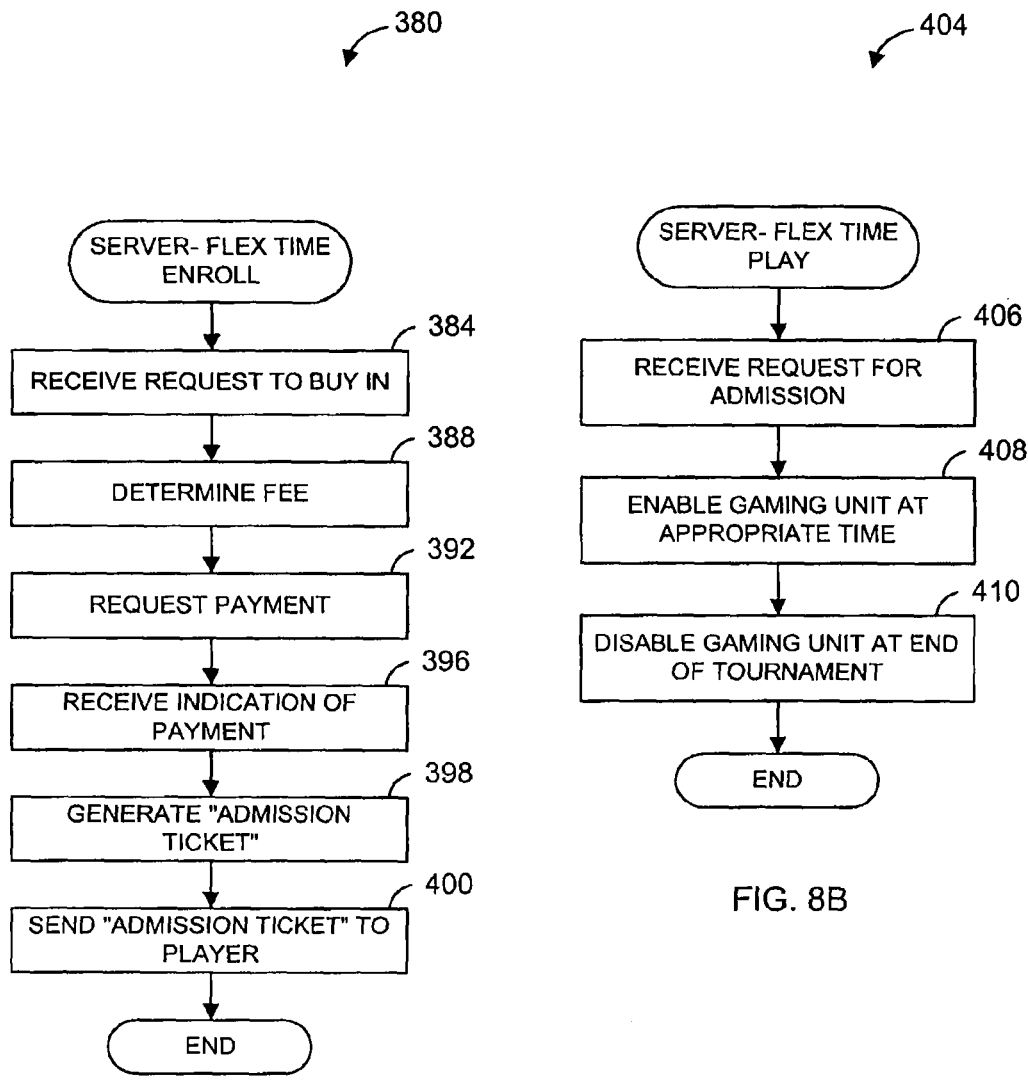

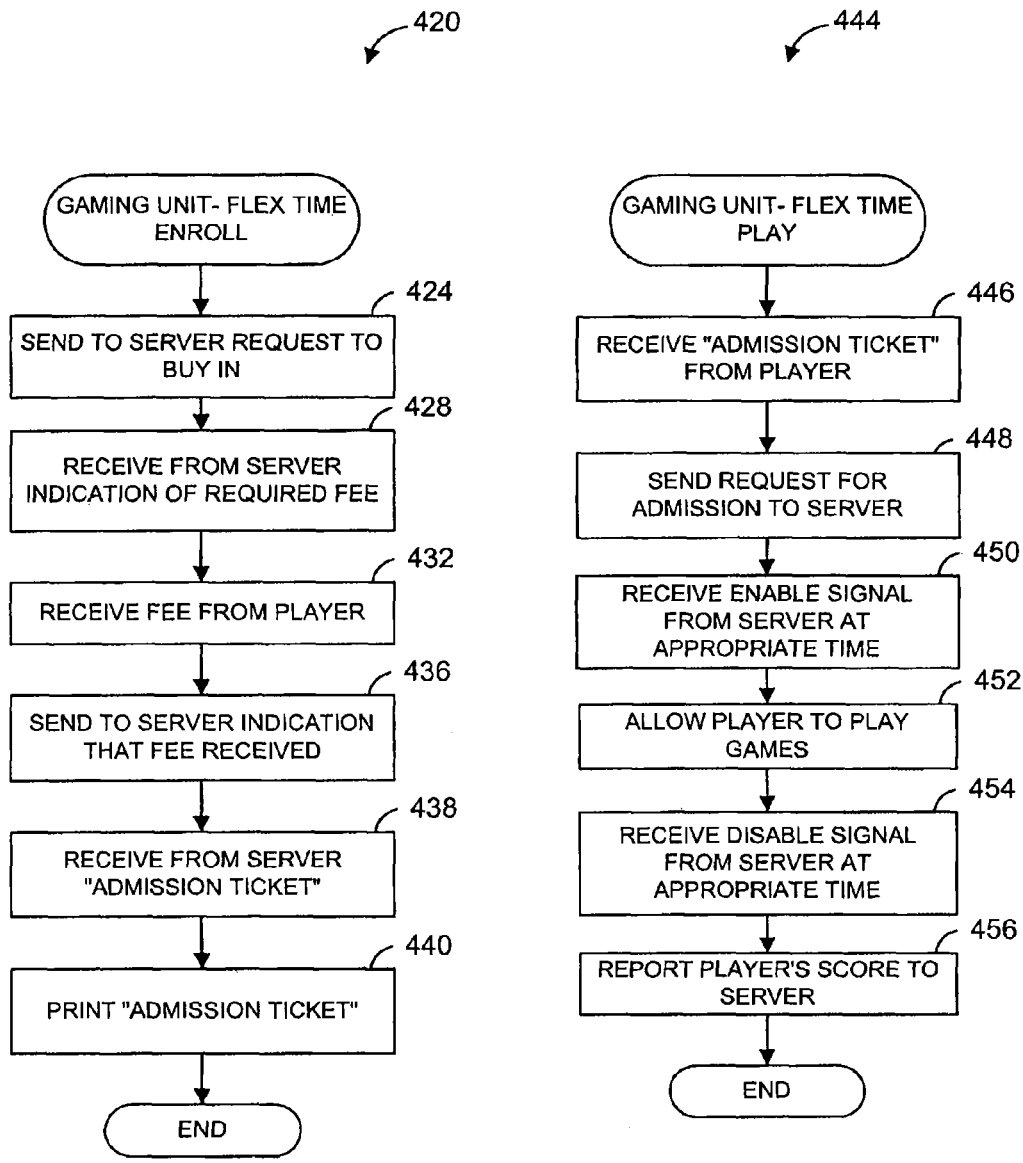

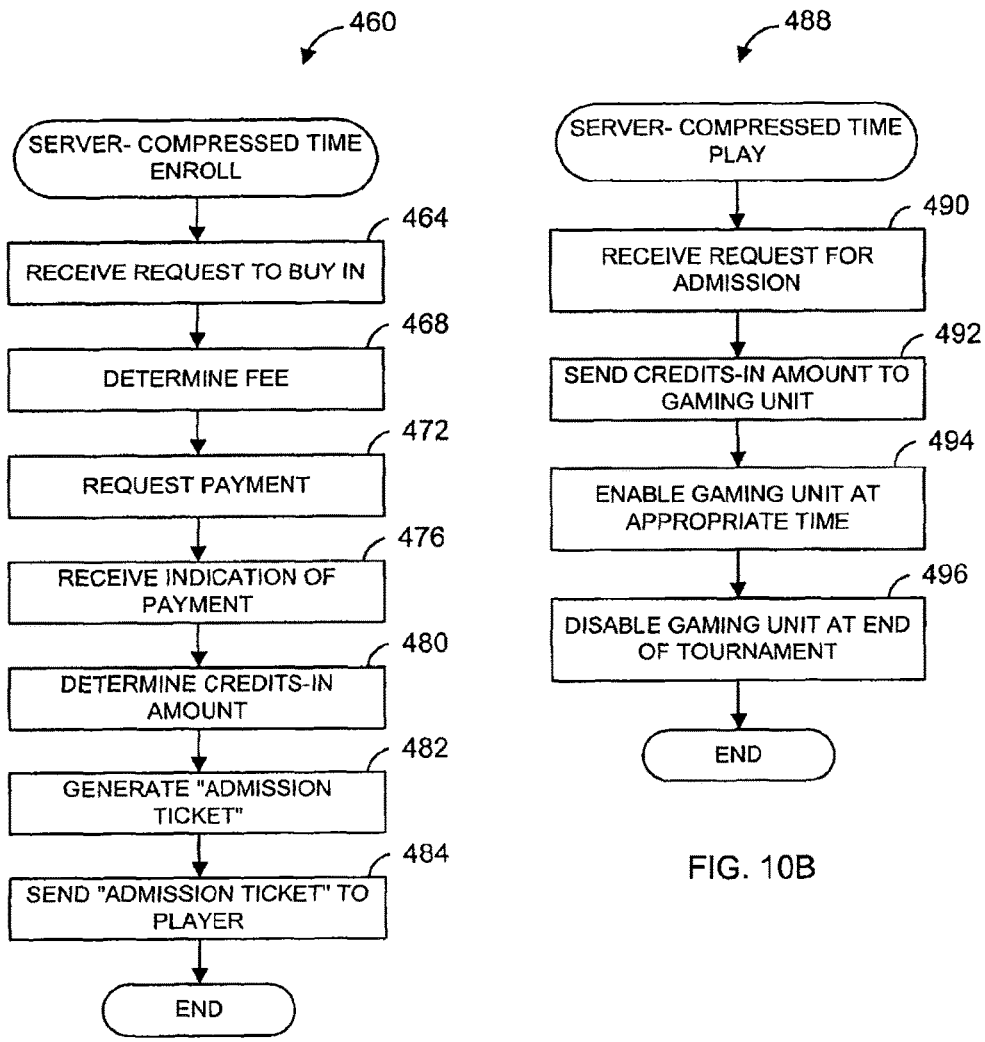

TOURNAMENT GAME SYSTEM AND TOURNAMENT METHOD

PRIORITY CLAIM

This application is a continuation of, and claims priority to and the benefit of, U.S. patent application Ser. No. 13/938,907, which was filed on Jul. 10, 2013, which is a continuation of, and claims priority to and the benefit of, U.S. patent application Ser. No. 13/167,951, which was filed on Jun. 24, 2011, and issued as U.S. Pat. No. 8,485,892 on Jul. 16, 2013, which is a continuation of, and claims priority to and the benefit of, U.S. patent application Ser. No. 10/642,937, which was filed on Aug. 18, 2003, and issued as U.S. Pat. No. 8,002,630 on Aug. 23, 2011, the entire contents of each of which are incorporated herein by reference.

BACKGROUND

The present disclosure is related to gaming systems, and, more particularly, to gaming systems for facilitating tournament games.

Various tournament gaming techniques have been previously described. For example, U.S. Pat. No. 6,224,486 issued to Walker et al., describes a distributed electronic tournament system that allows remotely located players to be identified via a player tracking system, and allows the identified players to participate in tournaments such as chess, bridge, computer golf games, poker and the like from their homes. In addition to player tracking, a database, maintained at a central location, enables registration of players, acceptance of entry fees, and coordination of prize money.

Another patent directed toward online tournament games, U.S. Pat. No. 6,039,648, issued to Guinn et al., describes an apparatus and method for an automated tournament gaming system utilizing a computer network coupled to a number of gaming machines. The Guinn patent also provides for a multi-site progressive automated tournament. The automation is provided by a central server computer coupled to a tournament schedule computer.

Additionally, U.S. Pat. No. 6,287,202, issued to Pascal et al., describes a gaming system that includes a plurality of gaming terminals connected together and to a master gaming terminal to form a network. People may participate in a tournament by signing up and playing at the gaming terminals. In one specific example, if a predetermined number of people at the gaming terminals have signed up for a tournament, a tournament game is started at an announced time. If, at the announced time, the number of people who have signed up is less than the predetermined number, a number of real or virtual gaming terminals may be designated to run in an automatic play mode in order to meet the predetermined number. If an automatic terminal wins the tournament, the winnings are retained by the house.

SUMMARY

In one embodiment, a gaming method is provided. The method may comprise receiving an identifier from a first gaming unit, wherein the identifier is associated with a tournament game card, wherein the tournament game card is provided to a player in response to paying a fee, and determining whether the identifier received from the first gaming unit is authentic. The method may additionally comprise determining a duration the player may play in a tournament based on the identifier, and enabling the first gaming unit for play in the tournament for the duration if the identifier is authentic. The method may also comprise receiving a tournament score of the player, and determining a winning player of the tournament, if any. The method may further comprise generating data indicative of a value payout to be awarded to the winning player if the winning player of the tournament is determined.

In another embodiment a tournament server is provided. The tournament server may comprise a network interface operatively coupled to a network, and a controller operatively coupled to the network interface, the controller including a processor and a memory operatively coupled to the processor. The controller may be configured to receive, via the network interface, an identifier from a first gaming unit, wherein the identifier is associated with a tournament game card, wherein the tournament game card is provided to a player in response to paying a fee, and determine whether the identifier received from the first gaming unit is authentic. The controller may also be configured to determine a duration the player may play in a tournament based on the identifier, and enable the first gaming unit for play in the tournament for the duration if the identifier is authentic. The controller may additionally be configured to receive a tournament score of the player, and determine a winning player of the tournament, if any. The controller may further be configured to generate data indicative of a value payout to be awarded to the winning player if the winning player of the tournament is determined.

In yet another embodiment, another gaming method is provided. The method may comprise receiving a fee from a player to play in a tournament, and configuring a gaming unit for playing in the tournament while a timer implemented by the gaming unit is running. The method may additionally comprise starting the timer at a request of a player, and enabling the gaming unit for play in the tournament while the timer is running. The method may also comprise stopping the timer after the timer has run for a period of time, and reporting a tournament score of the player to a tournament server. The method may further comprise generating data indicative of a value payout to be awarded to the player if the player wins the tournament.

In still another embodiment, yet another gaming method is provided. The method may comprise receiving an identifier from a first gaming unit, wherein the identifier is provided to a player in response to paying a fee, and determining whether the identifier received from the first gaming unit is authentic. The method may also comprise determining an amount of time the player may play in a tournament based on the identifier, and initializing a timer with the determined amount of time if the identifier received from the first gaming unit is authentic. The method may further comprise starting the timer, and enabling the first gaming unit for play in the tournament for at least a first subset of time that the timer is running. The method may further comprise stopping the timer after the timer has run for the determined amount of time, and receiving a tournament score of the player. The method may still further comprise determining a winning player of the tournament, if any, and generating data indicative of a value payout to be awarded to the winning player if the winning player of the tournament is determined.

In a further embodiment, another tournament server is provided. The tournament server may comprise a network interface operatively coupled to a network, and a controller operatively coupled to the network interface, the controller comprising a processor and a memory operatively coupled to the processor. The controller may be configured to receive an identifier from a gaming unit via the network interface, wherein the identifier is provided to a player in response to paying a fee, and determine whether the identifier received from the gaming unit is authentic. The controller may additionally be configured to determine an amount of time the player may play in a tournament, and initialize a timer with the determined amount of time if the identifier received from the first gaming unit is authentic. The controller may also be configured to start the timer, and enable the gaming unit for play in the tournament while the timer is running. The controller may also be configured to stop the timer after the timer has run for the determined amount of time, and receive a tournament score of the player via the network interface. The controller may be further configured to determine a winning player of the tournament, if any, and generate data indicative of a value payout to be awarded to the winning player if the winning player of the tournament is determined.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 6A is a flowchart of one embodiment of a tournament enrollment routine that may be performed during operation of the tournament server;

FIG. 6B is a flowchart of one embodiment of a tournament routine that may be performed during operation of the tournament server;

FIG. 7A is a flowchart of one embodiment of a tournament enrollment routine that may be performed during operation of one or more of the gaming units;

FIG. 7B is a flowchart of one embodiment of a tournament routine that may be performed during operation of one or more of the gaming units;

FIG. 8A is a flowchart of another embodiment of a tournament enrollment routine that may be performed during operation of the tournament server;

FIG. 8B is a flowchart of another embodiment of a tournament routine that may be performed during operation of the tournament server;

FIG. 9A is a flowchart of another embodiment of a tournament enrollment routine that may be performed during operation of one or more of the gaming units;

FIG. 9B is a flowchart of another embodiment of a tournament routine that may be performed during operation of one or more of the gaming units;

FIG. 10A is a flowchart of yet another embodiment of a tournament enrollment routine that may be performed during operation of the tournament server;

FIG. 10B is a flowchart of yet another embodiment of a tournament routine that may be performed during operation of the tournament server;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
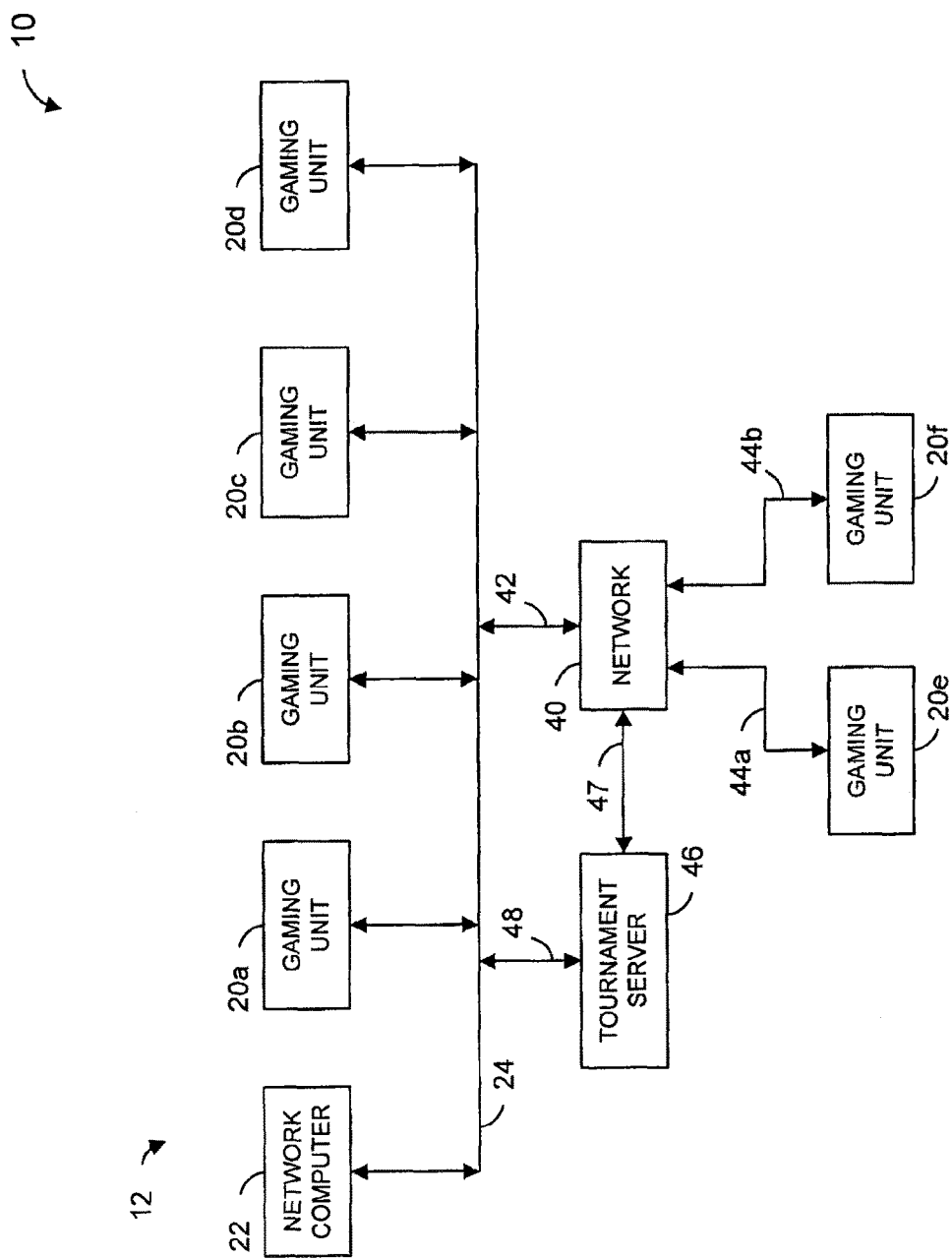
FIG. 1 is a block diagram of an embodiment of a gaming system.

FIG. 1 illustrates one possible embodiment of a tournament gaming system 10 in accordance with the invention. Referring to FIG. 1, the tournament gaming system 10 may include one or more groups or networks 12 of gaming units 20a, 20b, 20c, and 20d operatively coupled to a network computer 22 via a network data link 24. The network data link 24 may comprise, for example, a bus, a wired local area network (LAN), a wireless LAN, Bluetooth™ communication links, a wide area network (WAN), etc. Different networks 12 may be operatively coupled together via a network 40 and a communication link 42. The network 40 may comprise, for example, a wired LAN, a wireless LAN, Bluetooth™ communication links, a cellular network, a satellite network, a WAN, an intranet, an extranet, the Internet, etc. The network 40 may include a plurality of network computers or server computers (not shown), each of which may be operatively interconnected. The communication link 42 may comprise a wired and/or wireless communication link.

As one example, a first network 12 of gaming units 20a, 20b, 20c, and 20d may be provided at a first location (e.g., a casino, a hotel, a restaurant, a tavern, etc.) and a second network 12 of gaming units 20a, 20b, 20c, and 20d may be provided at a second location (e.g., a casino, a hotel, a restaurant, a tavern, etc.) geographically separate from the first location. For instance, the two casinos may be located in different areas of the same city, or they may be located in different states.

The network computer 22 may be a server computer and may be used to accumulate and analyze data relating to the operation of the gaming units 20a, 20b, 20c, and 20d. For example, the network computer 22 may continuously receive data from each of the gaming units 20a, 20b, 20c, and 20d indicative of the dollar amount and number of wagers being made on each of the gaming units 20a, 20b, 20c, and 20d, data indicative of how much each of the gaming units 20 is paying out in winnings, data regarding the identity and gaming habits of players playing each of the gaming units 20a, 20b, 20c, and 20d, etc.

Although the network 12 is shown to include one network computer 22 and four gaming units 20a, 20b, 20c, and 20d, it should be understood that different numbers of computers and gaming units may be utilized. For example, the network 12 may include a plurality of network computers 22 and tens or hundreds of gaming units 20, all of which may be interconnected via the network data link 24. Although the data link 24 is shown as a single data link 24, the data link 24 may comprise multiple data links.

The tournament gaming system 10 may additionally comprise a plurality of gaming units 20e and 20f operatively coupled to the network 40 via respective communication links 44a and 44b. The communication links 44 may each comprise a wired and/or wireless link.

The tournament gaming system 10 also may comprise a tournament server 46, which may be operatively coupled to the network 12 via a communication link 47 and/or a communication link 48. The tournament server 46 may be used to facilitate, monitor, etc., tournament games played on the gaming units 20. The tournament server 46 may be operatively coupled to the gaming units 20 via a communication link 47 and/or a communication link 48. The communication links 47 and 48 may each comprise a wired and/or wireless communication link.

In one embodiment of the system 10, a player may choose to play a casino game such as poker, keno, blackjack, slots, bingo, pachinko, card games, or any games of chance and the like, via a gaming unit 20. Additionally, the player may choose to play individually or to play in a tournament. Tournament play may include various tournament modes such as single player mode or multiplayer mode, or teams. Tournament play may also include various tournament games, for example, games of chance such as slots, poker, blackjack, etc., games of skills such as trivia games, or combinations of games of chance and skill such as user-controlled reel-stop slot games, games such as Family Feud®, Jeopardy®, Wheel-of-Fortune®, etc. Tournament play may also include a progressive type jackpot where tournament prize amounts are proportional to the number of tournament players, the type of game, whether the prize is awarded as one large jackpot or smaller secondary jackpots, etc. In addition, tournament play may include multi-site tournaments where each site is made up of one or more teams. The teams may compete with each other in a round-robin type elimination, single elimination, double elimination, etc., until there is one remaining winning team. Thus, a team located in New Jersey can compete against teams in Las Vegas and Australia.

Tournament Server Electronics

The tournament server 46 may comprise a computer such as a desk top computer, a lap top computer, a work station, a server, a mainframe, etc. Although in FIG. 1, the tournament server 46 is illustrated as being separate from the network computer 22 and the gaming units 20, the tournament server 46 may be implemented by, for example, the network computer 22 and/or one of the gaming units 20.

Figure 2:
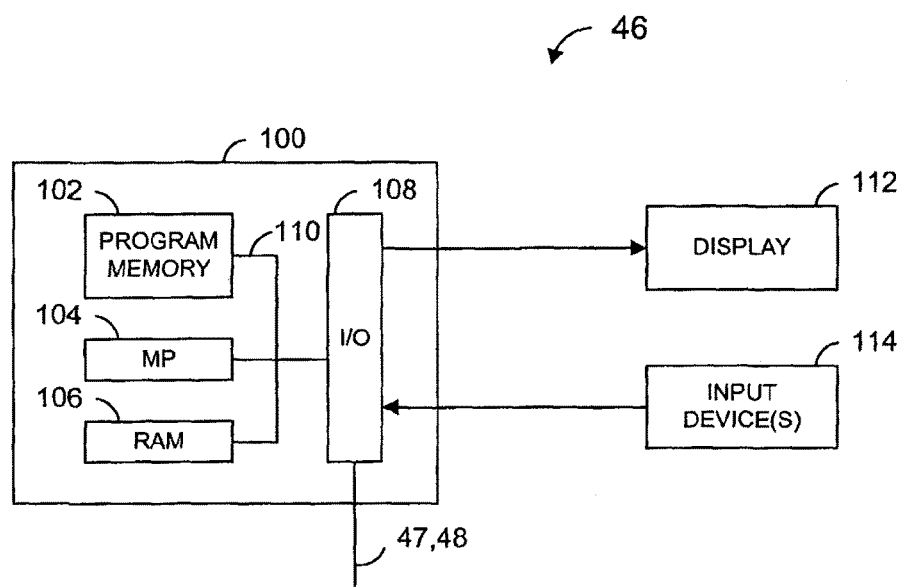
FIG. 2 is a block diagram of the electronic components of an embodiment of a tournament server.

FIG. 2 is a block diagram of a number of components that may be incorporated in one embodiment of the tournament server 46. The tournament server 46 may include a controller 100 that may comprise a program memory 102, a microcontroller or microprocessor (MP) 104 (hereinafter referred to as microprocessor 104), a random-access memory (RAM) 106, and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memory (or memories) 102 may be implemented as semiconductor memories, magnetically readable memories, and/or optically readable memories, for example. The program memory 102 may be a RAM, a ROM, a read/write or alterable memory such as a hard disk, etc. In the event a hard disk is used as a program memory 102, the address/data bus 110 shown schematically in FIG. 2 may comprise multiple address/data buses, which may be of different types, and there may be an I/O circuit disposed between the address/data buses.

A display 112 and one or more input devices 114 may be operatively coupled to the I/O circuit 108, each of those components being so coupled by either a unidirectional or bidirectional, single-line or multiple-line data link, which may depend on the design of the component that is used. As shown in FIG. 2, the components 112 and 114 may be coupled to the I/O circuit 108 via a respective direct link. Different connection schemes could be used. For example, these components may be coupled to the I/O circuit 108 via a common bus or other data link that is shared by a number of components. Furthermore, some of the components may be directly coupled to the microprocessor 104 without passing through the I/O circuit 108.

Gaming Units

Figure 3A:
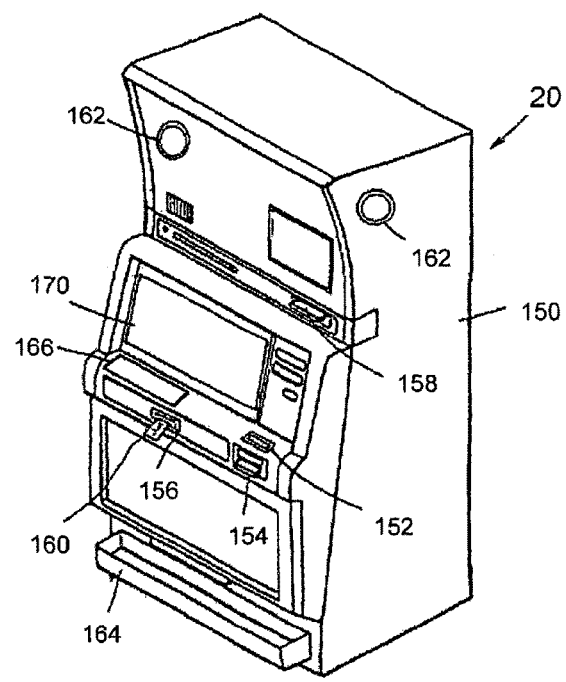
FIG. 3A is a perspective view of an embodiment of one of the gaming units shown schematically in FIG. 1.

FIG. 3A is a perspective view of one possible embodiment of one or more of the gaming units 20. It should be understood that the design of one or more of the gaming units 20 may be different than the design of other gaming units 20. Some gaming units 20 (e.g., 20a, 20b, 20c, and 20d) may be any type of casino gaming unit and may have various different structures and methods of operation. Additionally, other gaming units 20 (e.g., 20e and 200 may be a casino gaming unit, or may be a general purpose computer (e.g., a desk top computer, lap top computer, tablet computer, server, work station, main frame, personal digital assistant (PDA), cellular phone, etc.). Further some gaming units 20 may be incorporated into other devices such as a cable or satellite set-top box, a video game system (e.g., a PLAYSTATION 1™ or PLAYSTATION 2™ video game system from Sony, an XBOX™ video game system from Microsoft, a GAMECUBE™ video game system from Nintendo, etc.), a hand-held game system (e.g., a GAME BOY™ hand-held game system from Nintendo), etc. Various example designs and configurations of the gaming units 20 are described below, but it should be understood that numerous other designs may be utilized.

Referring to FIG. 3A, one example of a gaming unit 20 may include a housing or cabinet 150 and one or more input devices, which may include a coin slot or acceptor 152, a paper currency acceptor 154, a ticket reader/printer 156 and a card reader and/or writer (hereinafter "card reader/writer") 158, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 156 may be used to read and/or print or otherwise encode ticket vouchers 160. The ticket vouchers 160 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 160 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 160 could be printed with an optically readable material such as ink, or data on the ticket vouchers 160 could be magnetically encoded. The ticket reader/printer 156 may be provided with the ability to both read and print ticket vouchers 160, or it may be provided with the ability to only read or only print or encode ticket vouchers 160. In the latter case, for example, some of the gaming units 20 may have ticket printers 156 that may be used to print ticket vouchers 60, which could then be used by a player in other gaming units 20 that have ticket readers 156.

If provided, the card reader/writer 158 may include any type of card reading and/or writing device, such as a magnetic card reader or an optical card reader, and may be used to read (and, optionally, write) data from (to) a card offered by a player, such as a credit card, a player tracking card, a PC card, a smart card, etc. If provided for player tracking purposes, the card reader/writer 158 may be used to read data from, and/or write data to, player tracking cards that are capable of storing data representing the identity of a player, the identity of a casino, the player's gaming habits, etc.

The gaming unit 20 may include one or more audio speakers 162, a coin payout tray 164, an input control panel 166 and a display unit 170 for displaying display data relating to the game or games provided by the gaming unit 20. The audio speakers 162 may generate audio representing sounds such as the noise of spinning slot machine reels, a dealer's voice, music, announcements or any other audio related to a casino game. The input control panel 166 may be provided with a plurality of pushbuttons or touch-sensitive areas that may be pressed by a player to select games, make wagers, make gaming decisions, etc. The display unit 170 may be two dimensional display unit such as a color video display unit displaying images. Additionally, the display unit 170 may include a three dimensional display unit such as a holographic display, a stereoscopic display, a three dimensional display volume, etc.

Figure 3B:
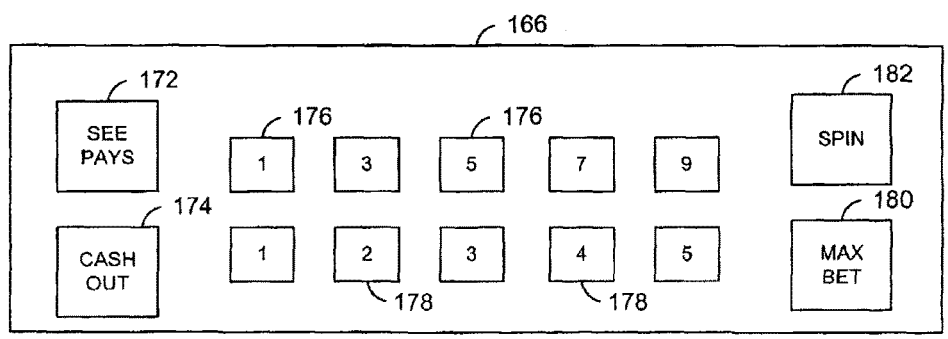
FIG. 3B illustrates an embodiment of a control panel for a gaming unit.

FIG. 3B illustrates one possible embodiment of the control panel 166, which may be used where the gaming unit 20 is a slot machine having a plurality of mechanical or "virtual" reels. In this embodiment, the control panel 166 may include a "See Pays" button 172 that, when activated, causes the display unit 170 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch, select with a mouse, etc. The control panel 166 may include a "Cash Out" button 174 that may be activated when a player decides to terminate play on the gaming unit 20, in which case the gaming unit 20 may return value to the player, such as by returning a number of coins to the player via the payout tray 164.

If the gaming unit 20 provides a slots game having a plurality of reels and a plurality of paylines which define winning combinations of reel symbols, the control panel 166 may be provided with a plurality of selection buttons 176, each of which allows the player to select a different number of paylines prior to spinning the reels. For example, five buttons 176 may be provided, each of which may allow a player to select one, three, five, seven or nine paylines.

If the gaming unit 20 provides a slots game having a plurality of reels, the control panel 166 may be provided with a plurality of selection buttons 178 each of which allows a player to specify a wager amount for each payline selected. For example, if the smallest wager accepted by the gaming unit 20 is a quarter ($0.25), the gaming unit 20 may be provided with five selection buttons 178, each of which may allow a player to select one, two, three, four or five quarters to wager for each payline selected. In that case, if a player were to activate the "5" button 176 (meaning that five paylines were to be played on the next spin of the reels) and then activate the "3" button 178 (meaning that three coins per payline were to be wagered), the total wager would be $3.75 (assuming the minimum bet was $0.25).

The control panel 166 may include a "Max Bet" button 180 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 182 to allow the player to initiate spinning of the reels of a slots game after a wager has been made.

In FIG. 3B, a rectangle is shown around the buttons 172, 174, 176, 178, 180, 182. It should be understood that that rectangle simply designates, for ease of reference, an area in which the buttons 172, 174, 176, 178, 180, 182 may be located. Consequently, the term "control panel" should not be construed to imply that a panel or plate separate from the housing 150 of the gaming unit 20 is required, and the term "control panel" may encompass a plurality or grouping of player activatable buttons.

Although one possible control panel 166 is described above, it should be understood that different buttons could be utilized in the control panel 166, and that the particular buttons used may depend on the game or games that could be played on the gaming unit 20. Although the control panel 166 is shown to be separate from the display unit 170, it should be understood that the control panel 166 could be generated by the display unit 170. In that case, each of the buttons of the control panel 166 could be a colored area generated by the display unit 170, and some type of mechanism may be associated with the display unit 170 to detect when each of the buttons was touched, such as a touch-sensitive screen.

Gaming Unit Electronics

Figure 4:
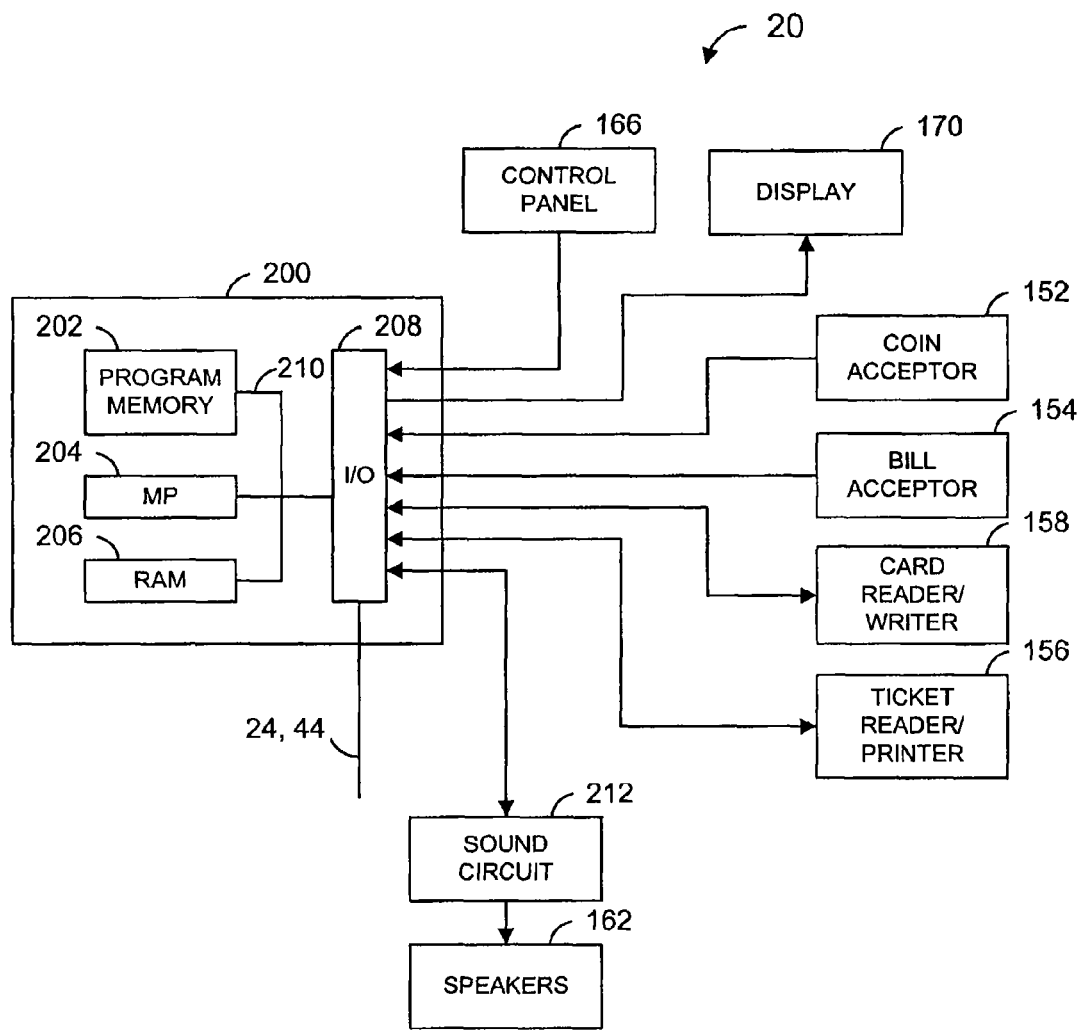
FIG. 4 is a block diagram of the electronic components of the gaming unit of FIG. 3A.

FIG. 4 is a block diagram of a number of components that may be incorporated with the gaming unit 20. The gaming unit 20 may include a controller 200 that may comprise a program memory 202, a microcontroller or microprocessor (MP) 204 (hereinafter referred to as microprocessor 204), a random-access memory (RAM) 206, and an input/output (I/O) circuit 208, all of which may be interconnected via an address/data bus 210. It should be appreciated that although only one microprocessor 204 is shown, the controller 200 may include multiple microprocessors 204. Similarly, the memory of the controller 200 may include multiple RAMs 206 and multiple program memory (or memories 202). Although the I/O circuit 208 is shown as a single block, it should be appreciated that the I/O circuit 208 may include a number of different types of I/O circuits. The RAM(s) 206 and program memories 202 may be implemented as semiconductor memories, magnetically readable memories, and/or optically readable memories, for example.

The program memory 202 may include a RAM, a read-only memory (ROM) 102, a read/write or alterable memory, such as a hard disk, etc. In the event a hard disk is used as a program memory, the address/data bus 210 shown schematically in FIG. 4 may comprise multiple address/data buses, which may be of different types, and there may be an I/O circuit disposed between the address/data buses.

FIG. 4 illustrates that the control panel 166, the coin acceptor 152, the bill acceptor 154, the card reader 158, the ticket reader/printer 156, and the display unit 170 may be operatively coupled to the I/O circuit 208, each of those components being so coupled by either a unidirectional or bidirectional, single-line or multiple-line data link, which may depend on the design of the component that is used. The speaker(s) 162 may be operatively coupled to a sound circuit 212, that may comprise a voice- and sound-synthesis circuit or that may comprise a driver circuit. The sound-generating circuit 212 may be coupled to the I/O circuit 208.

As shown in FIG. 4, the components 152, 154, 156, 158, 166, 170, 212 may be coupled to the I/O circuit 208 via a respective direct line or conductor. Different connection schemes could be used. For example, one or more of the components shown in FIG. 4 may be coupled to the I/O circuit 208 via a common bus or other data link that is shared by a number of components. Furthermore, some of the components may be directly coupled to the microprocessor 204 without passing through the I/O circuit 208.

Although the example gaming unit 20 described with reference to FIGS. 3A, 3B, and 4 is generally a casino gaming machine, some or all of the gaming units 20 may be a general purpose computer. These gaming units need not, for example, be incorporated in a casino game housing, or include many of the components described with reference to FIG. 4 (e.g., coin acceptor 152, bill acceptor 154, ticket reader/writer 156, etc.). Additionally, such a gaming unit 20 may include other components such as a keyboard, key pad, mouse, joystick, etc.

Additionally, although the example gaming unit 20 described with reference FIG. 3A is generally a floor-based casino gaming machine, some or all of the gaming units 20 may be casino gaming machine configured for placement

Tournament Operation

In general, the embodiments described herein may allow more flexible approaches to tournament gaming. For example, some embodiments may allow players to join a tournament already in progress, or to participate in the tournament for only a subset of the tournament time. Additionally, some embodiments may permit a player to participate in a tournament using a variety of types of gaming units, rather than being restricted to using a casino game machine from a set of casino game machines specifically allocated by a casino for the tournament.

Figure 5:
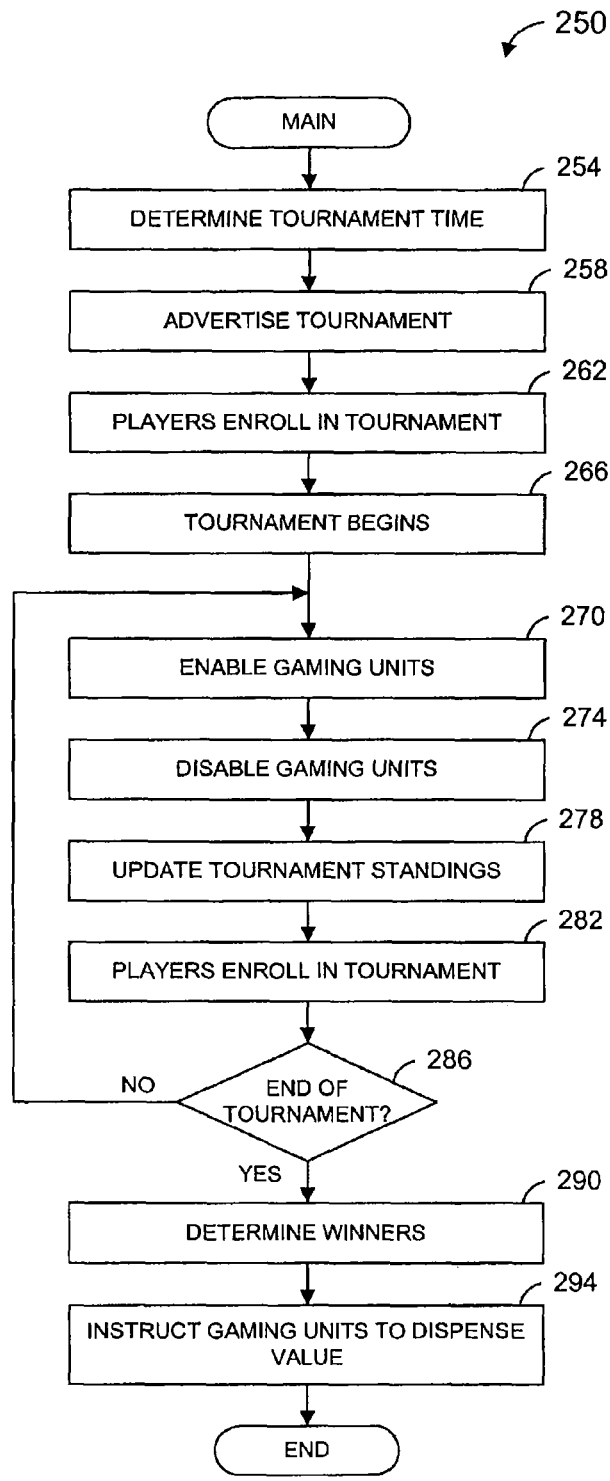
FIG. 5 is a flowchart of an embodiment of a main routine that may be performed during operation of the tournament server.

FIG. 5 is a flow diagram illustrating one embodiment of a tournament gaming method. The method 250 may be implemented by a gaming system such as the tournament gaming system 10 of FIG. 1, and will be described with reference to FIG. 1. At block 254, a tournament time may be determined. The tournament time may be defined by, for example, a start time and duration, a start time and an end time, etc. The tournament time may be determined, for example, manually by a tournament host person, according to a predetermined schedule (e.g., at certain times of the day, at certain times of certain days, every 3 hours, etc.), upon a certain number of persons indicating they wish to play in a tournament, upon a group of persons deciding amongst themselves to start a tournament, etc. The tournament time may be any suitable length of time. For example, the tournament time may be one minute, five minutes, ten minutes, one hour, several hours, one day, several days, one week, several weeks, etc. Additionally, the tournament time may be one contiguous block of time, or a plurality of time segments. As one example, a tournament may comprise several different rounds, where each round is a time period separated in time from the other rounds. For example, each round may be spaced from other rounds by 30 minutes, one hour, one day, etc. In other embodiments, the tournament time may be contiguous, but segmented into a plurality of rounds.

At block 258, the tournament may be advertised. For example, the tournament server 46 may transmit a message to some or all of the gaming units 20 that indicates a tournament will be held. The message may indicate the tournament time (determined at block 254). The message may be transmitted according to one or more of any appropriate communication protocols such as an internet protocol (IP), a wireless communication protocol, an e-mail protocol, a hyper text transfer protocol (HTTP), etc. Additionally or alternatively, an advertisement of the tournament could be published on a web site, in a newspaper, in a magazine, etc. The advertisement may include instructions on how to enroll in the tournament. For example, for a gaming unit 20 located in a casino, a player may be instructed to select a particular button if he or she wishes to play in the tournament. As another example, people may be directed to a web site via which they may enroll using, for example, a general purpose computer.

At block 262, players wishing to play in the tournament may enroll in the tournament prior to the tournament beginning. Enrolling in the tournament may include transmitting enrollment data to the tournament server 46 from, for example, a gaming unit 20. The enrollment data may include one or more of data indicating the player wishes to play in the tournament, data indicating a particular gaming unit 20 at which the player wishes to play, data indicating a fee has been received from the player, data for charging the fee to a credit card, debit card, account, etc., a name, nickname, or other identifier associated with the player. As will be described in more detail below, the enrollment data may additionally or alternatively include data indicative of a subset of the tournament playing time that the player wishes to play. The data indicative of the subset may include, for example, a time, after the tournament has already started, at which to begin playing, a time slot within the tournament time during which the player wishes to play, etc. The enrollment data may be indicative of a subset of time merely by when the enrollment data is received. For example, if the enrollment data is received after the tournament has already started, the enrollment data may indicate that the player wishes to play during the remaining time of the tournament. As will also be described below, the enrollment data may include data indicating that the player wishes to have a software agent play autonomously on behalf of the player. Additionally, the enrollment data may include data indicating that several players wish to play as a team.

At block 266, the tournament may begin at the start time of the tournament. For example, the tournament server 46 may begin the tournament by starting a timer at the appropriate time, monitoring a clock, etc.

At block 270, gaming units 20 at which enrolled players are present may be enabled for permitting tournament play. Once a gaming unit 20 is enabled, the player may play games and accumulate a score. For players that are enrolled and that have chosen to begin playing from the beginning of the tournament, their gaming units 20 may be enabled at substantially the same time as the beginning of the tournament (block 266). As will be described below, gaming units 20 may also be enabled at a time subsequent to the beginning of the tournament.

In one embodiment, the tournament server 46 may enable a gaming unit 20 by sending an enable signal to the gaming unit 20 at substantially the same time as the gaming unit 20 is to be enabled. The enable signal may be, for example, an analog or digital signal, a code, an alpha-numeric number, etc. In another embodiment, the tournament server 46 may enable a gaming unit 20 by sending an enable signal to the gaming unit at a time prior to when the gaming unit 20 is to be enabled (including at a time prior to the beginning of the tournament). In this embodiment, the enable signal may include or be associated with an indication of the time at which the gaming unit 20 is to be enabled. The gaming unit 20 may then analyze the enable signal received from the tournament server 46 to determine when it is to be enabled, and may then enable itself at the appropriate time.

At block 274, gaming units 20 at which enrolled players are present may be disabled for permitting tournament play. Once a gaming unit 20 is disabled, the player may no longer play games in the tournament. For players that have chosen to play until the end of the tournament, their gaming units 20 may be disabled at substantially the same time as the end of the tournament. As will be described below, gaming units may also be disabled at a time prior to the end of the tournament.

In one embodiment, the tournament server 46 may disable a gaming unit 20 by sending a disable signal to the gaming unit 20 at substantially the same time as the gaming unit 20 is to be disabled. The disable signal may be, for example, similar to the enable signal described above. In another embodiment, the tournament server 46 may disable a gaming unit 20 by sending a disable signal to the gaming unit at a time prior to when the gaming unit 20 is to be disabled (including at a time prior to the beginning of the tournament). In this embodiment, the disable signal may include or be associated with an indication of the time at which the gaming unit 20 is to be disabled. The gaming unit 20 may then analyze the disable signal received from the tournament server 46 to determine when it is to be enabled, and may then disable itself at the appropriate time. In one specific embodiment, the enable signal and the disable signal may be a common signal that includes, or is associated with, both a time at which to enable the gaming unit 20 and a time at which to disable the gaming unit 20.

At block 278, the tournament server 46 may update tournament standings. For example, the tournament server 46 may receive updated player scores from the participating gaming units 20, and may generate current tournament standings based on these updates. Then, the tournament server 46 may transmit the tournament standings to some or all the participating gaming units 20.

At block 282, players wishing to play in the tournament may enroll in the tournament after the tournament has started. Players may enroll in a manner similar to that described with reference to block 262.

At block 286, it may be determined whether the tournament should be ended. For example, the tournament may end when the tournament time expires, upon a player achieving a predetermined score, result, etc. The tournament server 46 may determine whether the tournament should be ended by, for example, monitoring a clock, monitoring a timer, monitoring the tournament standings, monitoring results of individual players, etc.

At block 290, winners of the tournament may be determined. A tournament may have zero, one, or a plurality of winners. The tournament server 46 may determine winners based on, for example, the tournament standings, monitoring results of individual players, etc. At block 294, if winners have been determined, the tournament server 46 may instruct the gaming units 20 corresponding to the winners to provide value payouts to the winning players. Providing value payouts may include dispensing money, dispensing a voucher that the player may "cash in" or use to play other games, make purchases, etc. A voucher may also permit a player to obtain a non-monetary prize such as a dinner at a restaurant, tickets to a show, a paid-for trip, a car, etc. Providing value payouts may also include transferring value to an account, smart card, etc.

The above-described embodiments provide a player with more flexibility in participating in a tournament game. For example, the player need not join the tournament for the entire tournament time, but may merely join the tournament for a subset of the tournament time or may elect to have a software agent play on his or her behalf. Various additional embodiments that permit a player to flexibly participate in a tournament will now be described.

"Time Slot" Tournament Participation

FIG. 6A is a flow diagram illustrating one embodiment of an enrollment method that may be implemented by the tournament server 46 of FIG. 1. In this embodiment, the tournament time may be partitioned into a plurality of time slots, and a player may join the tournament for one or more of these time slots. Each time slot may be non-overlapping and/or overlapping in time with other time slots. Additionally, all the time slots may be of the same duration or of differing durations. If the aggregate amount of time corresponding to the time slot(s) selected by a player is less than the total tournament time, the fee charged to the player may be lower as compared to the fee for playing for the total tournament time.

At block 304 of the method 300, the time slots available in the tournament may be advertised. For example, the tournament server 46 may transmit information to some or all of the gaming units 20 that indicates available time slots. The information may be transmitted according to one or more of any appropriate communication protocols such as IP, a wireless communication protocol, an e-mail protocol, HTTP, etc. A gaming unit 20 may display indications of the available time slots on a display so that a player can view the available time slots. Additionally or alternatively, an advertisement of the available time slots could be published on a web site, in a newspaper, in a magazine, etc. The advertisement may include instructions on how to select one or time slots in which to participate. As an example, for a gaming unit 20 located in a casino, a player may be instructed to select a particular button, an area of a touch screen, etc., if he or she wishes to play in a particular time slot. As another example, people may be directed to a web site via which they may choose one or more time slots using, for example, a general purpose computer. The player may select time slots that form a contiguous segment of time or non-contiguous segments of time.

After the player has chosen one or more time slots, the tournament server 46 may receive a request to purchase the right to play in the tournament during the selected time slots (block 308). For example, the gaming unit 20 on which a player has selected one or more time slots may transmit a message to the tournament server 46 indicating that the player wishes to purchase the right to play in the tournament during the selected time slots.

At block 312, the tournament server 46 may determine the fee corresponding to the selected time slots. This may comprise calculating the fee and/or looking up a fee or fees associated with each selected time slot in a look-up table or database. The fee may be based on one or more of the number of selected time slots, the particular time slots selected, the aggregate amount of time corresponding to the selected time slots, etc. In one specific example, the fee may be based on a ratio of the aggregate amount of selected time and the total tournament time. For instance, if a player selects time slot(s) that, in the aggregate, correspond to half of the total tournament time, the fee for those selected time slot(s) may be one half the fee for playing for the entire tournament time. Many other types of fee arrangements may be used as well. For example, time slots may be priced according to their relative position within the total tournament time. For instance, time slots at the beginning of the tournament may be cheaper than time slots at the end of the tournament As another example, if the tournament comprises several rounds, a player may be given the option to skip one or more of the initial rounds by paying an increased fee for time slot(s) in a subsequent round.

At block 316, the tournament server 46 may transmit a request for payment to the gaming unit 20. The request may include an indication of the amount of payment required to purchase the selected time slots. At block 320, the tournament server 46 may receive an indication that the requested payment was received. For example, the gaming unit 20 may transmit to the tournament server 46 an indication that the player submitted the requested payment to the gaming unit 20 by, for example, inserting currency, deducting value from a smart card, authorizing a charge to a credit card or debit card, authorizing a deduction from an account, etc. Additionally or alternatively, the gaming unit 20 may transmit to the tournament server 46 information for charging the fee to a credit card or debit card, for deducting the fee from an account, etc.

At block 324, an "admission ticket" may be generated. The "admission ticket" may comprise information for allowing the player entry into the tournament. Such information may be stored on a computer readable medium, printed on paper, etc. The "admission ticket" may include one or more identifiers (the identifier). The identifier may be, for example, indicative of the particular time slot(s) purchased by the player, the particular tournament, the player, etc. The "admission ticket" may include additional information such as the fee paid by the player, the player's name, the date of the tournament, the time of the tournament, etc.

At block 328, the "admission ticket" may be sent to the player at block 328. For example, the tournament server 46 may transmit the "admission ticket" to the gaming unit 20. Additionally, or alternatively, the "admission ticket" may be sent to an e-mail associated with the player, printed on paper and mailed to the player, etc.

If the player plans to play in the tournament using a different gaming unit 20 than the player used to enroll, the player may use the "admission ticket" to be admitted to the tournament using the different gaming unit, as will be described in more detail below. Similarly, if the player has enrolled far in advance of the tournament, the player may use the "admission ticket" to be admitted to the tournament at an appropriate time.

FIG. 6B is a flow diagram illustrating one embodiment of a method that may be implemented by the tournament server 46 of FIG. 1. The method 330 is for facilitating play of a tournament.

At block 332, the tournament server 46 may receive a request to be admitted to the tournament from a gaming unit 20. The request may include information from an "admission ticket" generated at block 324 of FIG. 6A. For example, the request may include an identifier indicative of, for example, the particular time slot(s) purchased by the player, the particular tournament, the player, etc.

At block 334, the tournament server 46 may enable the gaming unit 20 for tournament play at the appropriate time. For example, if the purchased time slot(s) represent a contiguous segment of time, the tournament server 46 may enable the gaming unit 20 at the beginning of that time segment. If a plurality of time slots were purchased that form a plurality of non-contiguous time segments, the tournament server 46 may enable the gaming unit 20 at the beginning of each of those time segments. The gaming unit 20 may be enabled in a manner similar to those described with reference to block 270 of FIG. 5. In some embodiments, the gaming unit 20 may enable itself at the appropriate time.

At block 336, the tournament server 46 may disable the gaming unit 20 for tournament play at the appropriate time. For example, if the purchased time slot(s) represent a contiguous segment of time, the tournament server 46 may disable the gaming unit 20 at the end of that time segment. If a plurality of time slots were purchased that form a plurality of non-contiguous time segments, the tournament server 46 may disable the gaming unit 20 at the end of each of those time segments. Additionally, the tournament server 46 may disable the gaming unit 20 if the tournament ends prior to the end of a purchased time slot (e.g., if another player has already won the tournament). The gaming unit 20 may be disabled in a manner similar to those described with reference to block 274 of FIG. 5. In some embodiments, the gaming unit 20 may disable itself at the appropriate time.

FIG. 7A is a flow diagram illustrating one embodiment of an enrollment method that may be implemented by a gaming unit 20 of FIG. 1. In this embodiment, the tournament time may be subdivided into a plurality of time slots, and a player may choose to join the tournament for one or more of these time slots. Each time slot may be non-overlapping and/or overlapping in time with other time slots. Additionally, all the time slots may be of the same duration or of differing durations.

At block 344 of the method 340, a player may choose one or more time slots in which to play in the tournament. For example, the tournament server 46 may transmit information to the gaming units 20 that indicates available time slots in a manner similar to that described with reference to block 304 of FIG. 6. A gaming unit 20 may display indications of the available time slots on a display so that a player can view the available time slots. As one example, for a gaming unit 20 located in a casino, the player may select a particular button, an area of a touch screen, etc., to select a particular time slot. As another example, the player may choose one or more time slots via a web site using, for example, a general purpose computer.

After the player selects the time slot(s), the gaming unit 20 may send a request to purchase the right to play in the tournament during the selected time slot(s) (block 348). For example, the gaming unit 20 on which a player has selected one or more time slots may transmit a message to the tournament server 46 indicating that the player wishes to purchase the right to play in the tournament during the selected time slots.

At block 352, the gaming unit 20 may receive an indication of the fee required to participate during the requested time slot(s). An indication of the required fee may then be displayed to the player. At block 356, the gaming unit 20 may receive from the player payment of the fee. For example, the player may submit the requested payment to the gaming unit 20 by, for example, inserting currency, authorizing deduction of value from a smart card, authorizing a charge to a credit card or debit card, authorizing a deduction from an account, etc.

At block 358, the gaming unit 20 may-transmit to the tournament server 46 an indication that the requested payment was received. For example, the gaming unit 20 may transmit to the tournament server 46 an indication that the player submitted the requested payment to the gaming unit 20. Additionally or alternatively, the gaming unit 20 may transmit to the tournament server 46 information that the tournament server 46 may then use to, for example, charge the fee to a credit card or debit card, deduct the fee from an account, etc.

At block 360, the gaming unit 20 may receive the "admission ticket" from the server, and at block 362, the "admission ticket" may be printed on, for example, a piece of paper. The printed "admission ticket" may include a bar code, or the like, representative of information needed to gain admission to the tournament. In other embodiments, the "admission ticket" may be stored on a smart card, player tracking card, etc.

FIG. 7B is a flow diagram illustrating one embodiment of a method that may be implemented by a gaming unit 20 of FIG. 1. At block 368, the gaming unit 20 may receive an admission ticket from the player. For example, the player may insert a printed "admission ticket" into a ticket reader of the gaming unit 20. As another example, the player may insert a smart card into a card reader, where the "admission ticket" has been stored on the smart card. As yet another example, the player may enter (using, for example, a keyboard, keypad, touch screen, etc., of the gaming unit 20) an identifier that will allow the player to be admitted to the tournament.

At block 370, the gaming unit 20 may send to the tournament server 46 a request for admission to the tournament. The request may include an identifier or identifiers indicative of for example, the particular time slot(s) purchased by the player, the particular tournament, the player, etc.

At block 372, the gaming unit 20 may receive an enable signal from the tournament server 46 that enables the gaming unit 20 for tournament play at the appropriate time. For example, if the purchased time slot(s) represent a contiguous segment of time, the gaming unit 20 may be enabled at the beginning of that time segment. If a plurality of time slots were purchased that form a plurality of non-contiguous time segments, the gaming unit 20 may enabled at the beginning of each of those time segments. The gaming unit 20 may be enabled in a manner similar to those described with reference to block 270 of FIG. 5. In some embodiments, the gaming unit 20 may enable itself at the appropriate time.

While enabled, the gaming unit 20 may permit the player to play games in the tournament (block 374). Games that may be played in a tournament may include casino games such as poker, keno, blackjack, slots, bingo, pachinko, card games, or any games of chance and the like. Other games that may be played include trivia games, user-controlled reel-stop slot games, Family Feud®, Jeopardy®, Wheel-of-Fortune®, etc. The games may be played in single player mode, multiplayer mode, and/or team mode.

At block 376, the gaming unit 20 may receive a disable signal from the tournament server 46 that disables the gaming unit 20 for tournament play at the appropriate time. For example, if the purchased time slot(s) represent a contiguous segment of time, the gaming unit 20 may be disabled at the end of that time segment. If a plurality of time slots were purchased that form a plurality of non-contiguous time segments, the gaming unit 20 may be disabled at the end of each of those time segments. Additionally, the gaming unit 20 may be disabled if the tournament ends prior to the end of a purchased time slot (e.g., if another player has already won the tournament). The gaming unit 20 may be disabled in a manner similar to those described with reference to block 274 of FIG. 5. In some embodiments, the gaming unit 20 may disable itself at the appropriate time.

At block 378, the gaming unit 20 may report the player's score to the tournament server 46. The score may be reported after the player has finished playing in the tournament (e.g., the player's final score). Additionally, the player's current score may be reported once, several times, or numerous times, during the player's participation in tournament. Using this information, the tournament server 46 may be able to provide tournament players with current standings while the tournament is in progress.

If a winning player had played for less than the total tournament time, the winning player may be awarded a less valuable prize. For example, if the prize were $1,000, a player playing for 50% of the total time could win $500. In other embodiments, a player may be eligible for the full prize even if playing for less than the total tournament time.

In some embodiments, an "admission ticket" may not be needed. For example, if the player is to remain on the same gaming unit 20 for both enrolling and playing in the tournament, generation of an "admission ticket" may be omitted. Thus, in some embodiments blocks 324 and 328 of FIG. 6A, block 332 of FIG. 6B, blocks 360 and 362 of FIG. 7A, and blocks 368 and 370 of FIG. 7B may be omitted if desired. In these embodiments, the methods 300 and 330 of FIGS. 6A and 6B may be combined into a single method where the method proceeds from block 320 to block 334. Similarly, the methods 340 and 366 of FIGS. 7A and 7B may be combined into a single method where the method proceeds from block 358 to block 372.

"Flex-Time" Tournament Participation

FIG. 8A is a flow diagram illustrating one embodiment of an enrollment method that may be implemented by the tournament server 46 of FIG. 1. In this embodiment, a player may join the tournament after the tournament has already begun. If the tournament has already begun, the player may be charged a reduced fee.

At block 384 of the method 380, the tournament server 46 may receive a request to purchase the right to play in the tournament. For example, the gaming unit 20 on which a player wants to play may transmit a message to the tournament server 46 indicating that the player wishes to purchase the right to play in the tournament.

At block 388, the tournament server 46 may determine the fee to be charged to the player for playing in the tournament. This may comprise calculating the fee and/or looking up a fee in a look-up table or database. The fee may be based on, for example, the time at which the request was received (block 384) as compared to the time at which the tournament is to start or has started. In one specific example, if the request is received prior to the tournament starting, the fee may be the fee for playing for the entire tournament time. If the request is received after the tournament starting, the fee may be based on a time left in the tournament as compared with the total tournament time. For instance, if a player chooses to join the tournament at the half way mark, the fee may be one half the fee for playing for the entire tournament time. In determining the fee, delays that will occur before the player actually may begin playing may be taken into account. For example, the player may be allowed to start playing 5 minutes after the request is received (block 384), and the fee may be based on that start time rather than when the request was received.

At block 392, the tournament server 46 may transmit a request for payment to the gaming unit 20. The request may include an indication of the amount of payment required to buy in to the tournament. At block 396, the tournament server 46 may receive an indication that the requested payment was received. For example, the gaming unit 20 may transmit to the tournament server 46 an indication that the player submitted the requested payment to the gaming unit 20 by, for example, inserting currency, deducting value from a smart card, authorizing a charge to a credit card or debit card, authorizing a deduction from an account, etc. Additionally or alternatively, the gaming unit 20 may transmit to the tournament server 46 information for charging the fee to a credit card or debit card, for deducting the fee from an account, etc.

At block 398, an "admission ticket" may be generated similar to the "admission ticket" described with reference to FIGS. 6A, 6B, 7A, and 7B. The "admission ticket" may include one or more identifiers that may be, for example, indicative of the particular time at which the player may start playing, the particular tournament, the player, etc. At block 400, the "admission ticket" may be sent to the player in a same or similar manner as described with reference to FIG. 6A.

FIG. 8B is a flow diagram illustrating one embodiment of a method that may be implemented by the tournament server 46 of FIG. 1. At block 406 of the method 404, a request for admission may be received in a same or similar manner as described with reference to FIG. 6B.

At block 408, the tournament server 46 may enable the gaming unit 20 for tournament play at the appropriate time. For example, if the indication of payment was received prior to the start of the tournament, and the player paid a fee corresponding to playing for the full tournament time, the tournament server 46 may wait to enable the gaming unit 20 substantially at the same time as the beginning of the tournament. As another example, the tournament server 46 may enable the gaming unit 20 at a time that corresponds to the amount paid by the player. The gaming unit 20 may be enabled in a manner similar to those described with reference to block 270 of FIG. 5. In some embodiments, the gaming unit 20 may enable itself at the appropriate time.

At block 410, the tournament server 46 may disable the gaming unit 20 for tournament play at the appropriate time. For example, the tournament server 46 may disable the gaming unit 20 when the tournament ends (e.g., at the end of the tournament time, if another player has already won the tournament, etc.). The gaming unit 20 may be disabled in a manner similar to those described with reference to block 274 of FIG. 5. In some embodiments, the gaming unit 20 may disable itself at the appropriate time.

FIG. 9A is a flow diagram illustrating one embodiment of an enrollment method that may be implemented by a gaming unit 20 of FIG. 1. In this embodiment, a player may join the tournament after the tournament has already begun. If the tournament has already begun, the player may be charged a reduced fee.

At block 424 of the method 420, the gaming unit 20 may send a request to purchase the right to play in the tournament to the tournament server. At block 428, the gaming unit 20 may receive an indication of the fee required to play in the tournament. An indication of the required fee may then be displayed to the player. At block 432, the gaming unit 20 may receive from the player payment of the fee. For example, the player may submit the requested payment to the gaming unit 20 in a manner similar to that described with reference to block 356 of FIG. 7.

At block 436, the gaming unit 20 may transmit to the tournament server 46 an indication that the requested payment was received. For example, the gaming unit 20 may transmit to the tournament server 46 an indication that the player submitted the requested payment to the gaming unit 20. Additionally or alternatively, the gaming unit 20 may transmit to the tournament server 46 information that the tournament server 46 may then use to, for example, charge the fee to a credit card or debit card, deduct the fee from an account, etc.

At blocks 438 and 440, the gaming unit 20 may receive and print an "admission ticket" in the same or similar manner as described with reference to FIG. 7A.

FIG. 9B is a flow diagram illustrating one embodiment of a method that may be implemented by a gaming unit 20 of FIG. 1. At blocks 446 and 448, the gaming unit 20 may receive and "admission ticket" from the player and may send a request for admission to the tournament in a same or similar manner as described with reference to FIG. 7B.

At block 450, the gaming unit 20 may receive an enable signal from the tournament server 46 that enables the gaming unit 20 for tournament play at the appropriate time. The gaming unit 20 may be enabled in a manner similar to those described with reference to block 270 of FIG. 5. In some embodiments, the gaming unit 20 may enable itself at the appropriate time. While enabled, the gaming unit 20 may permit the player to play games in the tournament (block 452).

At block 454, the gaming unit 20 may receive a disable signal from the tournament server 46 that disables the gaming unit 20 for tournament play at the appropriate time. The gaming unit 20 may be disabled in a manner similar to those described with reference to block 274 of FIG. 5. In some embodiments, the gaming unit 20 may disable itself at the appropriate time.

At block 456, the gaming unit 20 may report the player's score to the tournament server 46. The score may be reported after the player has finished playing in the tournament (e.g., the player's final score). Additionally, the player's current score may be reported once, several times, or numerous times, during the player's participation in tournament.

In some embodiments, a player may be allowed to specify a start time and, optionally, an end time for playing in the tournament. In these embodiments, the fee could be determined based on, for example, one or more of the amount of time between the start time and the end of the tournament or the end time chosen by the player, the chosen start time as compared to the start time of the tournament, etc. If an end time is chosen, the gaming unit 20 could be disabled at the chosen end time.

If a winning player had played for less than the total tournament time, the winning player may be awarded a less valuable prize. For example, if the prize were $1,000, a player playing for 50% of the total time could win $500. In other embodiments, a player may be eligible for the full prize even if playing for less than the total tournament time.

Similar to FIGS. 6A, 6B, 7A, and 7B, an "admission ticket" may not be needed. Thus, in these embodiments, the methods 380 and 404 of FIGS. 8A and 8B may be combined into a single method where the method proceeds from block 396 to block 408. Similarly, the methods 420 and 444 of FIGS. 9A and 9B may be combined into a single method where the method proceeds from block 436 to block 450.

"Purchased-Time" Tournament Participation

In a variation of the embodiments described with reference to FIGS. 8A, 8B, 9A and 9B, the tournament could be scheduled to run over a relatively long period of time, such as a week, but where players generally participate for much shorter periods, such as one hour. In these variations, the fee may be based on, for example, the amount of time the player desires to participate in the tournament. Further, the gaming unit 20 could be disabled after the player had participated in the tournament for the purchased amount of time. The player could utilize his or her purchased tournament time in one shot, or the player could utilize the purchased tournament time over several discrete intervals. For example, if the player purchased one hour of playing time, the player could play for 15-minute intervals over several days. At the end of the tournament time, the winning players (if any) could be announced.

In such a tournament, a standard playing time may be set prior to the tournament beginning. As just one specific example, if the total tournament time were 3 days, a standard time might be 1 hour. If a winning player had played for more or less than the standard playing time, the winning player may be awarded a more or less valuable prize. For example, if the prize were $1,000, a player playing for 50% of the standard time could win $500. In other embodiments, a player may be eligible for the full prize even if playing for more or less than the standard time.

"Compressed-Time" Tournament Participation

FIG. 10A is a flow diagram illustrating one embodiment of an enrollment method that may be implemented by the tournament server 46 of FIG. 1. In this embodiment (method 460), a player may join the tournament after the tournament has already begun. If the tournament has already begun, the player may be charged the same fee as someone who has joined the tournament for the full tournament time. For each game played by the player during the tournament, however, the player may receive more points for a given game outcome as compared with a player who plays for the full tournament time. For example, each game played by a player in the tournament may be initiated with a predetermined "credits-in" amount, where the points awarded for a given game outcome is based on the credits-in amount. For example, if the credits-in amount is doubled, the points awarded for a given game outcome may be doubled. Thus, if a player joins the tournament after it has already started (but pays the full tournament fee), each game played by the player may be initiated with a higher credits-in amount as compared with a player that started at the beginning of the tournament.

The tournament server 46 may receive a request to purchase the right to play in the tournament (block 464). For example, the gaming unit 20 on which a player wants to play may transmit a message to the tournament server 46 indicating that the player wishes to purchase the right to play in the tournament.

At block 468, the tournament server 46 may determine the fee to be charged to the player for playing in the tournament. This may comprise calculating the fee and/or looking up a fee in a look-up table or database.

At block 472, the tournament server 46 may transmit a request for payment to the gaming unit 20. The request may include an indication of the amount of payment required to buy in to the tournament. At block 476, the tournament server 46 may receive an indication that the requested payment was received. Receiving the indication may occur in a manner similar to that described with reference to block 396 of FIG. 8.

At block 480, the tournament server 46 may determine the credits-in value with which games played by the player will be initiated. This may comprise calculating the credits-in value and/or looking up a credits-in value in a look-up table or database. The credits-in value may be based on, for example, the time at which the request was received (block 464) as compared to the time at which the tournament is to start or has started. In one specific example, if the request is received prior to the tournament starting, the credits-in value may be the credits-in value for playing the entire tournament time. If the request is received after the tournament starting, the credits-in value may be based on a ratio of the time left in the tournament and the total tournament time. For instance, if a player chooses to join the tournament at the half way mark, the credits-in value may be double the credits-in value for playing for the entire tournament time. In determining the credits-in value, delays that will occur before the player actually may begin playing may be taken into account. For example, the player may be allowed to start playing 5 minutes after the request is received (block 464), and the credits-in value may be based on that start time rather than when the request was received.

At block 482, an "admission ticket" may be generated similar to the "admission ticket" described with reference to FIGS. 6A, 6B, 7A, and 7B. The "admission ticket" may include one or more identifiers that may be, for example, indicative of the particular time at which the player may start playing, the credits-in value determined at block 480, the particular tournament, the player, etc. At block 484, the "admission ticket" may be sent to the player in a same or similar manner as described with reference to FIG. 6A.

FIG. 10B is a flow diagram illustrating one embodiment of a method that may be implemented by the tournament server 46 of FIG. 1 At block 490 of the method 488, a request for admission may be received in a same or similar manner as described with reference to FIG. 6B. At block 492, an indication of the credits-in value determined at block 480 may be sent to the gaming unit 20.

At block 494, the tournament server 46 may enable the gaming unit 20 for tournament play at the appropriate time. For example, if the indication of payment was received prior to the start of the tournament, the tournament server 46 may enable the gaming unit 20 substantially at the same time as the beginning of the tournament. Also, if the tournament has already started, the tournament server 46 may enable the gaming unit 20 shortly after receiving the indication of payment (block 476). As another example, the tournament server 46 may enable the gaming unit 20 at a time that corresponds to the credits-in amount determined at block 480. The gaming unit 20 may be enabled in a manner similar to those described with reference to block 270 of FIG. 5. In some embodiments, the gaming unit 20 may enable itself at the appropriate time.

At block 496, the tournament server 46 may disable the gaming unit 20 for tournament play at the appropriate time. For example, the tournament server 46 may disable the gaming unit 20 when the tournament ends (e.g., at the end of the tournament time, if another player has already won the tournament, etc.). The gaming unit 20 may be disabled in a manner similar to those described with reference to block 274 of FIG. 5. In some embodiments, the gaming unit 20 may disable itself at the appropriate time.

Figure 11A:
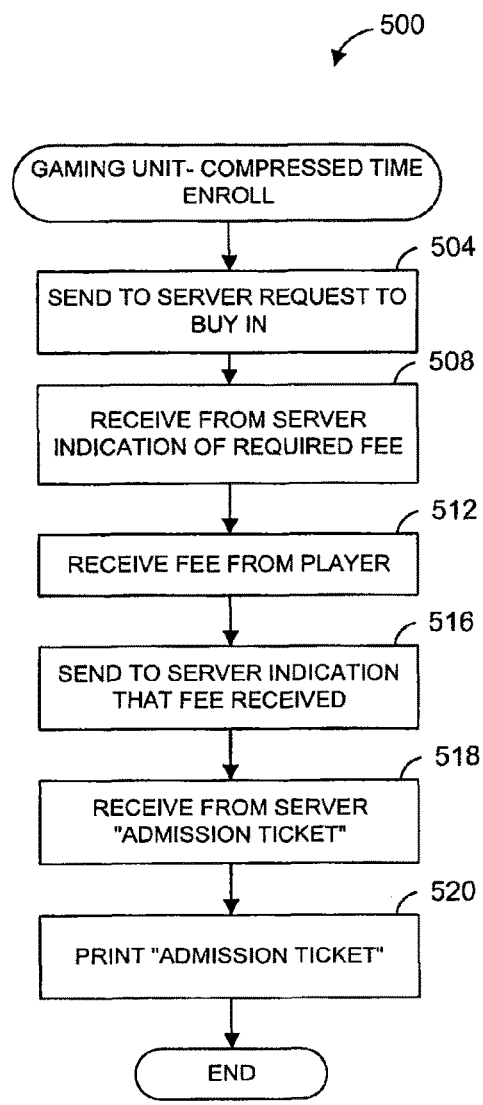
FIG. 11A is a flowchart of yet another embodiment of a tournament enrollment routine that may be performed during operation of one or more of the gaming units.

FIG. 11A is a flow diagram illustrating one embodiment of an enrollment method that may be implemented by a gaming unit 20 of FIG. 1. In this embodiment, a player may join the tournament after the tournament has already begun. If the tournament has already begun, each game the player plays may be initiated with a higher credits-in value.

At block 504 of the method 500, the gaming unit 20 may send a request to purchase the right to play in the tournament to the tournament server. At block 508, the gaming unit 20 may receive an indication of the fee required to play in the tournament. An indication of the required fee may then be displayed to the player. At block 512, the gaming unit 20 may receive from the player payment of the fee. For example, the player may submit the requested payment to the gaming unit 20 in manner similar to that described with reference to block 356 of FIG. 7.

At block 516, the gaming unit 20 may transmit to the tournament server 46 an indication that the requested payment was received. For example, the gaming unit 20 may transmit to the tournament server 46 an indication that the player submitted the requested payment to the gaming unit 20. Additionally or alternatively, the gaming unit 20 may transmit to the tournament server 46 information that the tournament server 46 may then use to, for example, charge the fee to a credit card or debit card, deduct the fee from an account, etc.

At blocks 518 and 520, the gaming unit 20 may receive and print an "admission ticket" in the same or similar manner as described with reference to FIG. 7A.

Figure 11B:
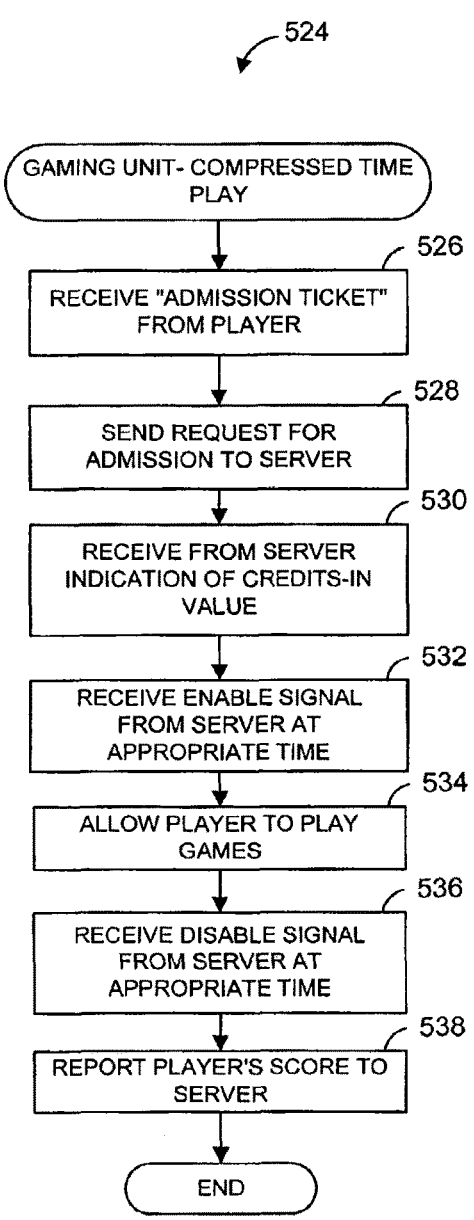
FIG. 11B is a flowchart of yet another embodiment of a tournament routine that may be performed during operation of one or more of the gaming units.

FIG. 11B is a flow diagram illustrating one embodiment of a method that may be implemented by a gaming unit 20 of FIG. 1. At blocks 526 and 528, the gaming unit 20 may receive and "admission ticket" from the player and may send a request for admission to the tournament in a same or similar manner as described with reference to FIG. 7B.

At block 530, the gaming unit 20 may receive an indication of a credits-in value from the tournament server 46. The gaming unit 20 may initiate each game played by the player with the received credits-in value.

At block 532, the gaming unit 20 may receive an enable signal from the tournament server 46 that enables the gaming unit 20 for tournament play at the appropriate time. The gaming unit 20 may be enabled in a manner similar to those described with reference to block 270 of FIG. 5. In some embodiments, the gaming unit 20 may enable itself at the appropriate time. While enabled, the gaming unit 20 may permit the player to play games in the tournament (block 534).

At block 536, the gaming unit 20 may receive a disable signal from the tournament server 46 that disables the gaming unit 20 for tournament play at the appropriate time. The gaming unit 20 may be disabled in a manner similar to those described with reference to block 274 of FIG. 5. In some embodiments, the gaming unit 20 may disable itself at the appropriate time.

At block 538, the gaming unit 20 may report the player's score to the tournament server 46. The score may be reported after the player has finished playing in the tournament (e.g., the player's final score). Additionally, the player's current score may be reported once, several times, or numerous times, during the player's participation in tournament.

In some embodiments, a player may be allowed to specify a start time and, optionally, an end time for playing in the tournament. In these embodiments, the credits-in value could be determined based on, for example, one or more of the amount of time between the start time and the end of the tournament or the end time chosen by the player, the chosen start time as compared to the start time of the tournament, etc. If an end time is chosen, the gaming unit 20 could be disabled at the chosen end time.

Additionally, aspects of the embodiments described with reference to FIGS. 10 and 11 could be combined with aspects of the embodiments described with reference to FIGS. 6 and 7. For example, if a player chooses to play in a particular time slot or slots, the player could be charged a full tournament fee, but play each game with a higher credits-in value.

In other embodiments, the score awarded for a particular outcome of a game could be adjusted in another manner than by varying a credits-in value. For example, game software, firmware, and/or hardware could provide a parameter that could be adjusted to vary the scores awarded for particular outcomes of a game.

Similar to FIGS. 6A, 6B, 7A, and 7B, an "admission ticket" may not be needed. Thus, in these embodiments, the methods 460 and 488 of FIGS. 10A and 10B may be combined into a single method where the method proceeds from block 780 to block 492. Similarly, the methods 500 and 524 of FIGS. 11A and 1B may be combined into a single method where the method proceeds from block 516 to block 530.

Tournament Participation Using Software Agent

Figure 12:
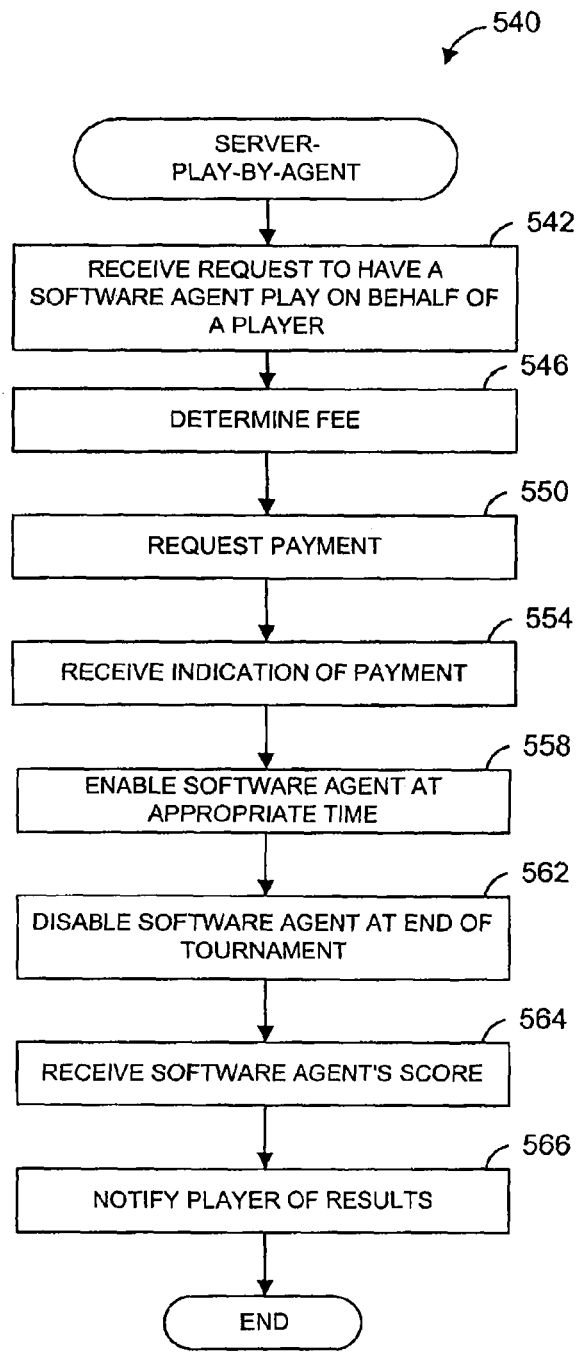
FIG. 12 is a flowchart of still another embodiment of a tournament routine that may be performed during operation of the tournament server.

FIG. 12 is a flow diagram illustrating one embodiment of a method that may be implemented by the tournament server 46 of FIG. 1. In this embodiment (method 540), a player may direct a software agent to play in a tournament on behalf of the player. Thus, the player may participate in the tournament without having to devote substantial amounts of his or her time to actual play. After the tournament ends, for example, the player may check to see, or may be notified, whether he or she won.

The tournament server 46 may receive a request from a player to play in the tournament via a software agent (block 542). For example, a gaming unit 20 operated by a player may transmit a message to the tournament server 46 indicating that the player wishes to play in the tournament via a software agent.

At block 546, the tournament server 46 may determine the fee to be charged to the player for playing in the tournament. This may comprise, for example, calculating the fee and/or looking up a fee in a look-up table or database.

At block 550, the tournament server 46 may transmit a request for payment to the gaming unit 20. The request may include an indication of the amount of payment required to buy in to the tournament. At block 554, the tournament server 46 may receive an indication that the requested payment was received. Receiving the indication may occur in a manner similar to that described with reference to block 396 of FIG. 8.

At block 558, the tournament server 46 may enable a software agent to play in the tournament on behalf of the player, starting at the appropriate time. For example, if the indication of payment was received prior to the start of the tournament, the tournament server 46 may wait to enable the software agent substantially at the same time as the beginning of the tournament. Also, if the tournament has already started, the tournament server 46 may enable the software agent shortly after receiving the indication of payment (block 554). In some embodiments, the device that implements the software agent, and/or the software agent itself, may be provided with an indication of the appropriate time at which to start playing on behalf of the player.

The software agent may be enabled by, for example, sending a software agent enable signal to the device that is implementing the software agent at substantially the same time as the software agent is to be enabled. The software agent enable signal may include, for instance, an analog or digital signal, a digital code, a software command, etc. Receiving the enable signal may cause a subroutine to be called, a program to be launched, an object to be executed, etc. In embodiments where the tournament server 46 implements the software agent, software agent may be enabled by, for example, a software routine call, a launch command, etc., issued by software running on the tournament server 46.

In some embodiments, the software agent may already be running, but waiting for a command to start playing games. In these embodiments, the software agent may begin playing games upon detection of the enable signal. In other embodiments, the software agent may be provided with an indication of the time at which to begin playing games. Then, the software agent may monitor a clock or timer to determine when to start playing games.

The software agent may be implemented by a proxy computer such as the tournament server 46, by one of the gaming units 20, or by some other device. Once enabled and at the appropriate time (e.g., at the beginning of the tournament), the software agent may begin playing games and accumulating a tournament score on behalf of the player.

The software agent may be configured so as not to provide an advantage over those playing in the tournament manually. For example, if the game played in the tournament is a slot game, the rate at which the software agent selects the "Spin" button may be based on the rates of other players in the tournament, the rates of players in recent tournaments, the rate of the player on whose behalf the software agent is to play, etc. For instance, the rate at which the software agent selects the "Spin" button may be based on the average or median rate of one or more other players, or of the player requesting the software agent (e.g., based on the player's past play).

Additionally, the player may be permitted to configure the software agent. For example, the player may be permitted to select a speed, a style, etc., according to which the software agent will play. As one example, the player may be able to configure the software agent to play according to a level of risk taking (e.g., high, moderate, low). As another example, if the game played in the tournament can involve making one or more choices, the player may configure the software agent to always select certain choices, be more likely to make certain choices in the aggregate, etc. As yet another example, the player may be able to select a speed at which the software agent is to play.

In some embodiments, a player may be able to select a software agent from a plurality of templates, where each template may provide a different speed or style of play. Additionally, each template may correspond to an imaginary or real player. For example, some or all of the templates may correspond to famous players, where the software agent associated with a famous player is configured to generally emulate the style of the famous player.

At block 562, the tournament server 46 may disable the software agent at the appropriate time. For example, the tournament server 46 may disable the software agent when the tournament ends (e.g., at the end of the tournament time, if another player has already won the tournament, etc.). The gaming unit 20 may be disabled in a manner similar to those described with reference to block 558. In some embodiments, the software agent may disable itself at the appropriate time if, for example, it is provided with an indication of when it should disable itself.

At block 564, the tournament server 46 may receive the score of the software agent. The score may be received once after the end of the tournament. A current score may also be received once, several, or numerous times during the tournament. At block 566, the tournament server 46 may notify the player of the results of the tournament. The results may include the software agent's score. In embodiments in which the tournament server 46 does not implement the software agent, the software agent's score may be provided by the device that did implement the software agent. The player may be notified in a number of ways. For example, the results may be sent to a gaming unit 20 associated with the player, sent via email, sent via an instant messaging system, via a text message, posted on a web page, printed on paper and sent to a postal address, etc. Additionally, during the tournament, the software agent's score as well as tournament standings may be provided to the player once, several, or numerous times.

Figure 13:
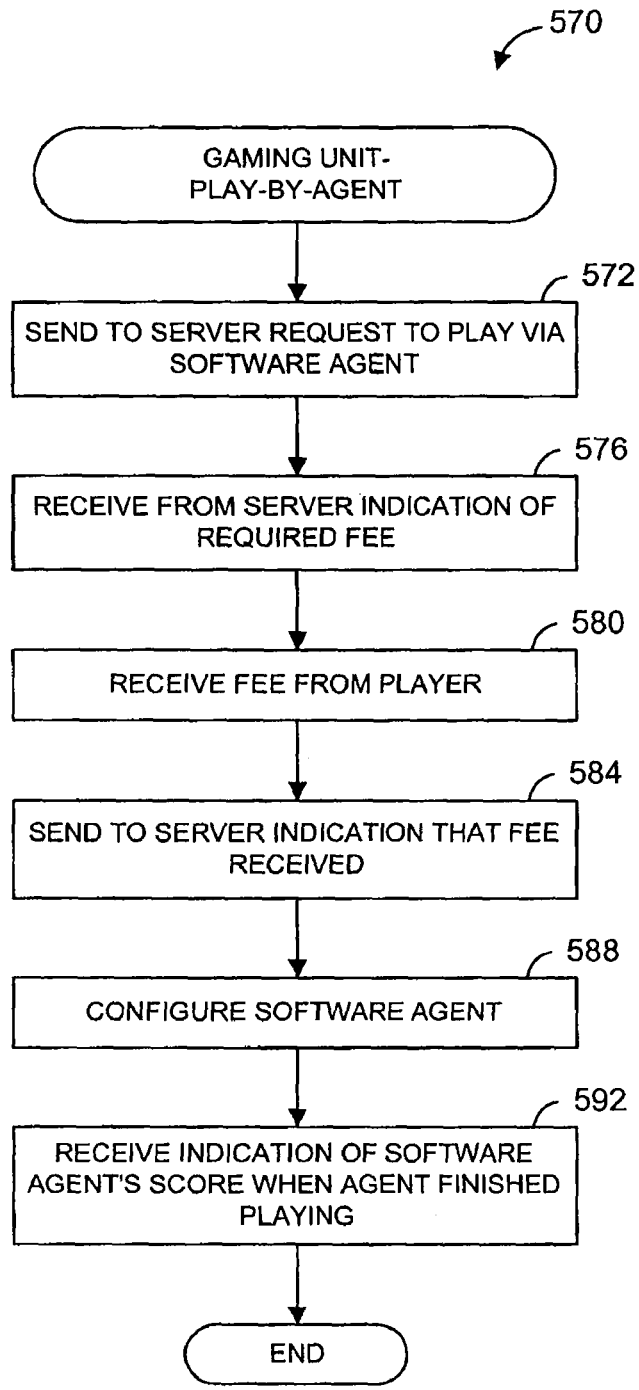
FIG. 13 is a flowchart of still another embodiment of a tournament routine that may be performed during operation of one or more of the gaming units.

FIG. 13 is a flow diagram illustrating one embodiment of a method that may be implemented by a gaming unit 20 of FIG. 1. In this embodiment (method 570), a player may join the tournament by appointing a software agent to play in the tournament on his or her behalf.

At block 572, the gaming unit 20 may send a request by the player to have a software agent play on the player's behalf. For example, the player may select a button, area of a screen, button or link on a website, etc., that indicates the player would like to use a software agent to play in the tournament.

At block 576, the gaming unit 20 may receive an indication of the fee required. An indication of the required fee may then be displayed to the player. At block 580, the gaming unit 20 may receive from the player payment of the fee. For example, the player may submit the requested payment to the gaming unit 20 in manner similar to that described with reference to block 356 of FIG. 7. At block 584, the gaming unit 20 may transmit to the tournament server 46 an indication that the requested payment was received. For example, the gaming unit 20 may transmit to the tournament server 46 an indication that the player submitted the requested payment to the gaming unit 20. Additionally or alternatively, the gaming unit 20 may transmit to the tournament server 46 information that the tournament server 46 may then use to, for example, charge the fee to a credit card or debit card, deduct the fee from an account, etc.

At block 588, the player may optionally configure the software agent, via the gaming unit 20, in a manner similar to that described above with reference to FIG. 12. For example, the player may configure the software agent to play according to a certain style or level of risk taking. As another example, the player may select a template corresponding to a playing speed and/or style, a famous player, an imaginary player, etc.

At block 592, the gaming unit 20 may receive an indication of the software agent's score in the tournament. The score may be received after the software agent has finished playing in the tournament (e.g., the software agent's final score). Additionally, the software agent's current score may be reported once, several times, or numerous times, during the software agent's participation in tournament. The indication of the software agent's score may be received from the tournament server 46 or from the device that implements the software agent.

Aspects of the embodiments described with reference to FIGS. 12 and 13 may be combined with aspects of the embodiments described with reference to FIGS. 6-11. For example, a player could utilize a software agent to play for a subset of the tournament time and pay a reduced fee, have increased credits-in per game, etc.

"Team Relay" Tournament Participation

FIGS. 14-17 are flow diagrams of embodiments of methods related to team participation in a tournament. In these embodiments, a plurality of players may join the tournament as a team. Each player may play a different segment of the tournament time. For example, four players could decide to divide a tournament time into four segments, and each player could play in one of the segments. Additionally, each player could contribute to the team's score. The fee for the tournament, as well as any prize, could be apportioned among the four players.

Figure 14:
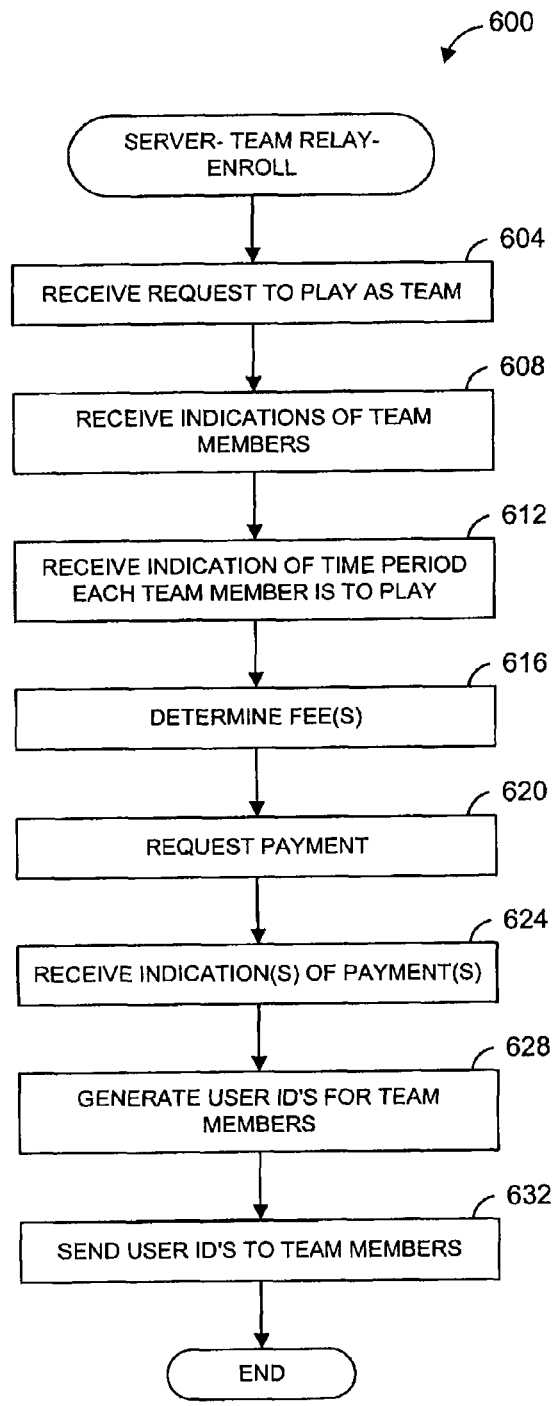
FIG. 14 is a flowchart of an embodiment of a team enrollment routine that may be performed during operation of the tournament server.

FIG. 14 is a flow diagram illustrating one embodiment of a method that may be implemented by the tournament server 46 of FIG. 1. The method 600 may be used to enroll players as a team in a tournament.

At block 604, the tournament server 46 may receive a request from a player to play as a team. The request may be received from a gaming unit 20, for example. At block 608, the tournament server 46 may receive indications of the team members of which the team is to be comprised. For each team member, the indications may include one or more indicators such as a name, a nickname, an e-mail address, etc.

These indications may be received from one gaming unit 20 or a plurality of gaming units 20. At block 612, the tournament server 46 may receive indications of the time period each team member is to play. The indications may include an indication of start times and end times of segments, particular time slots, etc.

The information receive at blocks 604, 608, and 612 may be entered by one or more of the team players via one or more gaming units. For example, the request received at block 604 may be generated by a gaming unit 20 upon the selection of a button, link, area of a display screen, etc., associated with choosing to play as a relay team. Additionally, the request could be received via interaction with a web site, where the web site includes a button, link, web page, etc., associated with choosing to play as a relay team. With regard to block 608, a gaming unit 20, web site, etc., could prompt one or more players to input indications of the team members. Also, with regard to block 612, a gaming unit 20, web site, etc., could prompt one or more players to input indications of the time periods each team member is to play.

At block 616, the tournament server 46 may determine the fee associated with playing in the tournament as a relay team. The fee may be the same as would be charged a single player playing for the same amount of time, or could be different. Additionally, the tournament server 46 may determine the fee due from the team as a whole and/or the fee due from each team member. For instance, each team member could be charged an equal share of the total fee. Alternatively, the fee due from a team member could be based on the percentage of the tournament time played by the team member.

At block 620, the tournament server 46 may request payment of the fee(s) determined at block 616. The tournament server 46 may send a request to one team member, all of the team members, a third party, etc. For example, the tournament server 46 may send information to a gaming unit 20 at which a team player is present that causes the gaming unit 20 to prompt the player to submit the required fee. As another example, the tournament server 46 may send a web page that prompts a player to submit the fee. As yet another example, the tournament server 46 may send an e-mail that prompts a player to submit the fee. At block 624, the tournament server 64 may receive an indication or indications that the requested payment or payments were received. Receiving the indication or indications may occur in a manner similar to that described with reference to block 320 of FIG. 6.

At block 628, the tournament server 46 may generate a respective user identifier for each of the team members, where the user identifiers are associated with the team. The user identifiers may be used by the tournament server 46 to identify the members of the team during the tournament. A user identifier may be a unique indicator associated with a player. For example, the user identifier may be a random number, string, etc., generated by the tournament server 46. Also, the user identifier may be an indicator received at block 608, or some other identifier received from the player such as an e-mail address, login name, etc. Further, the user identifier may be an identifier associated with the gaming unit 20 to be used by the player such as a network address, an IP address, etc. Still further, the user identifier may be an identifier provided by the player (e.g., a nickname, an e-mail address, information from a player tracking card, a driver's license number, etc.).

At block 632, the tournament server 46 may send the user identifiers to the team members. For example, the tournament server 46 may send the user identifiers to the gaming units 20 of the team members via an "admission ticket," according to a network communication protocol, web page, e-mail, etc. In some embodiments, block 632 may be omitted. For example, if the user identifier is an identifier associated with the gaming unit 20 (e.g., an IP address), or if the user identifier were provided by the player, the tournament server 46 need not send the user identifier to the player.

Figure 15:
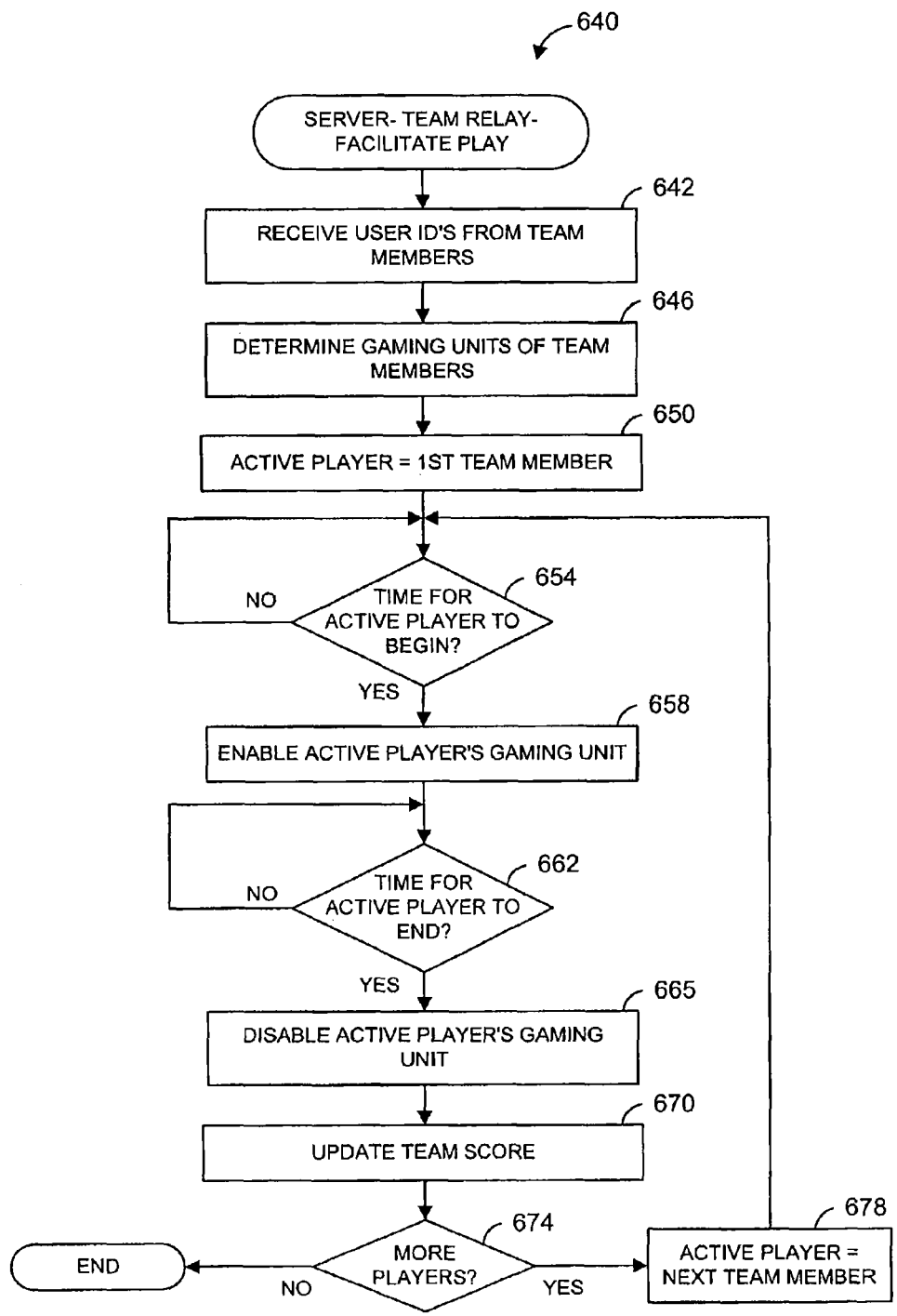
FIG. 15 is a flowchart of an embodiment of a tournament routine that may be performed during operation of the tournament server.

FIG. 15 is a flow diagram illustrating one embodiment of a method that may be implemented by the tournament server 46 of FIG. 1. The method 640 may be used to facilitate playing as a team in a tournament.

At block 642, the tournament server 46 may receive user identifiers from team members of a team. For example, the team members may submit the user identifiers generated at block 628 of FIG. 14. The user identifiers may be submitted via the respective gaming units 20 on which the team members are to play in the tournament, and then transmitted to the tournament server 46. For example, the user identifiers may be submitted via a ticket reader, card reader, keyboard, keypad, touch screen, etc.

At block 646, the tournament server 46 may determine the respective gaming units 20 of the team members. For example, the tournament server 46 may determine a network address, IP address, etc., of the gaming unit 20 from which it received the user identifier of the team member. In some embodiments, block 642 and/or block 646 may be omitted. For example, if the user identifier is an IP address of the gaming unit, blocks 626 and 646 may be omitted.

At block 650, a variable indicating an active player may be set to the first player of the team scheduled to play in the tournament. At block 654, it may be determined whether the active player is to begin playing in the tournament. For example, if the active player is the first scheduled player, it may be determined whether the tournament had begun. Determining whether the active player is to begin playing may be based on, for example, the indications of the time periods received at block 612 of FIG. 14, a tournament start time, etc.

If it is not time for the active player to begin playing, control may remain at block 654. If it is time for the active player to begin playing, control may pass to block 658. At block 658, the tournament server 46 may enable the gaming unit 20 corresponding to the active player. The gaming unit 20 may be enabled in a manner similar to those described with reference to block 270 of FIG. 5. In some embodiments, the gaming unit 20 may enable itself at the appropriate time.

At block 662, it may be determined whether the active player is to stop playing in the tournament. Determining whether the active player is to stop playing may be based on, for example, the indications of the time periods received at block 612 of FIG. 14, a tournament stop time, whether a player has already won the tournament, etc. If it is not time for the active player to stop playing, control may remain at block 662. If it is time for the active player to stop playing, control may pass to block 665.

At block 665, the tournament server 46 may disable the gaming unit 20 corresponding to the active player. The gaming unit 20 may be disabled in a manner similar to those described with reference to block 274 of FIG. 5. In some embodiments, the gaming unit 20 may disable itself at the appropriate time.

At block 670, the team's tournament score may be updated. The team's score may be updated after each team member finishes playing, or it may be updated once, several times, or numerous times while a team member is playing.

At block 674, it may be determined whether more team members are to play in the tournament. Determining whether more team members are to play may be based on, for example, the indications of the time periods received at block 612 of FIG. 14. If no more team members are to play, the flow may end. The flow may also end if it is determined that the tournament is over (e.g., if a player has already won). If more team members are to play, then control may pass to block 678.

At block 678, the active player variable may be set to the next team member scheduled to play in the tournament. The next team member may be determined, for example, based on the indications of the time periods received at block 612 of FIG. 14. Then, control may pass to block 654.

Figure 16:
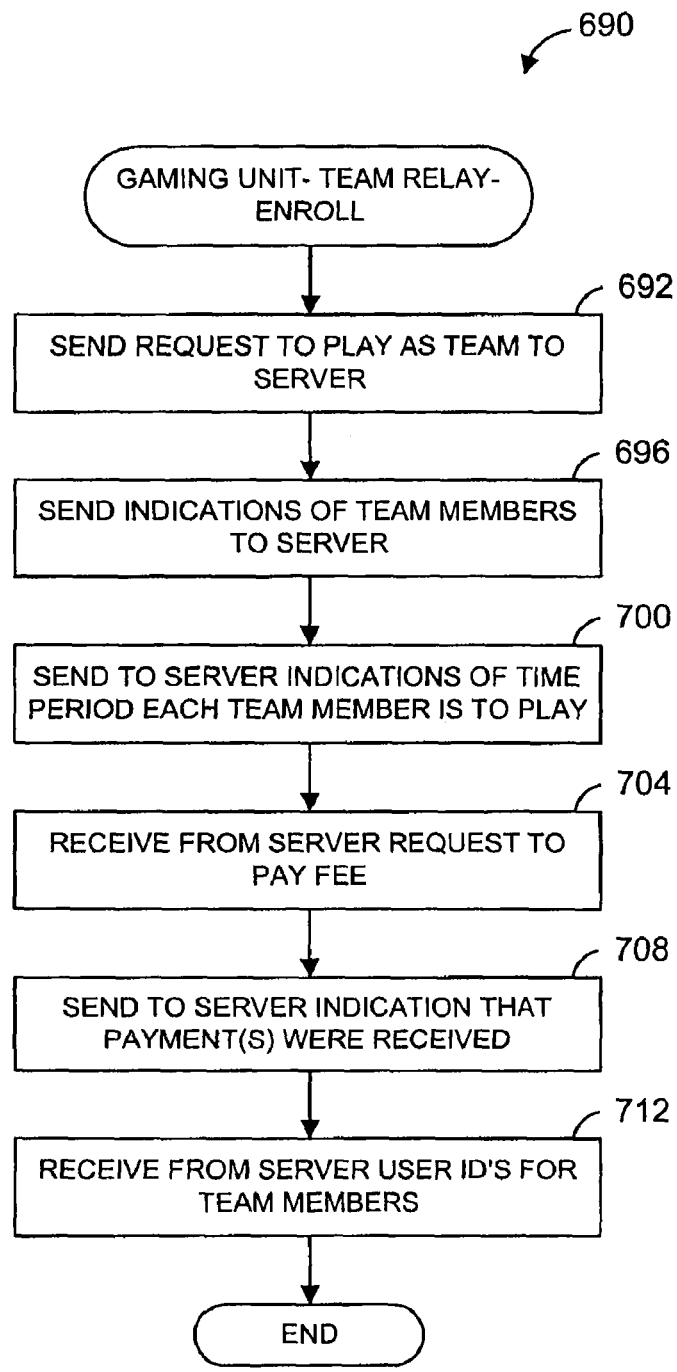
FIG. 16 is a flowchart of one embodiment of a team enrollment routine that may be performed during operation of one or more of the gaming units.

FIG. 16 is a flow diagram illustrating one embodiment of a method that may be implemented by a gaming unit 20 of FIG. 1. The method 690 may be used to enroll players as a team in a tournament.

At block 692, the gaming unit 20 may send a request to the tournament server 46 that indicates players wish to form a relay team for a tournament. At block 696, the gaming unit may send to the tournament server 46 indications of the team members of which the team is to be comprised. For each team member, the indications may include one or more indicators such as a name, a nickname, an e-mail address, etc. These indications may be sent from one gaming unit 20 or a plurality of gaming units 20 (e.g., from the respective gaming units 20 of the team members). At block 700, the gaming unit 20 may send indications of the time period each team member is to play. The indications may include an indication of start times and end times of segments, particular time slots, etc. These indications may be sent from one gaming unit 20 or a plurality of gaming units 20 (e.g., from the respective gaming units 20 of the team members).

The information sent at blocks 692, 696, and 700 may be entered by one or more of the team players via one or more gaming units 20. For example, the request transmitted at block 692 may be generated by a gaming unit 20 upon the selection of a button, link, area of a display screen, etc., associated with choosing to play as a relay team. Additionally, the request could be sent via interaction with a web site, where the web site includes a button, link, web page, etc., associated with choosing to play as a relay team. With regard to block 696, a gaming unit 20, web site, etc., could prompt one or more players to input indications of the team members. Also, with regard to block 700, a gaming unit 20, web site, etc., could prompt one or more players to input indications of the time periods each team member is to play.

At block 704, the gaming unit 20 may receive from the tournament server 46 a request for payment of a fee for participating in the tournament as a team. The request may be sent to one gaming unit 20, or respective requests may be sent to the team members. For example, the tournament server 46 may send information to a gaming unit 20 at which a team player is present that causes the gaming unit 20 to prompt the player to submit the required fee. As another example, the tournament server 46 may send a web page that prompts a player to submit the fee. As yet another example, the tournament server 46 may send an e-mail that prompts a player to submit the fee. After the team member submits the fee (or authorization to charge or deduct the fee to/from a credit card, debit card, account, etc.), at block 708, the gaming unit 20 may send an indication or indications that the requested payment or payments were received. Sending the indication or indications may occur in a manner similar to that described with reference to block 360 of FIG. 7.

At block 712, the gaming unit 20 may receive one or more user identifiers for the team members. The gaming unit 20 may receive the user identifier corresponding to the player at the gaming unit 20, and may optionally receive user identifiers for other team members. The user identifiers may be received according to a network communication protocol, via a web page, via e-mail, etc. In some embodiments, block 712 may be omitted. For example, if the user identifier is an identifier associated with the gaming unit 20 (e.g., an IP address), the tournament server 46 need not send the user identifier to the gaming unit 20. The user identifiers may be as described with reference to block 628 of FIG. 14. In some embodiments, the user identifiers may comprise the indications provided at block 696.

Figure 17:
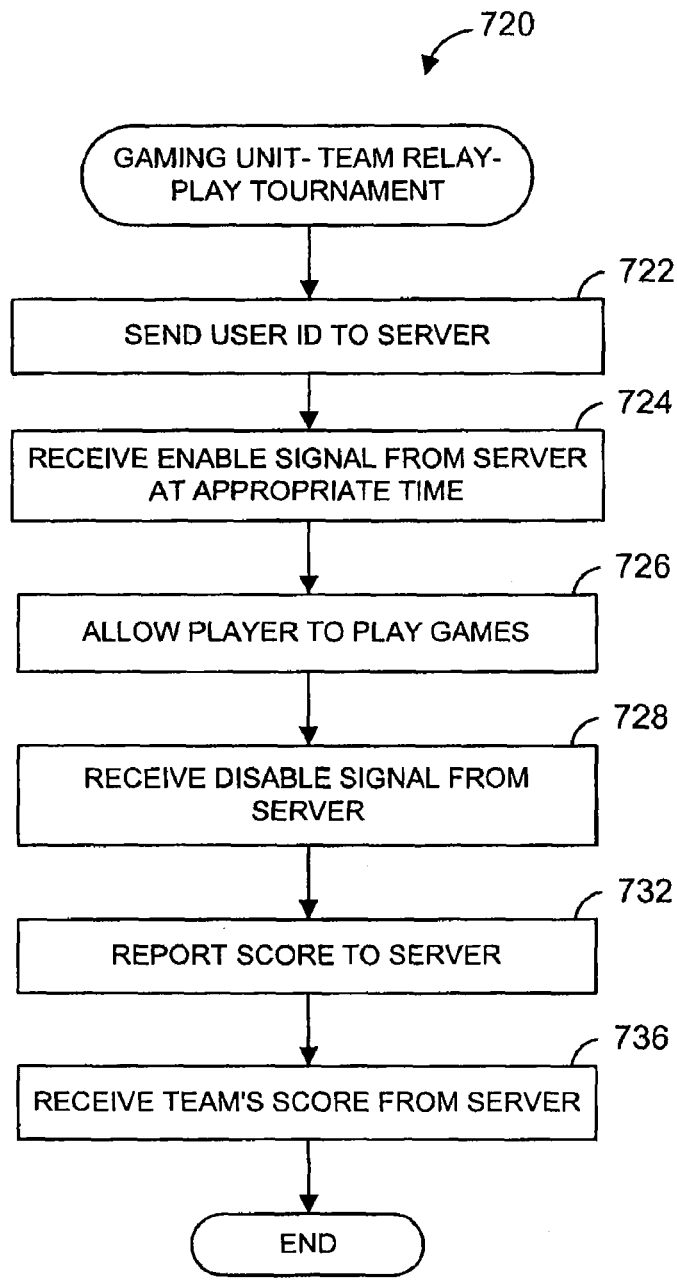
FIG. 17 is a flowchart of an embodiment of a tournament routine that may be performed during operation of one or more of the gaming units.

FIG. 17 is a flow diagram illustrating one embodiment of a method that may be implemented by a gaming unit 20 of FIG. 1. The method 720 may be used to facilitate players playing as a team in a tournament.

At block 722, the gaming unit 20 used by a team member may send a user identifier of the team member. For example, the team member may submit the user identifier generated at block 628 of FIG. 14. The gaming unit 20 may prompt the team member to enter the user identifier. The user identifier may be entered by the player via a ticket reader, card reader, keyboard, keypad, touch screen, etc. For instance, the user identifier may be printed as a bar code on an "admission ticket," stored on a smart card, etc.

At block 724, the gaming unit 20 may receive an enable signal from the tournament server 46 that enables the gaming unit 20 for tournament play at the appropriate time. The gaming unit 20 may be enabled in a manner similar to those described with reference to block 270 of FIG. 5. In some embodiments, the gaming unit 20 may enable itself at the appropriate time.

While enabled, the gaming unit 20 may permit the player to play games in the tournament (block 726). The current score of the player during the tournament may reflect the team member's individual score and/or the team's score.

At block 728, the gaming unit 20 may receive a disable signal from the tournament server 46 that disables the gaming unit 20 for tournament play at the appropriate time. The gaming unit 20 may be disabled in a manner similar to those described with reference to block 274 of FIG. 5. In some embodiments, the gaming unit 20 may disable itself at the appropriate time.

At block 732, the gaming unit 20 may report the score of the player and/or team to the tournament server 46. The score may be reported after the player has finished playing in the tournament (e.g., the player's final score). Additionally, the player's current score may be reported once, several times, or numerous times, during the player's participation in the tournament.

At block 736, the gaming unit 20 may receive the team's score from the tournament server 46. The team's score may be received after the tournament has ended (e.g., the team's final score). Additionally, the team's current score may be reported once, several times, or numerous times, during the tournament.

Additionally, aspects of the embodiments described with reference to FIGS. 15-17 could be combined with aspects of the embodiments described with reference to FIGS. 6-13. For example, the team could choose to play in a particular time slot or slots, and the team could be charged a reduced fee or charged a full tournament fee, but play each game with a higher credits-in value. Similarly, one or more of the team players could be a software agent.

Although in the above embodiments team members play in non-overlapping time segments, in other embodiments team members may be allowed to play in overlapping time segments. Thus, two or more team members could play in the tournament at the same time, for example.

Loading Tournament Software to Gaming Units

To ensure that players in a tournament have a substantially equal chance of winning no matter which gaming unit they choose to play on, tournaments are typically played on a set of gaming units that have been set aside in a casino for tournament play. Each gaming unit in the set typically is of same make and model, and each gaming unit has been configured to have the same pay table, same credits-in per game, etc. Thus, if a player wishes to participate in the tournament, the player must use one of the set-aside gaming units.

Figure 18:
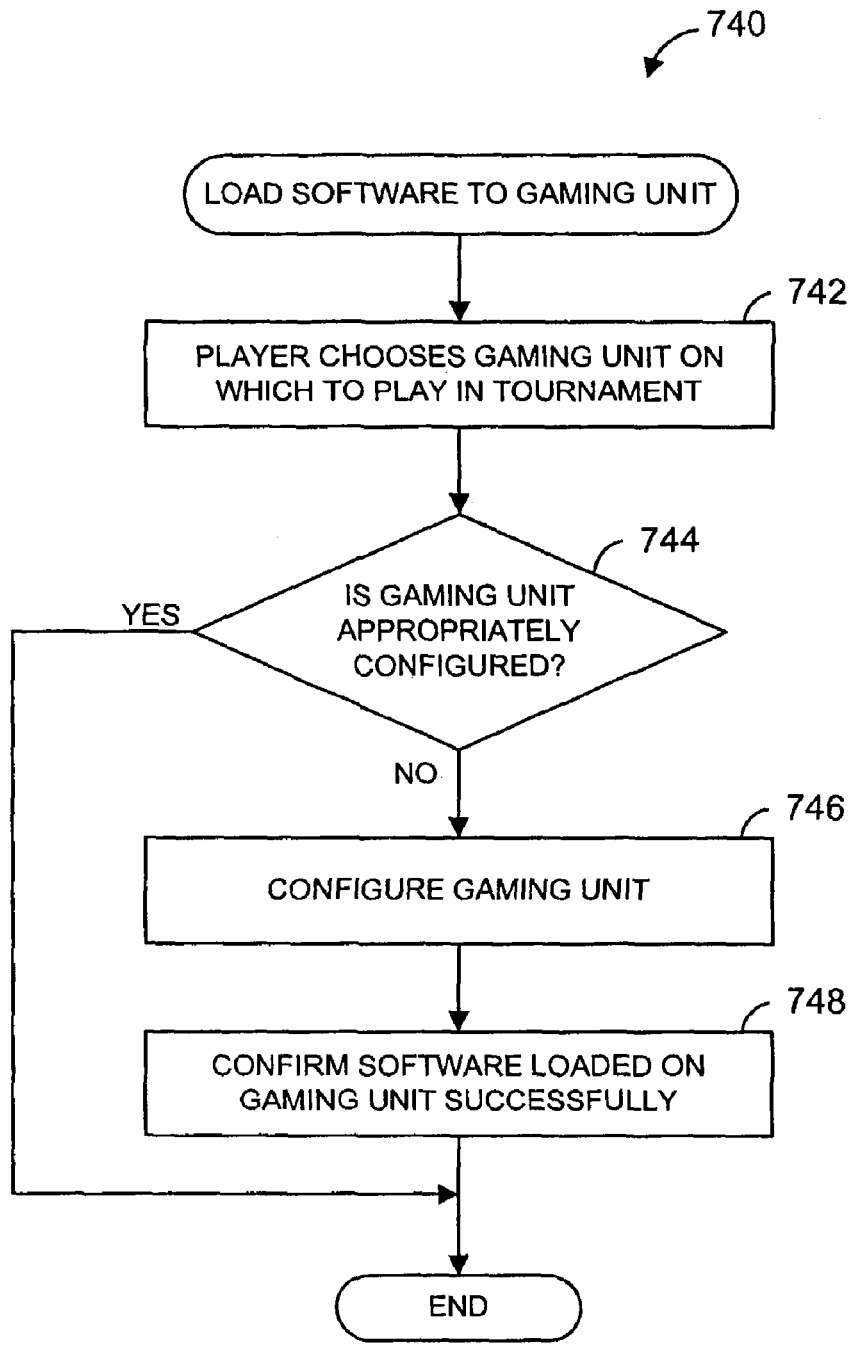
FIG. 18 is a flowchart of an embodiment of a software loading routine that may be performed during operation of the tournament server.

FIG. 18 is a flow diagram of one embodiment of a method that may allow a player to play in a tournament using any of a variety of types of gaming units. The method 740 is related to loading software to a gaming unit 20 to facilitate participating in a tournament using the gaming unit 20. Upon loading the software, a player may be able to play in the tournament using a gaming unit that might not otherwise have allowed participation in the tournament.

At block 742, a player may choose to play in a tournament at a particular gaming unit 20. Making this choice may comprise, for example, selecting a button, area of a screen, etc., via the gaming unit 20. Making this choice may also comprise selecting a button, link, etc., on a web page via the gaming unit 20. The chosen gaming unit 20 may be a gaming unit located on a casino floor, in a hotel room, at a restaurant, at an airport, in a person's home, etc. The chosen gaming unit 20 may be a casino gaming unit, a set-top box communicatively coupled to a television, a kiosk, a personal purpose computer, etc.

At block 744, it may be determined whether the gaming unit 20 already has been appropriately configured for playing in the tournament. As one example, it may be determined whether the gaming unit 20 already has appropriate software for playing in the tournament. Various techniques, including known techniques, for determining whether particular software is already present on the gaming unit may be employed. For instance, another computing device such as the tournament server 46 may query the gaming unit 20, via, for example, a network communication link, to determine whether the appropriate tournament software already has been loaded on the gaming unit 20. Additionally, utility software may be loaded (via, e.g., the tournament server 46) onto the gaming unit 20 that can determine whether the appropriate tournament software has already been loaded.

If the gaming unit 20 already has been appropriately configured, the flow may end. If the gaming unit 20 has not been appropriately configured, control may pass to block 746. At block 746, the gaming unit 20 may be configured. For example, appropriate software may be loaded to the gaming unit 20. The software may be loaded via a network connection, a floppy disk, a CD-ROM, a DVD, a PC card, a smart card, etc. The software may be loaded via a portable memory device such as a COMPACTFLASH™ memory device, a SECURE DIGITAL™ memory device, a MULTIMEDIACARD™ memory device, a SMARTMEDIA™ memory device, a MEMORY STICK™ memory device, an XD™ memory device, a MICRODRIVE™ memory device, a key-chain memory device (e.g., a DISKONKEY™ memory device, a MEMORYKEY™ memory device, etc.), etc. The Referring to FIG. 1, the gaming unit 20 could, for example, download the software from the tournament server via the one or both of the network 24 and the network 40. The software may comprise one or more of an executable file, a configuration file, a data file, a pay table, etc. The software may also comprise a plurality of seeds for a random number generator. The plurality of seeds may be, for example, randomly or pseudo-randomly generated. The software may be used to configure the controller 200. The software may be different for different types of gaming units. For example, the software for a casino gaming unit, an "IBM™-compatible" computer-based gaming unit, and an APPLE™ computer-based gaming unit may be different.

At block 748, it may be confirmed that the software was loaded to the gaming unit 20 successfully. Such a confirmation may be implemented with a variety of techniques including, for example, techniques well known to those of ordinary skill in the art.

Once the software has been loaded onto a gaming unit, the player may be able to use the gaming unit to play in tournaments corresponding to the loaded software. In some embodiments, the tournament server 46 may try to authenticate the software on the gaming unit prior to enabling the gaming unit for play. If the software cannot be authenticated, the tournament server 46 may not enable the gaming unit. In this manner, or in a similar manner, the tournament server 46 may try to prevent players from playing in tournaments with software that is not from a known or trusted source, and/or software that has been modified. Authenticating the software may include verifying the authenticity and/or the integrity of the software.

"Off-Line" Tournament Play

In some embodiments, a player may be able to participate in a tournament via a gaming unit that need not be communicatively coupled to the tournament server 46 during tournament play. For example, the player could purchase a time period of tournament play and set up a general purpose computer at home for playing in the tournament. The player could then play tournament games for the purchased time period at his or her leisure using the general purpose computer, and without having to communicatively couple the general purpose computer to the tournament server. The player could also purchase the time period and/or play at a casino-based gaming unit 20. After finishing play, the gaming unit 20 (e.g., general purpose computer at home, casino-based gaming unit, etc.) could communicatively couple to the tournament server 46 to report the player's score. At some time in the future (e.g., on a predetermined date), the winners (if any) of the tournament could be announced.

Figure 19:
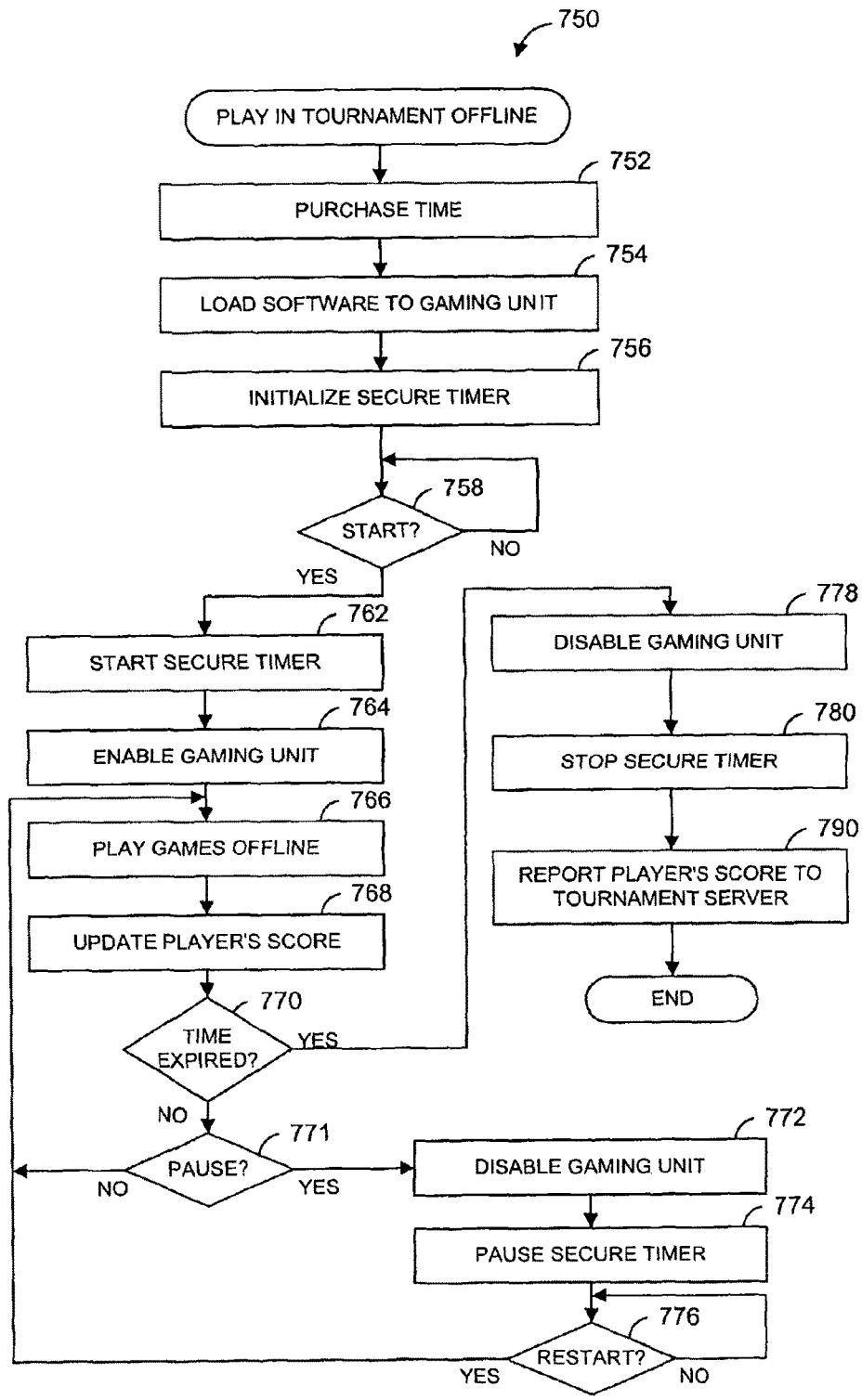
FIG. 19 is a flowchart of yet another embodiment of a tournament routine that may be performed during operation of one or more of the gaming units.

FIG. 19 is a flow diagram of one embodiment of a method 750 of playing in a tournament using a gaming unit that need not be communicatively coupled to the tournament server 46 during game play. At block 752, a player may purchase playing time in a tournament. As a specific example, the tournament may be set up to take place over a period such as one day, one week, etc., and a player may participate in the tournament for a time period upon paying a fee. For example, a player may purchase the right to play in the tournament for ten minutes, 30 minutes, one hour, two hours, etc.

At block 754, appropriate software for playing in the tournament may be loaded to the gaming unit 20, if necessary. For instance, tournament software could be loaded using a method such as the method described with reference to FIG. 18, or a similar method.

At block 756, a secure timer may be initialized to a time corresponding to the amount of time purchased at block 752. For example, the secure timer could be configured to count down, and the timer could be initialized to the amount of purchased time. As another example, the secure timer could be configured to count up, and a stop time of the timer could be initialized to the amount of purchased time. The secure timer could be implemented in software, firmware, and/or hardware. The secure timer could be implemented, for example, by the controller 200 of the gaming unit 20, on a PC card, smart card, etc.

At block 758, the player may choose whether to start playing games for the tournament. If the player chooses to start, control may pass to block 762. At block 762, the secure timer may be instructed to start. At block 764, the gaming unit 20 may be enabled for game play. At block 766, the player may play tournament games. During game play, the gaming unit 20 need not be communicatively coupled to the tournament server 46. At block 768, the player's score may be updated. The player's score may be updated, for example, after each game is played.

At block 770, it may be determined whether the player has already played for an amount of time that corresponds to the amount purchased at block 752. For example, the secure timer could be examined or queried to determine if the player is still entitled to play. If the time purchased at block 752 has not expired, control may pass to block 771.

At block 771, the player may choose to stop playing and pause the secure timer. If the player does choose to stop playing, the gaming unit 20 may be disabled at block 772, and the secure timer may be paused at block 774. Then, control may pass to block 776 to wait until the player chooses to start playing again. If the player chooses to start playing again, control may pass back to block 766.

Referring again to block 770, if the time purchased at block 752 has expired, control may pass to block 778. At block 778, the gaming unit 20 may be disabled, and the secure timer may be stopped at block 780. At block 790, the player's score may be reported to the tournament server 46.

In this embodiment, the player may participate in the tournament without having to keep the gaming unit 20 communicatively coupled to the tournament server 46. As one specific example, the player could communicatively couple the gaming unit 20 to the tournament server 46 to implement blocks 752, 754, and 756. Then, the player could optionally decouple the gaming unit 20 from the tournament server 46 and implement blocks 758, 762, 764, 766, 768, 770, 771, 772, 774, 776, 778, and 780. Having completed tournament play, the player could communicatively couple the gaming unit 20 to the tournament server 46 to report the player's score (block 790). If, for example, the gaming unit 20 were a portable device (e.g., a lap top computer, a PDA, a cellular phone, etc.), the player could play tournament games at a variety of locations because the gaming unit 20 need not be required to stay communicatively coupled to the tournament server 46.

It is to be understood that this is merely one example. For instance, blocks 752, 754, 756, and 790 do not require that the gaming unit 20 be coupled to the tournament server 46. For example, software could be loaded to the gaming unit 20 via a floppy disk, CD-ROM, DVD, PC card, smart card, etc. As another example, the player could report the score via a telephone call, via first class mail, etc. Further, blocks 758, 762, 764, 766, 768, 770, 771, 772, 774, 776, 778, and 780 do not require that the gaming unit 20 be decoupled from the tournament server 46.

Tournament Game Card

In some embodiments, a player may participate in a tournament by using a tournament game card. The tournament game card may be associated, for example, with a time period for playing in the tournament. For instance, tournament game cards may come in various denominations with regard to prices or time periods (e.g., a 10 minute card, a 30 minute card, a one hour card, etc.), or a card may be able to be configured for a specific time period. Additionally, tournament game cards may be associated with or configurable for association with one or more specific tournaments.

Figure 20:
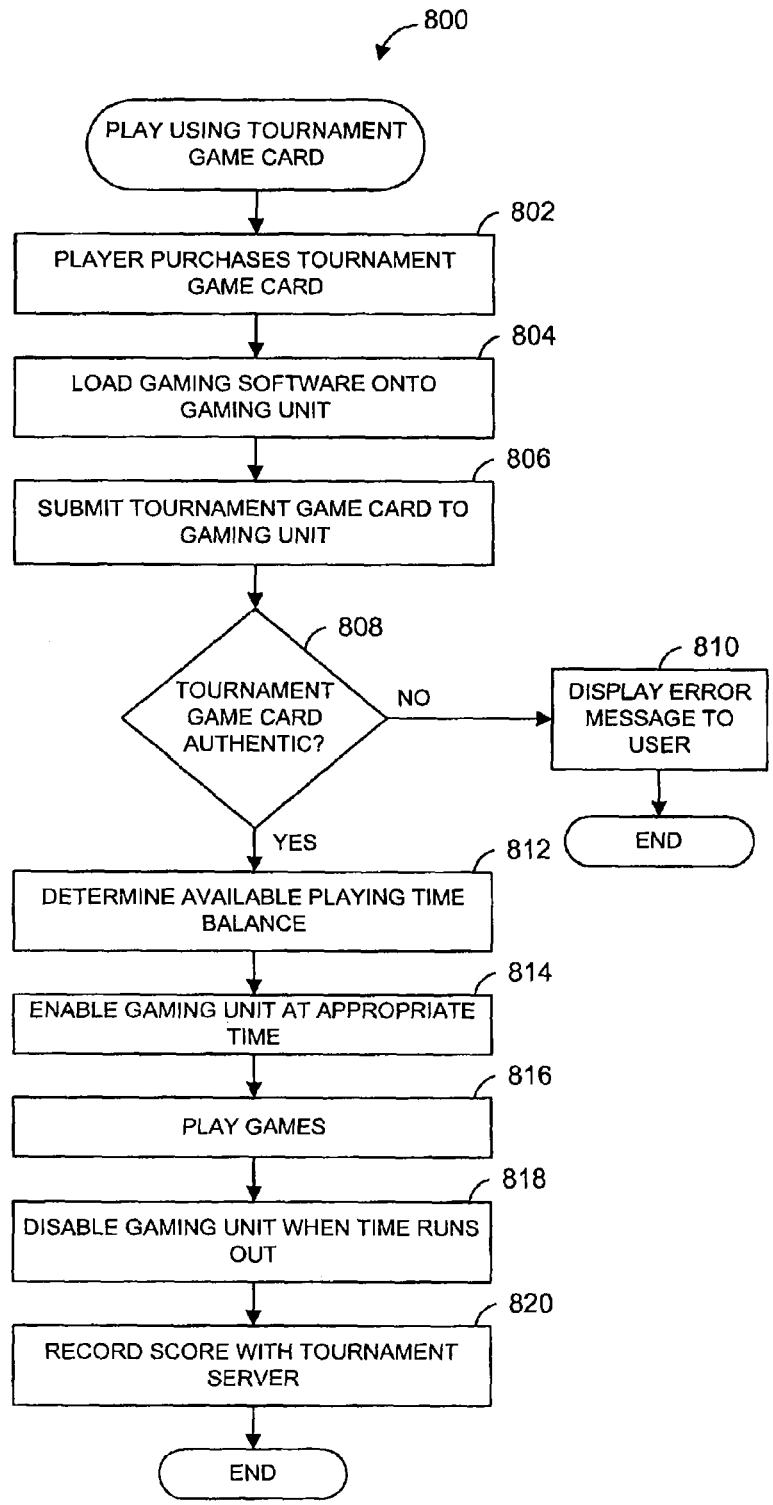
FIG. 20 is a flowchart of another embodiment of a tournament routine that may be performed during operation of one or more of the gaming units.

FIG. 20 is a flow diagram illustrating one embodiment of a method of playing in a tournament using a tournament game card. At block 802 of the method 800, a player may purchase a tournament game card. Purchasing the card may enable the player to play in a particular tournament for a given amount of time. The tournament game card may have associated with it a unique identifier that may be used to determine that the tournament game card is authentic. The unique identifier may comprise an identifier such as a validation alphanumeric number, or the like, and/or may comprise some other unique identifier. The card may be purchased at, for example, a convenience store, hotel, casino, via a web site, etc. When purchasing the tournament game card, the person or system selling the card may activate the card by, for example, notifying the tournament server 46 that the tournament game card has been purchased. The notification may include the unique identifier.

The tournament game card may be a paper card, plastic card, PC card, smart card, etc. If the unique identifier comprises a number, that number may be printed, affixed, displayed, etc., on the exterior of the card in a human readable format. The unique identifier may additionally or alternatively be printed, affixed, displayed, etc., on the exterior of the card in a machine readable format (e.g., bar code format). Additionally or alternatively, the unique identifier may be encoded electrically, magnetically, etc., on or within the tournament game card. For example, if the tournament game card includes a magnetically readable and/or writeable strip, the unique identifier may be magnetically encoded on the magnetic strip. As another example, if the tournament game card includes a memory, the unique identifier may be stored in the memory.

At block 804, the player may load software for playing in the tournament onto a gaming unit 20 on which the player wishes to play. If the gaming unit 20 is already configured for playing in the tournament, the software need not be loaded. Additionally, the player may choose a gaming unit 20 that already is configured for playing in the tournament. Block 804 may be omitted if not necessary or if desired. The software may be loaded according to a method such as the method 740 of FIG. 18, or a similar method.

At block 806, the player may submit the tournament game card to the gaming unit 20. How the tournament game card is submitted may depend on the type of tournament game card and/or the available components of the gaming unit 20. For example, if a validation number is printed on the tournament game card, submitting the tournament game card may comprise typing in, scanning in, etc., the validation number printed on the tournament game card using an input device of the gaming unit 20 such as a keyboard, key pad, scanner, etc. If the gaming unit 20 includes a card reader/ writer and if the tournament game card includes information magnetically, electrically, optically, etc., encoded or stored on the tournament game card, submitting the tournament card may comprise inserting the tournament game card in the card reader/writer.

At block 808, it may be determined whether the tournament game card is authentic. Authentication may comprise sending information obtained from the tournament game card to the tournament server 46. The tournament server 46 may then determine whether the tournament game card is authentic. Determining whether the tournament game card is authentic may optionally include determining whether the tournament game card has been activated. Similarly, the gaming unit 20 could determine whether the tournament game card appears authentic using information supplied by the tournament server 46. If it is determined that the tournament game card is not authentic, the gaming unit 20 may display an error message to the player at block 810.

If it is determined that the tournament game card is authentic, control may pass to block 812. At block 812, the available playing time balance associated with the tournament game card may be determined. This may comprise sending information obtained from the tournament game card to the tournament server 46. The tournament server 46 may then determine the available playing time balance and provide the gaming unit 20 with this information. Similarly, the gaming unit 20 could determine the available playing time balance using information supplied by the tournament server 46. Further, the available tournament time could be stored on the tournament game card.

At block 814, the gaming unit 20 may be enabled for game play. Enabling the gaming unit 20 for play may include receiving an enable signal from the tournament server 46 as described previously. Additionally, the gaming unit 20 may enable itself. Further, an enable signal may be received from the tournament game card.

At block 816, the player may play tournament games. At block 818, the gaming unit 20 may be disabled when the player's available time has expired. Disabling the gaming unit 20 for play may include receiving a disable signal from the tournament server 46 (as described previously) or from the tournament game card. Additionally, the gaming unit 20 may disable itself. For example, the gaming unit 20 may include a timer that generates an indication of when the player's time has expired. Upon the timer expiring, the gaming unit 20 may disable itself. The timer could be implemented via software, firmware, and/or hardware.

At block 820, the player's score may be recorded with the tournament server 46. Additionally, the tournament server 46 may be notified that the time associated with the tournament game card has expired.

Aspects of the embodiment described with reference to FIG. 20 may be combined with aspects of other embodiments described herein. For example, aspects of the embodiment described with reference to FIG. 20 may be combined with aspects of the embodiments described with reference to FIG. 21.

"Floating" Tournament Participation

Figure 21:
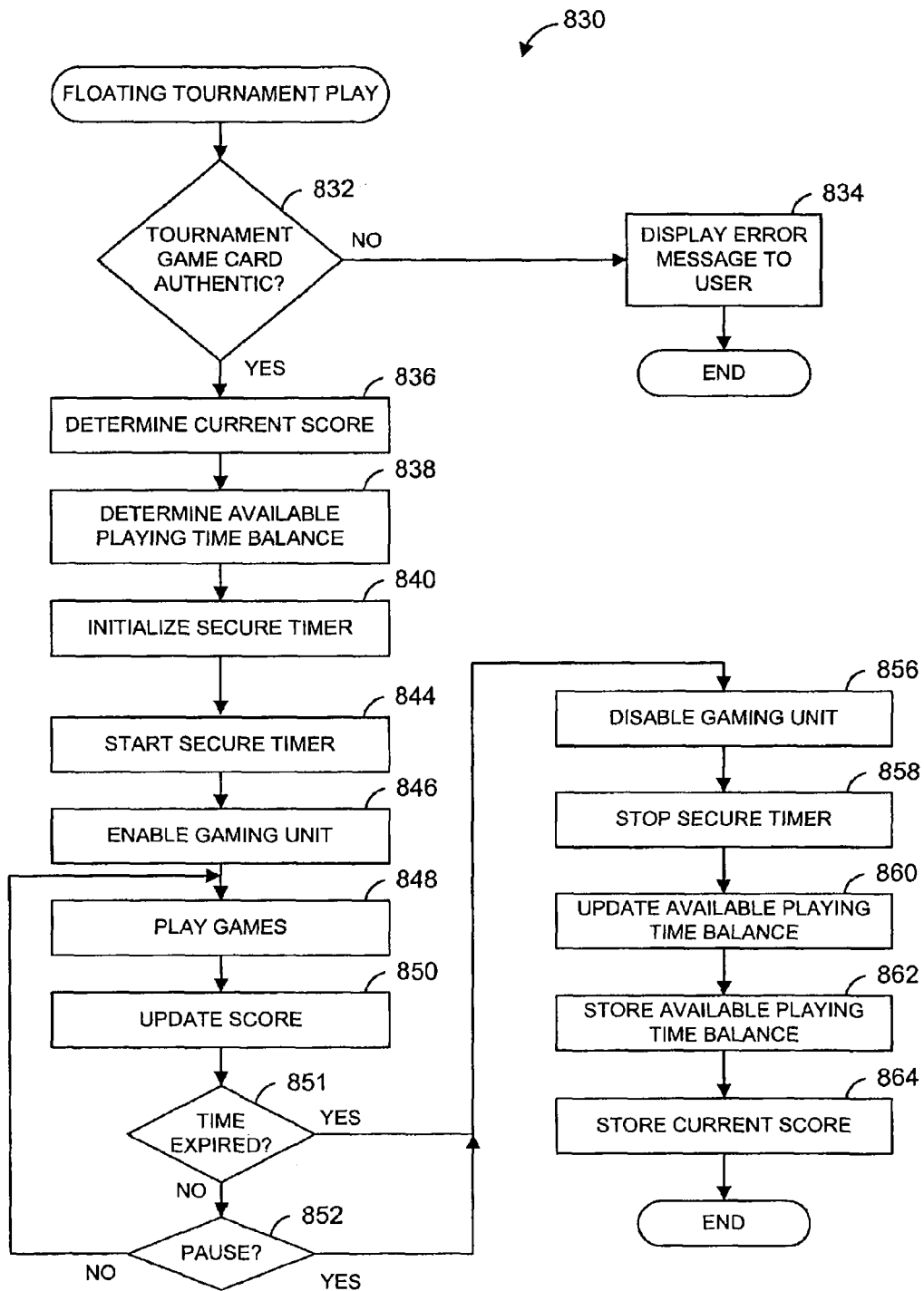
FIG. 21 is a flowchart of still another embodiment of a tournament routine that may be performed during operation of one or more of the gaming units.

In some embodiments, a player may participate in a tournament by playing at multiple gaming units 20. For example, if the player is to participate in a tournament for one hour, the player may play for fifteen minutes on a PDA, fifteen minutes on a casino gaming machine, and thirty minutes on a lap top computer. In these embodiments, the player may utilize a tournament game card as described previously. Additionally or alternatively, the player may utilize a personal identifier such as an identification number. The amount of tournament time available to the player may be kept track of with reference to the personal identifier FIG. 21 is a flow diagram illustrating one embodiment of a method that may facilitate playing in a tournament using a multiple gaming units 20. In this embodiment, the player may use a tournament game card. In other embodiments, however, a tournament game card need not be used. The tournament game card may be a tournament game card as described previously, and may be submitted to the gaming unit 20 as described previously.

At block 832 of the method 830, it may be determined whether the tournament game card is authentic. Authentication may comprise sending information obtained from the tournament game card to the tournament server 46. The tournament server 46 may then determine whether the tournament game card is authentic. Determining whether the tournament game card is authentic may optionally include determining whether the tournament game card has been activated. Similarly, the gaming unit 20 could determine whether the tournament game card appears authentic using information supplied by the tournament server 46. If it is determined that the tournament game card is not authentic, the gaming unit 20 may display an error message to the player at block 834.

If it is determined that the tournament game card is authentic, control may pass to block 836. At block 836, the current score of the player may be determined. The current score may, for example, be stored on the tournament game card. Additionally, the current score may be retrieved from the tournament server 46 with reference to information from the tournament game card, such as a unique identifier of the tournament game card. Similarly, the current score may be retrieved from the tournament server 46 with reference to the player's personal identifier, etc.

At block 838, the available playing time balance may be determined. The available playing time balance may, for example, be stored on the tournament game card. Additionally, the available playing time balance may be retrieved from the tournament server 46 with reference to information from the tournament game card, such as a unique identifier of the tournament game card. Similarly, the available tournament time may be retrieved from the tournament server 46 with reference to the player's personal identifier, etc.

At block 840, a secure timer may be initialized with the available playing time balance determined at block 838. The secure timer may be implemented using software, firmware, and/or hardware. The secure timer may be implemented by one or more of the tournament server 46, the gaming unit 20, the tournament game card, etc.

At block 844, the secure timer may be started. At block 846, the gaming unit 20 may be enabled. The gaming unit 20 may be enabled using a method such as the methods described above, or using a similar method. At block 848, the player may play games via the gaming unit 20. At block 850, the player's score may be updated.

At block 851, it may be determined whether any available time remains. If there is no available time left, control may pass to block 856. If there is available time, control may pass to block 852.

At block 852, it may be determined whether the player wishes to stop playing games and pause the timer. If the player chooses to continue playing, control may pass back to block 848. If the player chooses to stop playing and pause the timer, control may pass to block 856. At block 856, the gaming unit 20 may be disabled using a method such as the methods described above, or using a similar method. At block 858, the secure timer may be stopped. At block 860, the available playing time balance may be updated using, for example, information available from the secure timer.

At block 862, the available playing time balance may be stored. For example, the available playing time balance may be stored on the tournament game card. Also, the available playing time balance may be sent to the tournament server 46 for storage. At block 864, the player's score may be stored. For example, the score may be stored on the tournament game card. Also, the score may be sent to the tournament server 46 for storage.

Aspects of the embodiment described with reference to FIG. 21 may be combined with aspects of other embodiments described herein. For example, aspects of the embodiment described with reference to FIG. 21 may be combined with aspects of the embodiments described with reference to FIGS. 18-20.

Spontaneous Tournament

Figure 22:
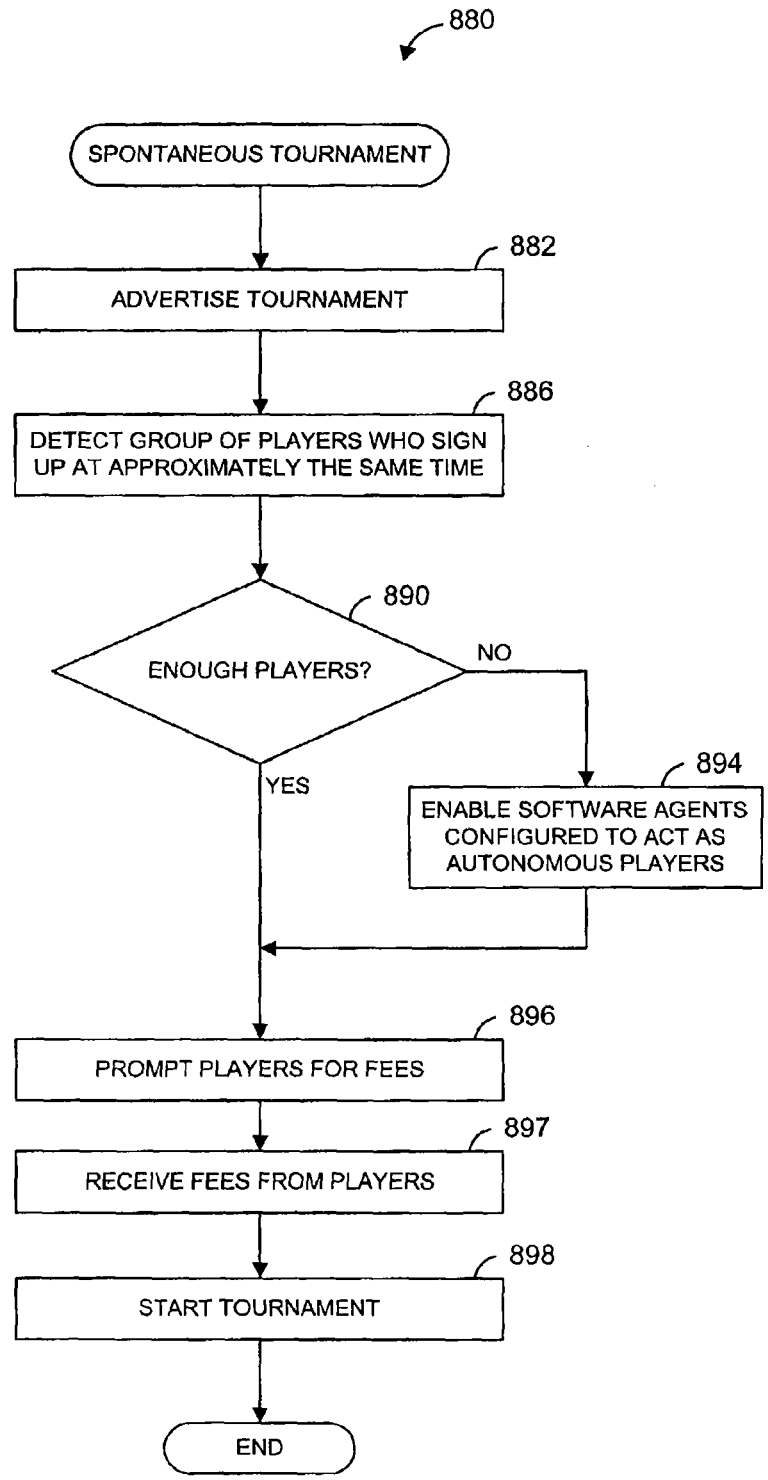
FIG. 22 is a flowchart of an embodiment of a tournament routine that may be performed during operation of the tournament server.

In some embodiments, a tournament need not be started at a time arranged far in advance. Rather, the tournament may be started shortly after determining that a group of players wish to play in the tournament. FIG. 22 is a flow diagram illustrating one embodiment of a method that may facilitate playing in a tournament that need not be started at some prearranged time. In this embodiment, a tournament may be formed that includes players that sign up for the tournament at approximately the same time.

At block 882 of the method 880, the tournament may be advertised. Advertising the tournament may occur in a manner as described with reference to block 258 of FIG. 5, or in a similar manner. The advertisement may indicate that the tournament is not scheduled to begin at some prescheduled time, but rather may begin shortly after the player signs up.

At block 886, a group of players who signed up for the tournament at approximately the same time may be detected. For example, the tournament server 46 may detect a group of players who signed up for the tournament at approximately the same. In some embodiments, detecting a group of players who signed up at approximately the same time may comprise detecting those players who signed up within a window of time. Additionally, where multiple instances of the tournament may occur (e.g., for multiple groups of players, where each group comprises players who signed up at approximately the same time) windows may be overlapping or non-overlapping.

Detecting a group of players may additionally or alternatively comprise detecting those players who signed up within a window of time, and who are not participating in another tournament. For example, where multiple instances of the tournament are occurring, a player who has already been allocated to a previous instance of the tournament may not be considered as part of the group of players signing up for the present instance of the tournament.

At block 890, it may be determined whether there are enough players in the group for starting the tournament. For example, it may be determined whether the number of players in the group is greater than or equal to a minimum number. In other embodiments where the tournament requires discrete numbers of players (e.g., in tournaments in which players play against other players), it may be determined whether the number of players in the group equals one of the acceptable numbers of players. As one specific example, some tournaments may require that the number of players should be a factor of four.

If there are enough players, control may pass to block 896. If there are not enough players, control may pass to block 894. At block 894, a number of software agents, configured to act as autonomous players, may be enabled such that there are enough players (including software agents) in the tournament.

Each software agent may be configured to mimic an actual player. For example, for non-skill playing games (e.g., a slots game), the software agent may be configured to activate a button (e.g., a "Spin" button) at a rate that corresponds to rates of actual players. As one embodiment, configuring the software agent may comprise configuring at least one aspect of the software agent based on a statistical analysis of the play of actual players' play in past games and/or tournaments. For instance, the rate that a software agent "selects" a button may be based on a statistical analysis of the rates at which actual players select the button in past tournaments. The software agent's rate may be selected as the average or median rate of past actual players. Additionally, the software agent's rate may be randomly or pseudo-randomly selected according to a statistical distribution of rates of actual players. The rate may or may not be changed during the tournament.

For skill-based games (e.g., a trivia game, a chess game, a poker game, etc.), the software agent may be configured to play according to particular style and/or skill level. Styles may be configured according to categories such as "high risk," "moderate risk," "low risk," or other categories Skill levels may be configured according to categories such as "high," "moderate," "low," or other categories. Additionally or alternatively, software agents may be configured to more specifically mimic the behaviors of past players. For example, it may be noted that a past player, when faced with a particular choice between three options, always chose the third option. Thus, a software agent could be configured, when faced with that choice, to always choose the third option. Those of ordinary skill in the art will recognize many other techniques in which a software agent may be configured to mimic the behavior of an actual player.

At block 896, the players detected at block 886 may be prompted to pay fees for playing in the tournament. At block 897, fees may be received from the players.

At block 898, the tournament may be started. The tournament may include players playing at, for example, a casino gaming unit at a casino, a gaming unit in a restaurant, and playing at home on a general purpose computer. The tournament may also include autonomous software agents. The software agents may be implemented by the tournament server 46, a gaming unit 20, or some other device. If an autonomous software agent were to win the tournament, the software agent prize could be retained by the tournament operator or sponsor, rolled over to another tournament, distributed among players, etc.

Variations

One of ordinary skill in the art will recognize many variations to the above described embodiments. For example, a single tournament may include players playing according to two or more of the above-described embodiments. For instance, in a two hour tournament scheduled between 7 PM and 9 PM, a first player could play for the entire time, and a second player could play in one half-hour time slot starting at 8 PM. Additionally, a third player could start playing at 7:45 PM and play through to the end of the tournament. Also, fourth and fifth players could play as a relay team. Further, a sixth player could player via a software agent.

As another example variation, tournament play may occur in rounds (e.g., round-robin, single-elimination, double-elimination, etc.). In some embodiments, players may play against other players. For example, a poker tournament may permit players to play against other players.

Further, a single tournament may comprise players playing at a typical tournament gaming location such as a casino, but may also comprises players playing at home via the internet, playing elsewhere via cell phones. as well as software agents playing on behalf of others. As described with reference to FIG. 22, the tournament may comprise software agents playing autonomously.

Although some of the previously described embodiments described specifying a length of time a player wished to play, in other embodiments a player could alternatively specify a number of games. Further, time and time periods may be represented in a variety of ways. For instance, time periods may be represented by a duration, a start time and an end time, etc. Also, time periods may be represented by other metrics. For example, if the length of a game to be played in the tournament is known, a time period could be represented as a number of games. Further, the value payout to a player may be based on the number of games played by the player.

When playing games, a score of the player could accumulate in a variety of ways. For example, in some embodiments a score of a player could both increment and decrement during play in the tournament, because the player may lose points on some games and gain points on other games. In other embodiments, a score of a player could only increment. For instance, a play of a game could only result in increasing the player's score or, optionally, leaving the score unchanged.

The outcomes of individual games played by a player could be determined at the individual gaming unit of the player or at a server remotely located from the gaming unit. For example, a server could randomly or pseudo-randomly generate a number for a game and then send the number to a gaming unit via a network. Then, the gaming unit could use the number to determine a payout of the game. In another example, the server could determine the payout of a game and then send the payout information to the gaming unit. Thus, in some embodiments a lottery-type tournament could be implemented. In these embodiments, if a plurality of winners is determined, a jackpot could be shared among the plurality of winners (e.g., a pari-mutuel jackpot).

Example Games

Examples of games that may be played via the gaming units are provided below. These games may be played as part of a tournament. If played in a tournament, some of the blocks described below may be omitted. For example, blocks at which a player may select a. bet may be omitted. Rather, the bet may be automatically selected by the game or predetermined.

Draw Poker

Figure 23:
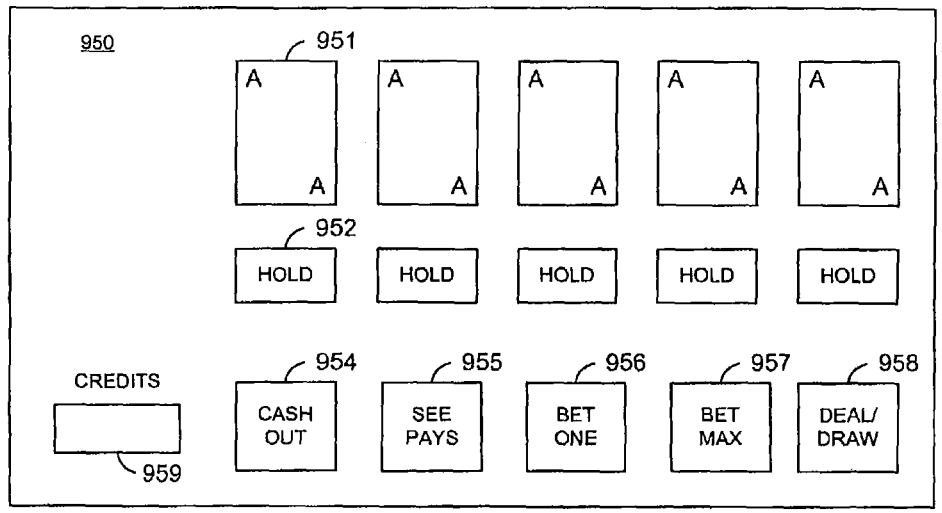
FIG. 23 is an illustration of an embodiment of a visual display that may be displayed during performance of the video poker routine of FIG. 24.

FIG. 23 is an exemplary display 950 that may be shown on the display unit 170 during performance of a poker routine. Referring to FIG. 23, the display 950 may include video images 951 of a plurality of playing cards representing the player's hand, such as five cards. To allow the player to control the play of the video poker game, a plurality of player-selectable buttons may be displayed. The buttons may include a "Hold" button 952 disposed directly below each of the playing card images 951, a "Cash Out" button 954, a "See Pays" button 955, a "Bet One Credit" button 956, a "Bet Max Credits" button 957, and a "Deal/Draw" button 958. The display 950 may also include an area 959 in which the number of remaining credits or value is displayed. If the display unit 170 is provided with a touch-sensitive screen, the buttons 952, 954, 955, 956, 957, 958 may form part of the video display 950. Alternatively, one or more of those buttons may be provided as part of a control panel that is provided separately from the display unit 170.

Figure 24:
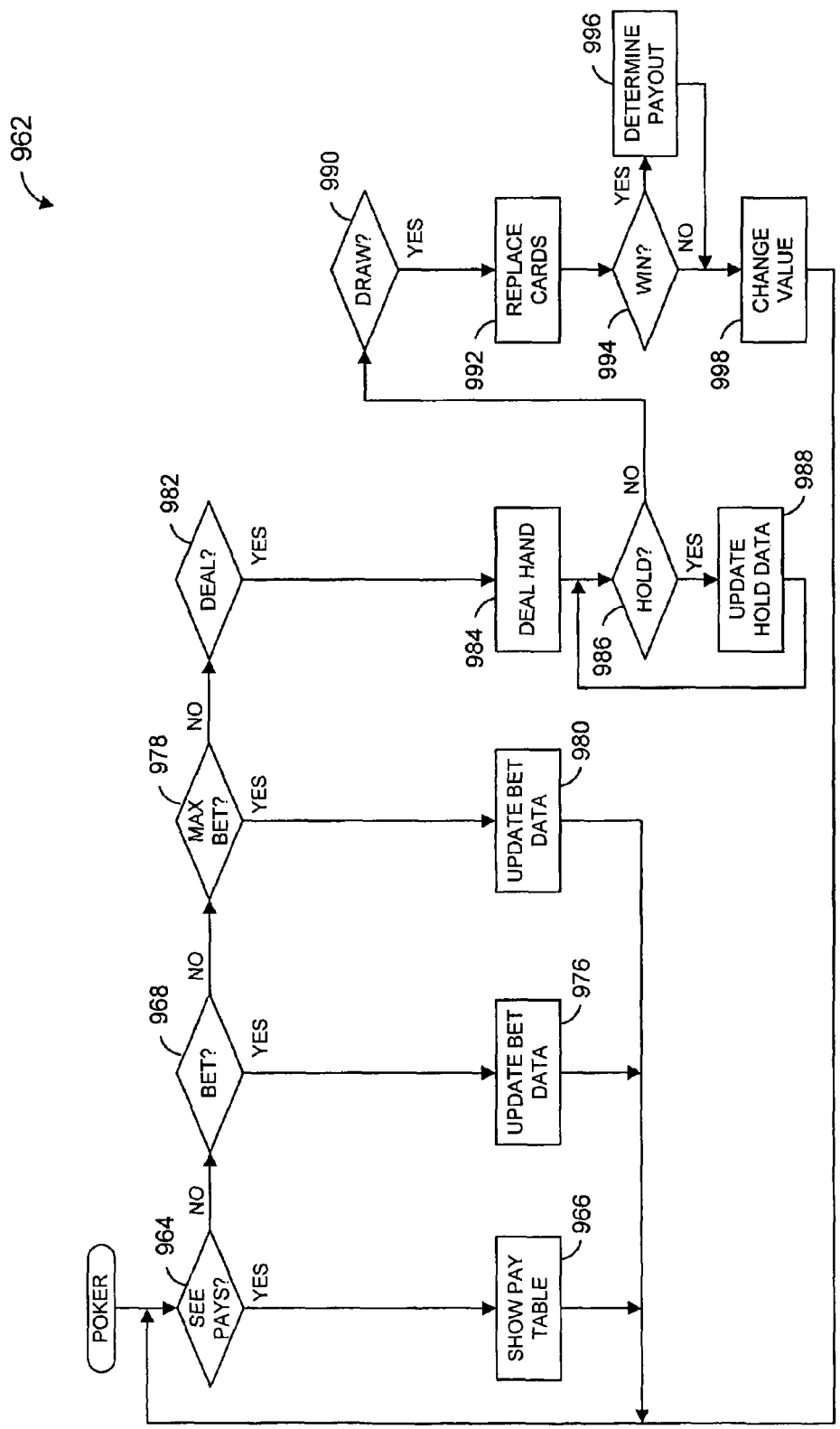
FIG. 24 is a flowchart of an embodiment of a video poker routine that may be performed by one or more of the gaming units.

FIG. 24 is a flowchart of a poker routine 962. Referring to FIG. 24, at block 964, the routine may determine whether the player has requested payout information, such as by activating the "See Pays" button 955, in which case at block 966 the routine may cause one or more pay tables to be displayed on the display unit 170. At block 968, the routine may determine whether the player has made a bet, such as by pressing the "Bet One Credit" button 956, in which case at block 976 bet data corresponding to the bet made by the player may be stored in the memory of the controller 100. At block 978, the routine may determine whether the player has pressed the "Bet Max Credits" button 957, in which case at block 980 bet data corresponding to the maximum allowable bet may be stored in the memory of the controller 200.

At block 982, the routine may determine if the player desires a new hand to be dealt, which may be determined by detecting if the "Deal/Draw" button 958 was activated after a wager was made. In that case, at block 984 a video poker hand may be "dealt" by causing the display unit 170 to generate the playing card images 951. After the hand is dealt, at block 986 the routine may determine if any of the "Hold" buttons 952 have been activated by the player, in which case data regarding which of the playing card images 951 are to be "held" may be stored in the controller 200 at block 988. If the "Deal/Draw" button 958 is activated again as determined at block 990, each of the playing card images 951 that were not "held" may be caused to disappear from the video display 950 and to be replaced by a new, randomly selected, playing card image 951 at block 992.

At block 994, the routine may determine whether the poker hand represented by the playing card images 951 currently displayed is a winner. That determination may be made by comparing data representing the currently displayed poker hand with data representing all possible winning hands, which may be stored in the memory of the controller 200. If there is a winning hand, a payout value corresponding to the winning hand may be determined at block 996. At block 998, the player's cumulative value or number of credits may be updated by subtracting the bet made by the player and adding, if the hand was a winner, the payout value determined at block 996. The cumulative value or number of credits may also be displayed in the display area 959 (FIG. 23).

Although the video poker routine 962 is described above in connection with a single poker hand of five cards, the routine 962 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Blackjack

Figure 25:
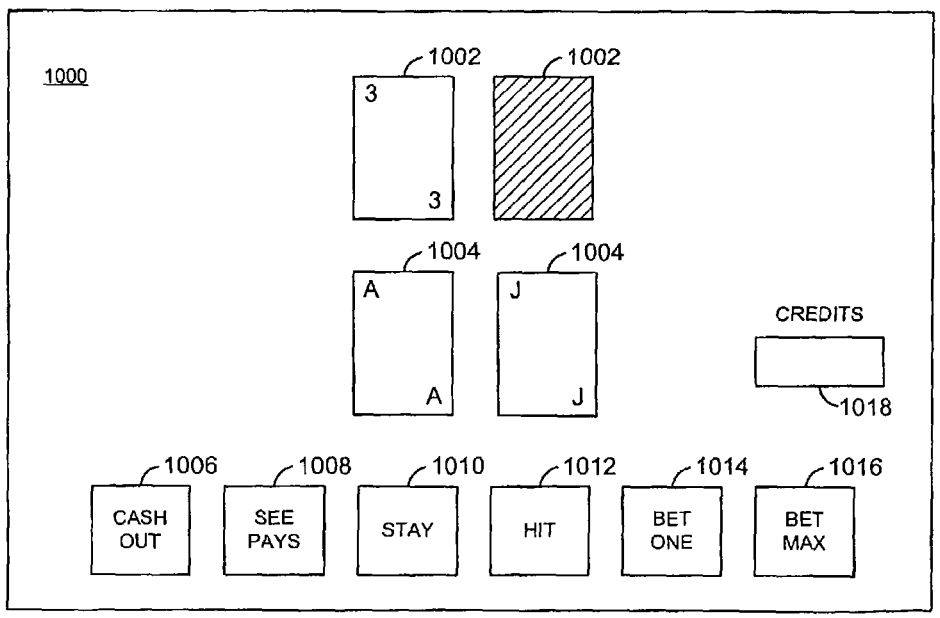
FIG. 25 is an illustration of an embodiment of a visual display that may be displayed during performance of the video blackjack routine of FIG. 26.

FIG. 25 is an exemplary display 1000 that may be shown on the display unit 170 during performance of a blackjack routine. Referring to FIG. 25, the display 1000 may include video images 1002 of a pair of playing cards representing a dealer's hand, with one of the cards shown face up and the other card being shown face down, and video images 1004 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 1006, a "See Pays" button 1008, a "Stay" button 1010, a "Hit" button 1012, a "Bet One Credit" button 1014, and a "Bet Max Credits" button 1016. The display 1000 may also include an area 1018 in which the number of remaining credits or value is displayed. If the display unit 170 is provided with a touch-sensitive screen, the buttons 1006, 1008, 1010, 1012, 1014, and 1016 may form part of the video display 1000. Alternatively, one or more of those buttons may be provided as part of a control panel that is provided separately from the display unit 170.

Figure 26:
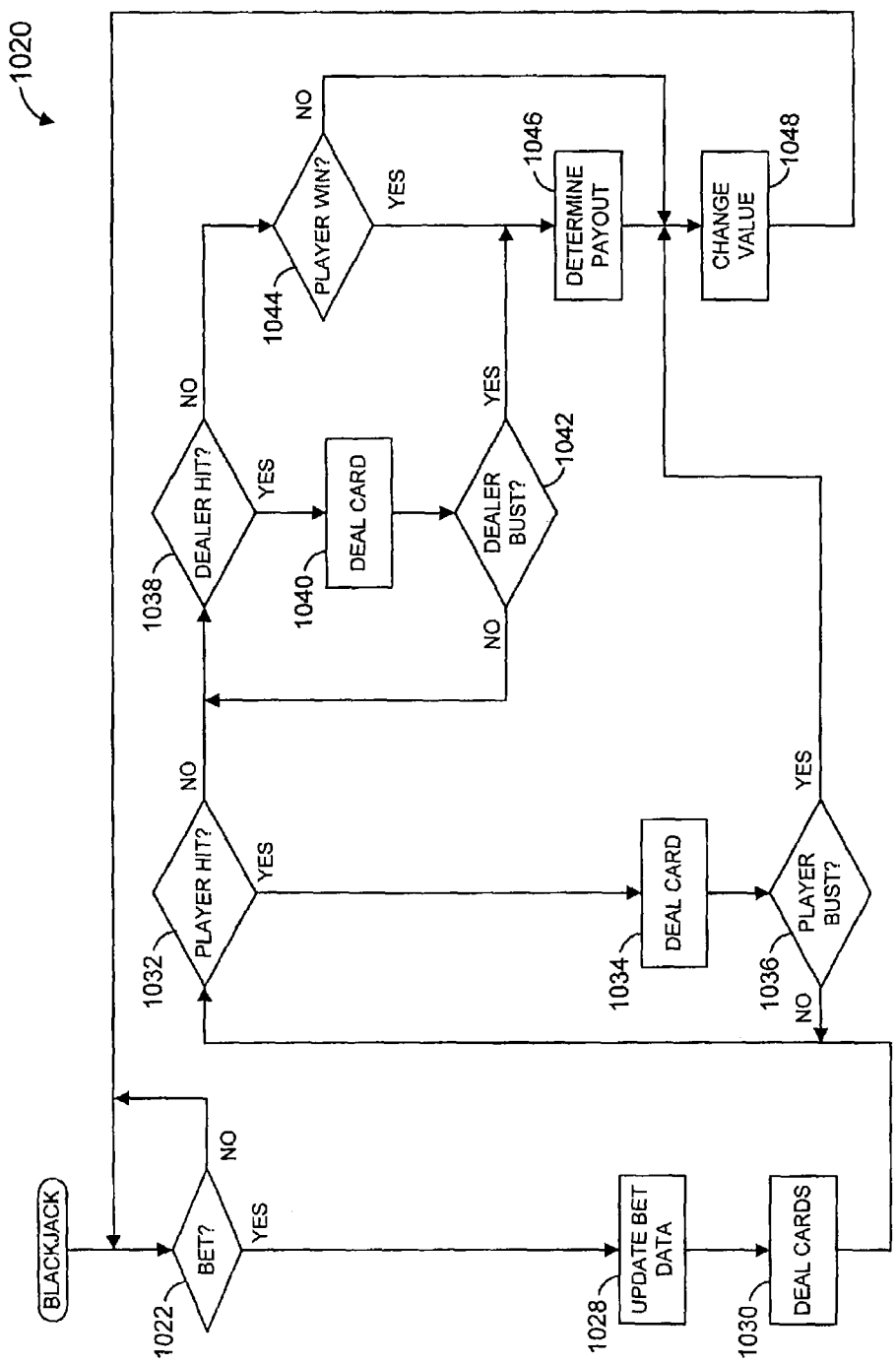
FIG. 26 is a flowchart of an embodiment of a video blackjack routine that may be performed by one or more of the gaming units.

FIG. 26 is a flowchart of a blackjack routine 1020. Referring to FIG. 26, the video blackjack routine 1020 may begin at block 1022 where it may be determined whether a bet has been made by the player. That may be determined, for example, by detecting the activation of either the "Bet One Credit" button 1014 or the "Bet Max Credits" button 1016. At block 1028, bet data corresponding to the bet made at block 1022 may be stored in the memory of the controller 200. At block 1030, a dealer's hand and a player's hand may be "dealt" by making the playing card images 1002, 1004 appear on the display unit 170.

At block 1032, the player may be allowed to be "hit," in which case at block 1034 another card will be dealt to the player's hand by making another playing card image 1004 appear in the display 1000. If the player is hit, block 1036 may determine if the player has "bust," or exceeded 21. If the player has not bust, blocks 1032 and 1034 may be performed again to allow the player to be hit again.

If the player decides not to hit, at block 1038 the routine may determine whether the dealer should be hit. Whether the dealer hits may be determined in accordance with predetermined rules, such as the dealer always hit if the dealer's hand totals 15 or less. If the dealer hits, at block 1040 the dealer's hand may be dealt another card by making another playing card image 1002 appear in the display 1000. At block 1042 the routine may determine whether the dealer has bust. If the dealer has not bust, blocks 1038, 1040 may be performed again to allow the dealer to be hit again.

If the dealer does not hit, at block 1042 the outcome of the blackjack game and a corresponding payout may be determined based on, for example, whether the player or the dealer has the higher hand that does not exceed 21. If the player has a winning hand, a payout value corresponding to the winning hand may be determined at block 1046. At block 1048, the player's cumulative value or number of credits may be updated by subtracting the bet made by the player and adding, if the player won, the payout value determined at block 1046. The cumulative value or number of credits may also be displayed in the display area 1018 (FIG. 25

Slots

Figure 27:
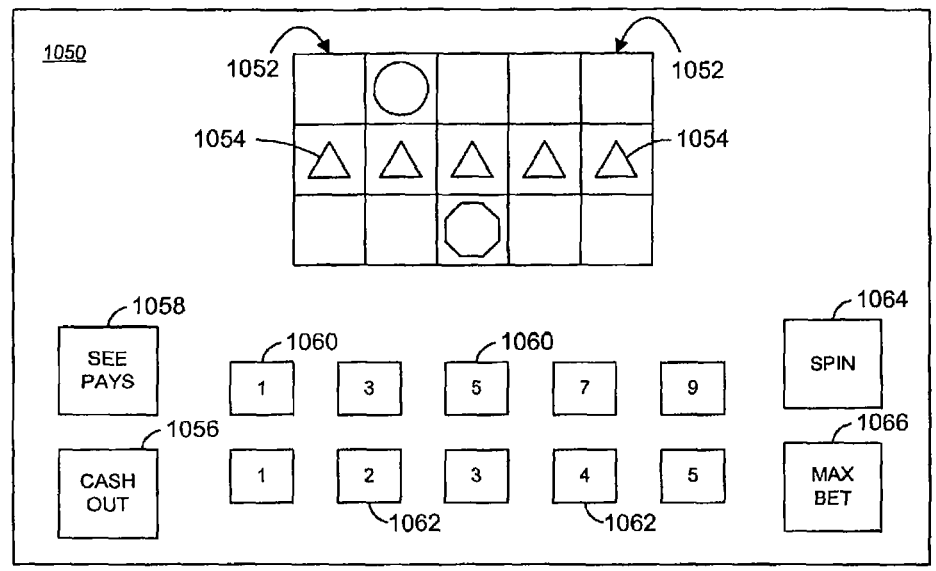
FIG. 27 is an illustration of an embodiment of a visual display that may be displayed during performance of the slots routine of FIG. 28.

FIG. 27 is an exemplary display 1050 that may be shown on the display unit 170 during performance of a slots routine. Referring to FIG. 27, the display 1050 may include video images 1052 of a plurality of slot machine reels, each of the reels having a plurality of reel symbols 1054 associated therewith. Although the display 1050 shows five reel images 1052, each of which may have three reel symbols 1054 that are visible at a time, other reel configurations could be utilized.

To allow the player to control the play of the slots game, a plurality of player-selectable buttons may be displayed. The buttons may include a "Cash Out" button 1056, a "See Pays" button 1058, a plurality of payline-selection buttons 1060 each of which allows the player to select a different number of paylines prior to "spinning" the reels, a plurality of bet-selection buttons 1062 each of which allows a player to specify a wager amount for each payline selected, a "Spin" button 1064, and a "Max Bet" button 1066 to allow a player to make the maximum wager allowable.

Figure 28:
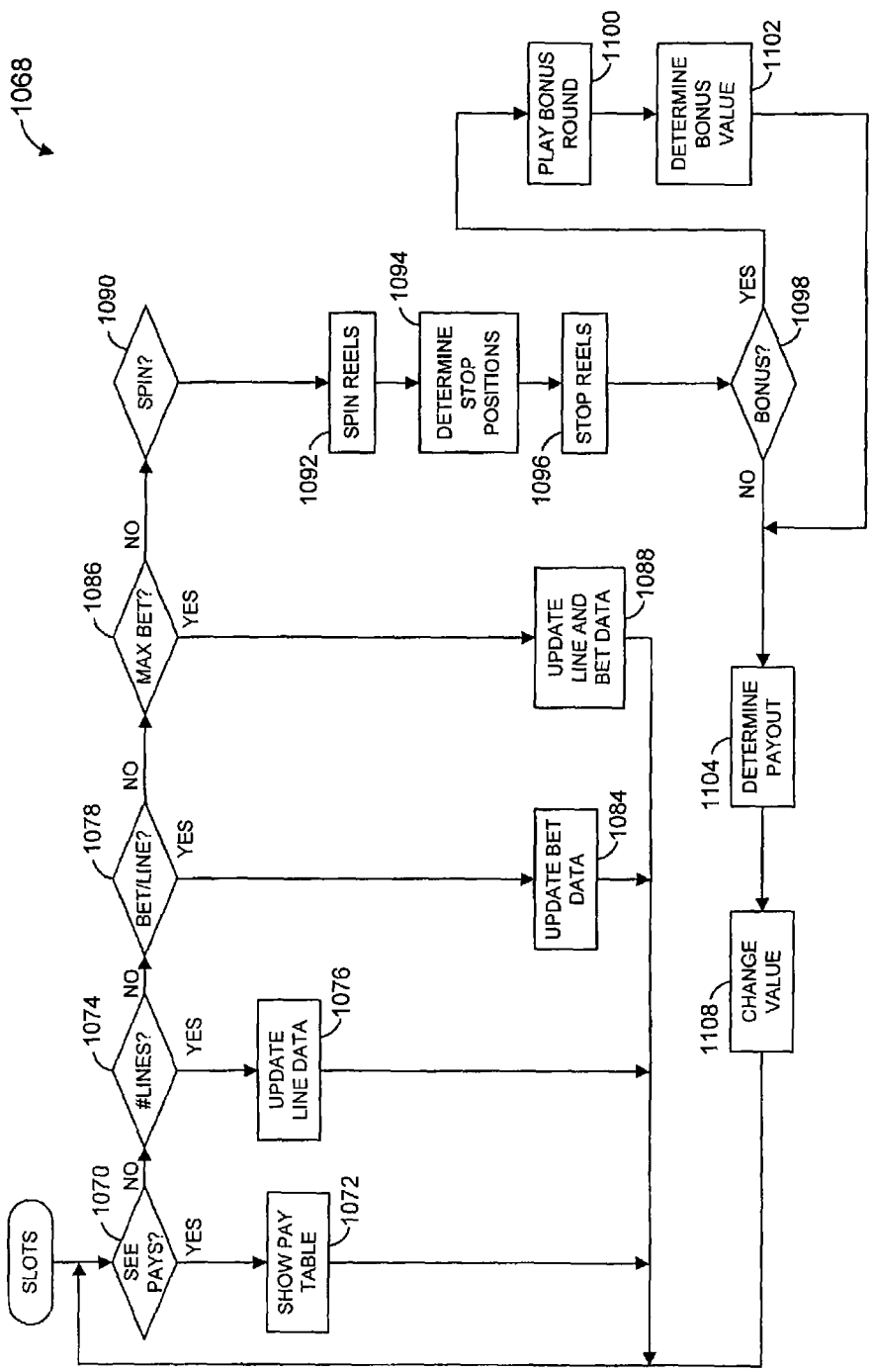
FIG. 28 is a flowchart of an embodiment of a slots routine that may be performed by one or more of the gaming units.

FIG. 28 is a flowchart of a slots routine 1068. Referring to FIG. 28, at block 1070, the routine may determine whether the player has requested payout information, such as by activating the "See Pays" button 1058, in which case at block 1072 the routine may cause one or more pay tables to be displayed on the display unit 170. At block 1074, the routine may determine whether the player has pressed one of the payline-selection buttons 1060, in which case at block 1076 data corresponding to the number of paylines selected by the player may be stored in the memory of the controller 200. At block 1078, the routine may determine whether the player has pressed one of the bet-selection buttons 1062, in which case at block 1084 data corresponding to the amount bet per payline may be stored in the memory of the controller 200. At block 1086, the routine may determine whether the player has pressed the "Max Bet" button 1066, in which case at block 1088 bet data (which may include both payline data and bet-per-payline data) corresponding to the maximum allowable bet may be stored in the memory of the controller 200.

If the "Spin" button 1064 has been activated by the player as determined at block 1090, at block 1092 the routine may cause the slot machine reel images 1052 to begin "spinning" so as to simulate the appearance of a plurality of spinning mechanical slot machine reels. At block 1094, the routine may determine the positions at which the slot machine reel images will stop, or the particular symbol images 1054 that will be displayed when the reel images 1052 stop spinning. At block 1096, the routine may stop the reel images 1052 from spinning by displaying stationary reel images 1052 and images of three symbols 1054 for each stopped reel image 1052. The virtual reels may be stopped from left to right, from the perspective of the player, or in any other manner or sequence.

The routine may provide for the possibility of a bonus game or round if certain conditions are met, such as the display in the stopped reel images 1052 of a particular symbol 1054. If there is such a bonus condition as determined at block 1098, the routine may proceed to block 1100 where a bonus round may be played. The bonus round may be a different game than slots, and many other types of bonus games could be provided. If the player wins the bonus round, or receives additional credits or points in the bonus round, a bonus value may be determined at block 1102. A payout value corresponding to outcome of the slots game and/or the bonus round may be determined at block 1104. At block 1108, the player's cumulative value or number of credits may be updated by subtracting the bet made by the player and adding, if the slot game and/or bonus round were a winner, the payout value determined at block 1104.

Although the above routine has been described as a virtual slot machine routine in which slot machine reels are represented as images on the display unit 170, actual slot machine reels that are capable of being spun may be utilized instead.

Keno

Figure 29:
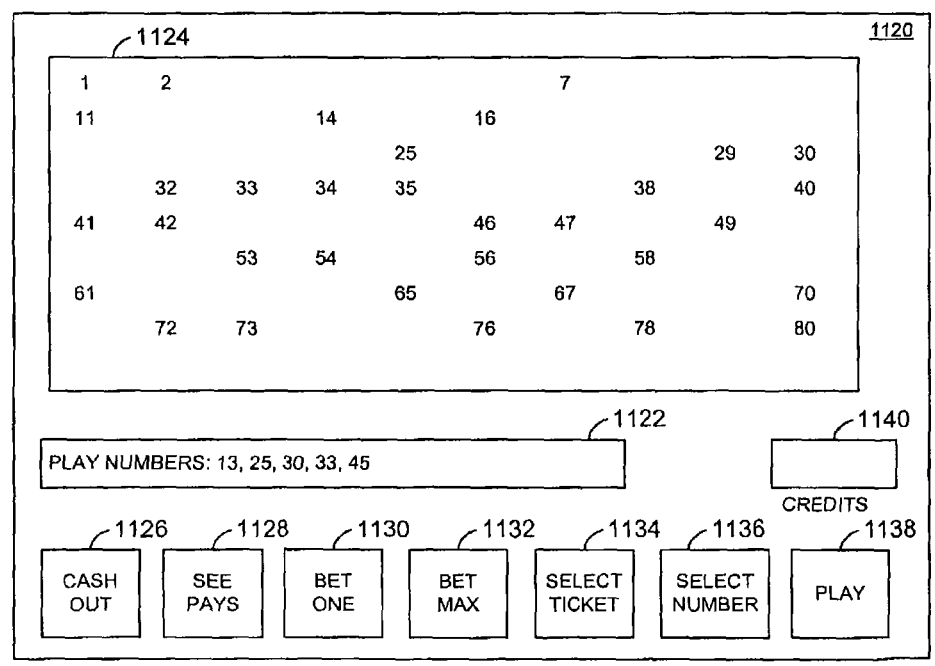
FIG. 29 is an illustration of an embodiment of a visual display that may be displayed during performance of the video keno routine of FIG. 30.

FIG. 29 is an exemplary display 1120 that may be shown on the display unit 170 during performance of a keno routine. Referring to FIG. 29, the display 1120 may include a video image 1122 of a plurality of numbers that were selected by the player prior to the start of a keno game and a video image 1124 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 1126, a "See Pays" button 1128, a "Bet One Credit" button 1130, a "Bet Max Credits" button 1132, a "Select Ticket" button 1134, a "Select Number" button 1136, and a "Play" button 1138. The display 1120 may also include an area 1140 in which the number of remaining credits or value is displayed. If the display unit 170 is provided with a touch-sensitive screen, the buttons may form part of the video display 1120. Alternatively, one or more of those buttons may be provided as part of a control panel that is provided separately from the display unit 170.

Figure 30:
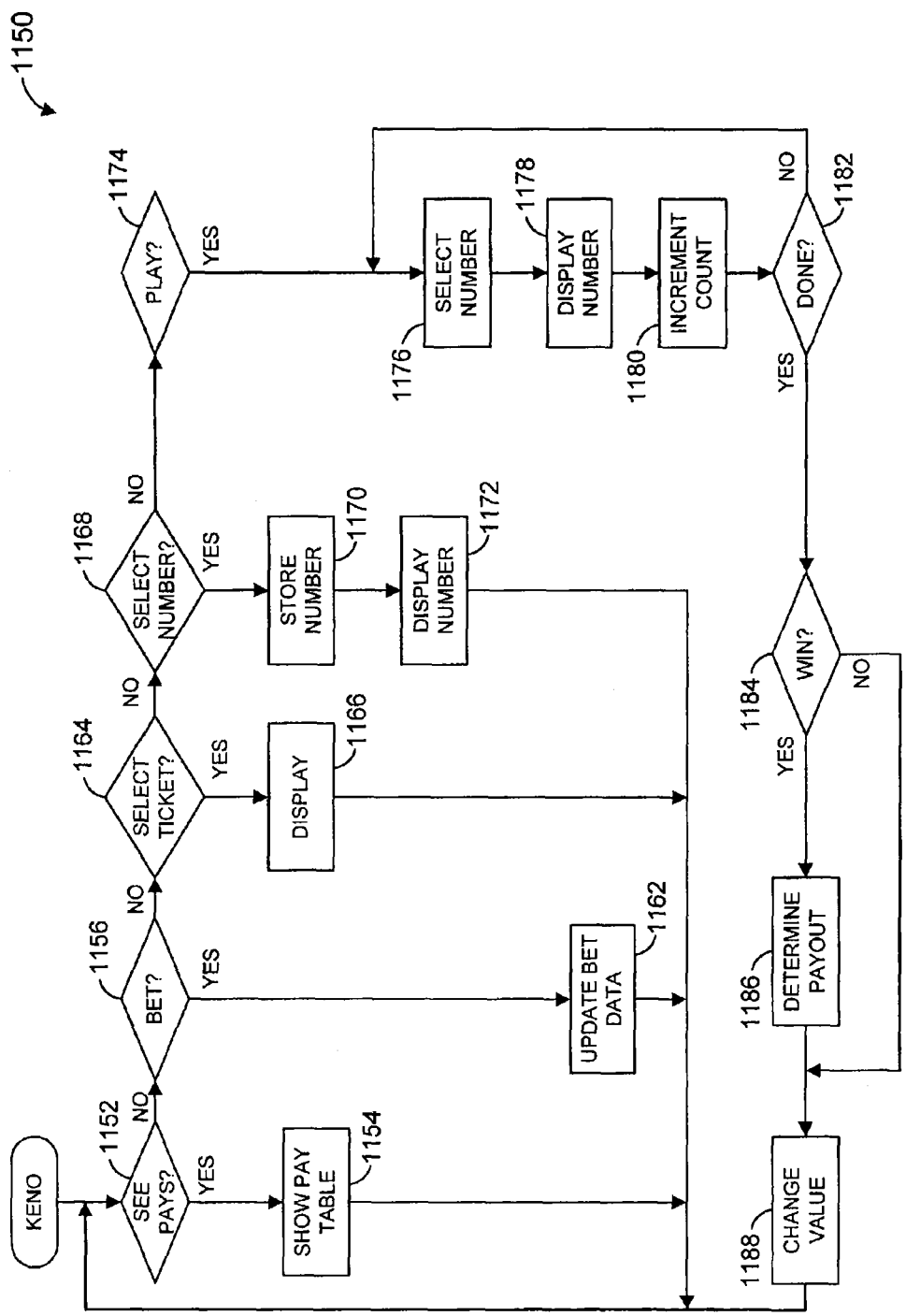
FIG. 30 is a flowchart of an embodiment of a video keno routine that may be performed by one or more of the gaming units.

FIG. 30 is a flowchart of a keno routine 1150. The keno routine 1150 may be utilized in connection with a single gaming unit 20 where a single player is playing a keno game, or the keno routine 1150 may be utilized in connection with multiple gaming units 20 where multiple players are playing a single keno game. In the latter case, one or more of the acts described below may be performed either by the controller 200 in each gaming unit or the network computer 22, the tournament game server 46, or some other computer, to which multiple gaming units 20 are operatively connected.

Referring to FIG. 30, at block 1152, the routine may determine whether the player has requested payout information, such as by activating the "See Pays" button 1128, in which case at block 1154 the routine may cause one or more pay tables to be displayed on the display unit 170. At block 1156, the routine may determine whether the player has made a bet, such as by having pressed the "Bet One Credit" button 1130 or the "Bet Max Credits" button 1132, in which case at block 1162 bet data corresponding to the bet made by the player may be stored in the memory of the controller 200. After the player has made a wager, at block 1164 the player may select a keno ticket, and at block 1166 the ticket may be displayed on the display 1120. At block 1168, the player may select one or more game numbers, which may be within a range set by the casino. After being selected, the player's game numbers may be stored in the memory of the controller 200 at block 1170 and may be included in the image 1122 on the display 1120 at block 1172. After a certain amount of time, the keno game may be closed to additional players (where a number of players are playing a single keno game using multiple gambling units 20).

If play of the keno game is to begin as determined at block 1174, at block 1176 a game number within a range set by the casino may be randomly selected either by the controller 200 or a central computer operatively connected to the controller, such as the network computer 22, the tournament game server 46, or some other computer. At block 1178, the randomly selected game number may be displayed on the display unit 170 and the display units 170 of other gaming units 20 (if any) which are involved in the same keno game. At block 1180, the controller 200 (or the central computer noted above) may increment a count which keeps track of how many game numbers have been selected at block 1176.

At block 1182, the controller 200 (or the network computer 22, the tournament game server 46, or some other computer) may determine whether a maximum number of game numbers within the range have been randomly selected. If not, another game number may be randomly selected at block 1176. If the maximum number of game numbers has been selected, at block 1184 the controller 200 (or a central computer) may determine whether there are a sufficient number of matches between the game numbers selected by the player and the game numbers selected at block 1176 to cause the player to win. The number of matches may depend on how many numbers the player selected and the particular keno rules being used.

If there are a sufficient number of matches, a payout may be determined at block 1186 to compensate the player for winning the game. The payout may depend on the number of matches between the game numbers selected by the player and the game numbers randomly selected at block 1176. At block 1188, the player's cumulative value or number of credits may be updated by subtracting the bet made by the player and adding, if the keno game was won, the payout value determined at block 1186. The cumulative value or number of credits may also be displayed in the display area 1140 (FIG. 29).

Bingo

Figure 31:
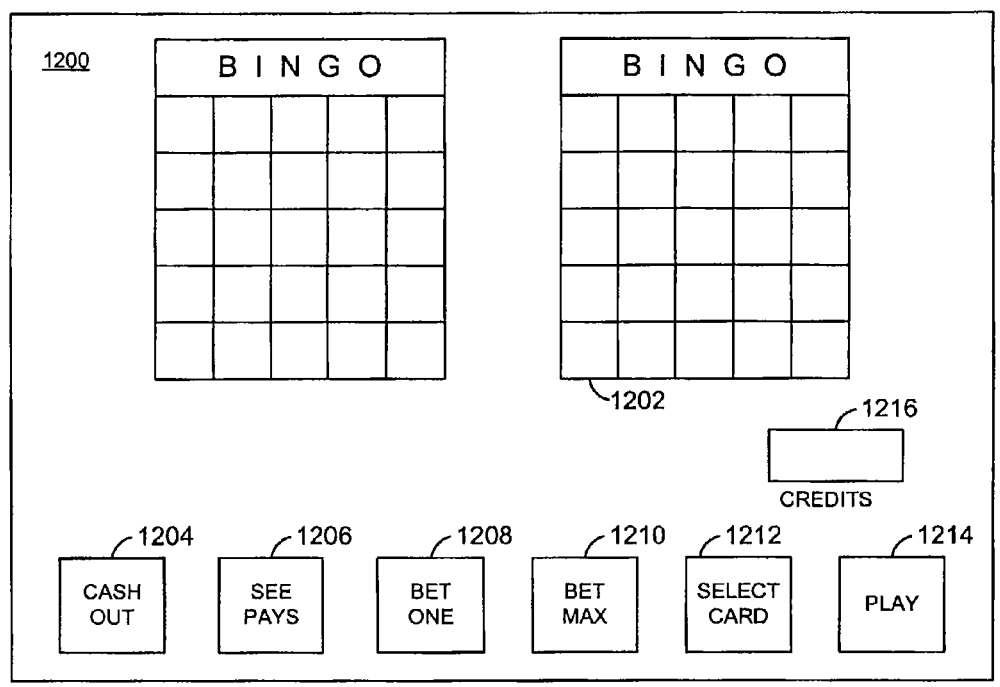
FIG. 31 is an illustration of an embodiment of a visual display that may be displayed during performance of the video bingo routine of FIG. 32.

FIG. 31 is an exemplary display 1200 that may be shown on the display unit 170 during performance of a bingo routine 1220. Referring to FIG. 31, the display 1200 may include one or more video images 1202 of a bingo card and images of the bingo numbers selected during the game. The bingo card images 1202 may have a grid pattern.

To allow the player to control the play of the bingo game, a plurality of player-selectable buttons may be displayed. The buttons may include a "Cash Out" button 1204, a "See Pays" button 1206, a "Bet One Credit" button 1208, a "Bet Max Credits" button 1210, a "Select Card" button 1212, and a "Play" button 1214. The display 1200 may also include an area 1216 in which the number of remaining credits or value is displayed. If the display unit 170 is provided with a touch-sensitive screen, the buttons may form part of the video display 1200. Alternatively, one or more of those buttons may be provided as part of a control panel that is provided separately from the display unit 170.

Figure 32:
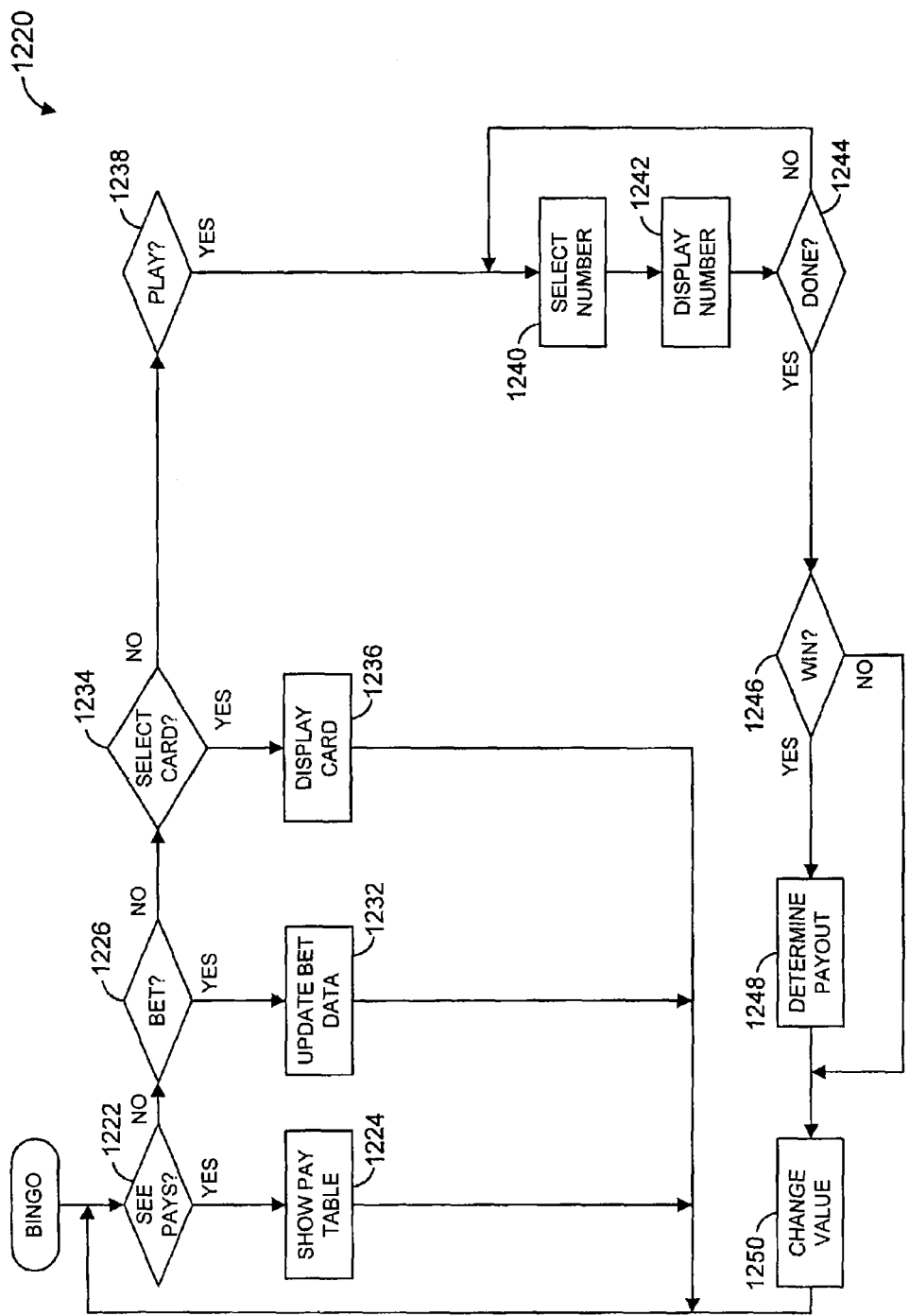
FIG. 32 is a flowchart of an embodiment of a video bingo routine that may be performed by one or more of the gaming units.

FIG. 32 is a flowchart of a bingo routine 1220. The bingo routine 1220 may be utilized in connection with a single gaming unit 20 where a single player is playing a bingo game, or the bingo routine 1220 may be utilized in connection with multiple gaming units 20 where multiple players are playing a single bingo game. In the latter case, one or more of the acts described below may be performed either by the controller 200 in each gaming unit 20 or by the network computer 22, the tournament game server 46, or some other computer, to which multiple gaming units 20 are operatively connected.

Referring to FIG. 32, at block 1222, the routine may determine whether the player has requested payout information, such as by activating the "See Pays" button 1206, in which case at block 1224 the routine may cause one or more pay tables to be displayed on the display unit 170. At block 1226, the routine may determine whether the player has made a bet, such as by having pressed the "Bet One Credit"

button 1208 or the "Bet Max Credits" button 1210, in which case at block 1232 bet data corresponding to the bet made by the player may be stored in the memory of the controller 200.

After the player has made a wager, at block 1234 the player may select a bingo card, which may be generated randomly. The player may select more than one bingo card, and there may be a maximum number of bingo cards that a player may select. After play is to commence as determined at block 1238, at block 1240 a bingo number may be randomly generated by the controller 200 or a central computer such as the network computer 22, the tournament game server 46, or some other computer. At block 1242, the bingo number may be displayed on the display unit 170 and the display units 170 of any other gaming units 20 involved in the bingo game.

At block 1244, the controller 200 (or a central computer) may determine whether any player has won the bingo game. If no player has won, another bingo number may be randomly selected at block 1240. If any player has bingo as determined at block 1244, the routine may determine at block 1246 whether the player playing that gaming unit 20 was the winner. If so, at block 1248 a payout for the player may be determined. The payout may depend on the number of random numbers that were drawn before there was a winner, the total number of winners (if there was more than one player), and the amount of money that was wagered on the game. At block 1250, the player's cumulative value or number of credits may be updated by subtracting the bet made by the player and adding, if the bingo game was won, the payout value determined at block 1248. The cumulative value or number of credits may also be displayed in the display area 1216 (FIG. 31).

Combination

FIG. 33 is a flow diagram illustrating another embodiment of a method for facilitating play in a tournament. Referring to FIG. 33A, at block 1204 of the method 1200, a player may select various options for playing in the tournament. For example, the player may select to play singly or as part of a group. At block 1208, it may be determined whether the player has chosen a single player mode. If no, then at block 1212, the player may select a tournament group from a list of groups, and may enter the number of player(s) joining that particular group. The tournament server may send a group identification number associated with the group to the player.

At block 1216, the server may prompt the player to indicate whether the player had a reservation for a tournament. If the player has a reservation, the player may confirm the reservation at block 1220 (e.g., by entering a reservation number, login name, etc.).

If the player wishes to remain anonymous at block 1224, the player may be assigned an arbitrary identifier at block 1228. If the player does not wish to remain anonymous, at block 1232, the player may insert his or her playing tracking card, enter a login identifier and/or password, etc.

At block 1236, the player may select a method of playing in the tournament. For example, the player may select to begin playing immediately or to play sometime in the future. Additionally, the player may choose to play, for example, according to a "time slot" method, a "flex time" method, a "relay" method, etc.

Figure 33A:
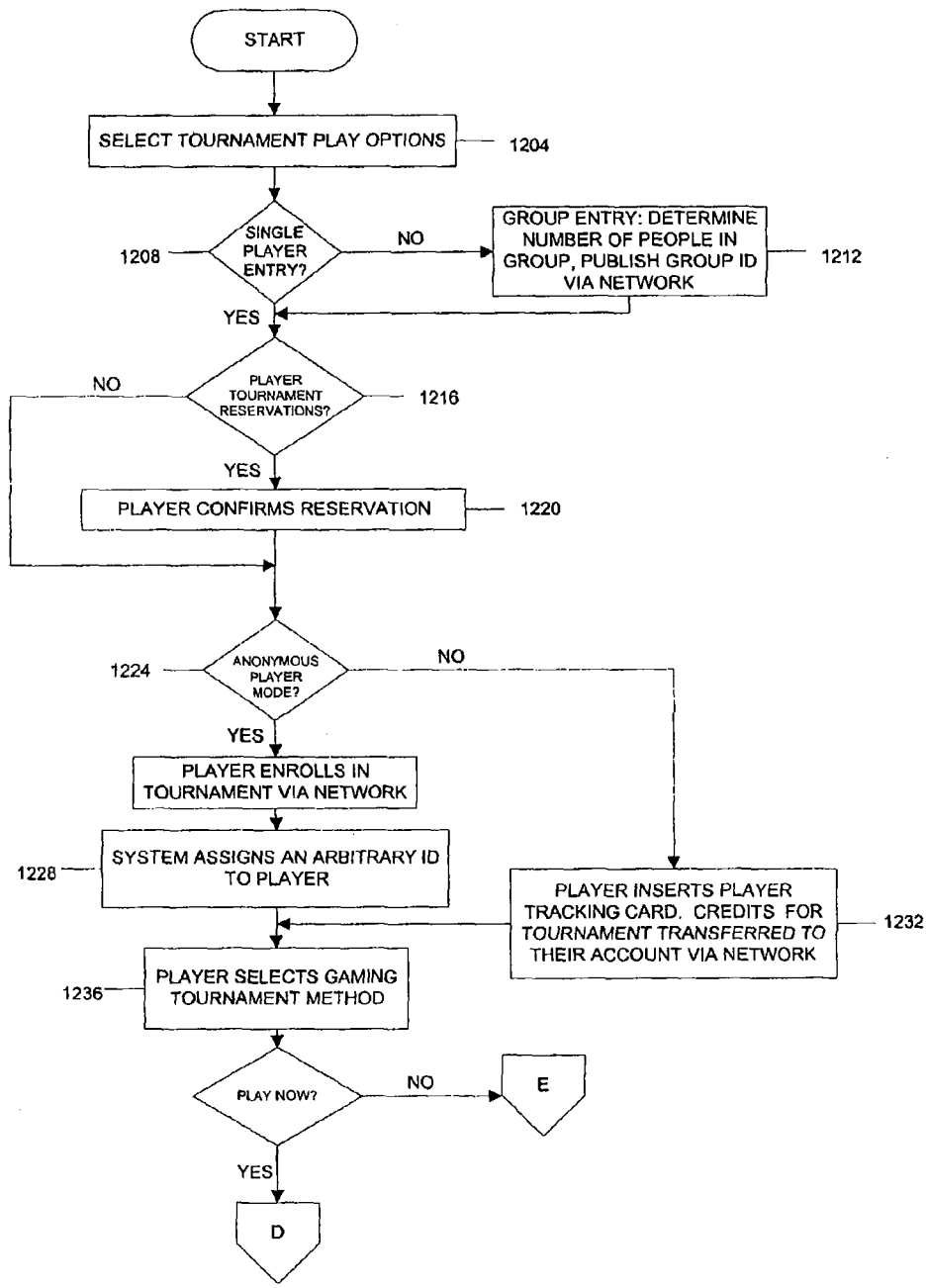
FIGS. 33A, 33B, 33C, 33D, and 33E are a flowchart of an embodiment of another tournament routine.
Figure 33B:
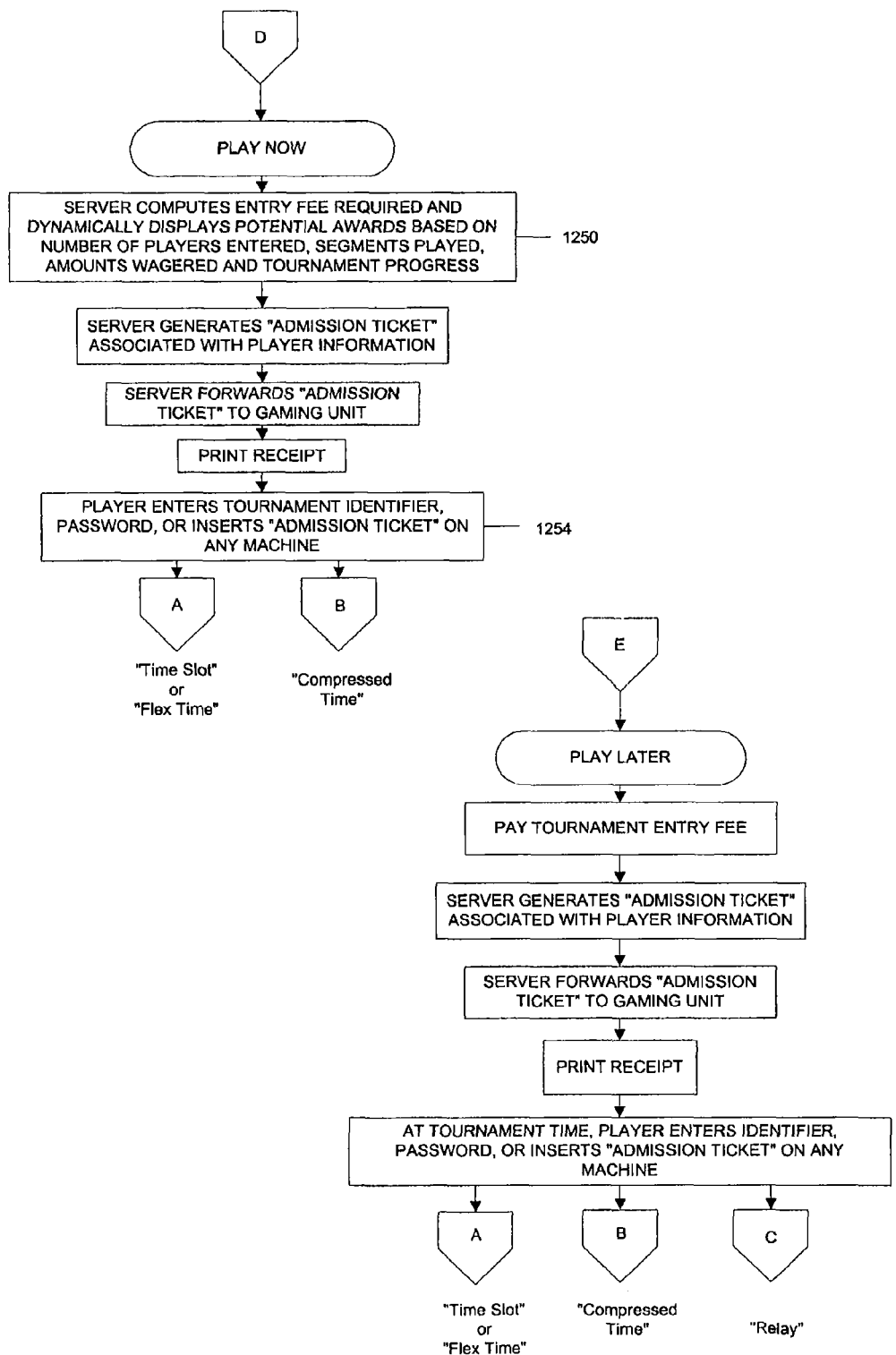
Figure 33C:
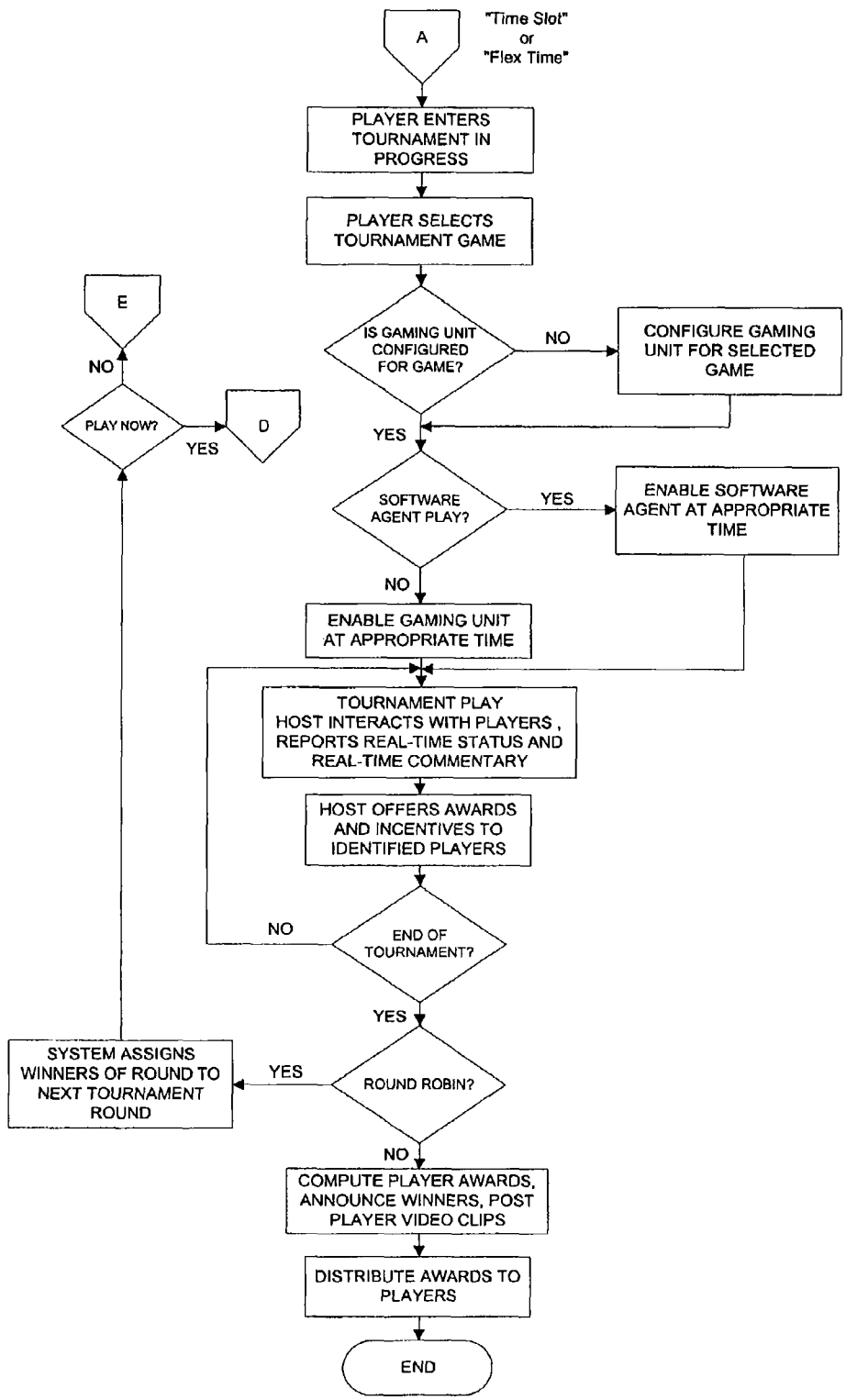
Figure 33D:
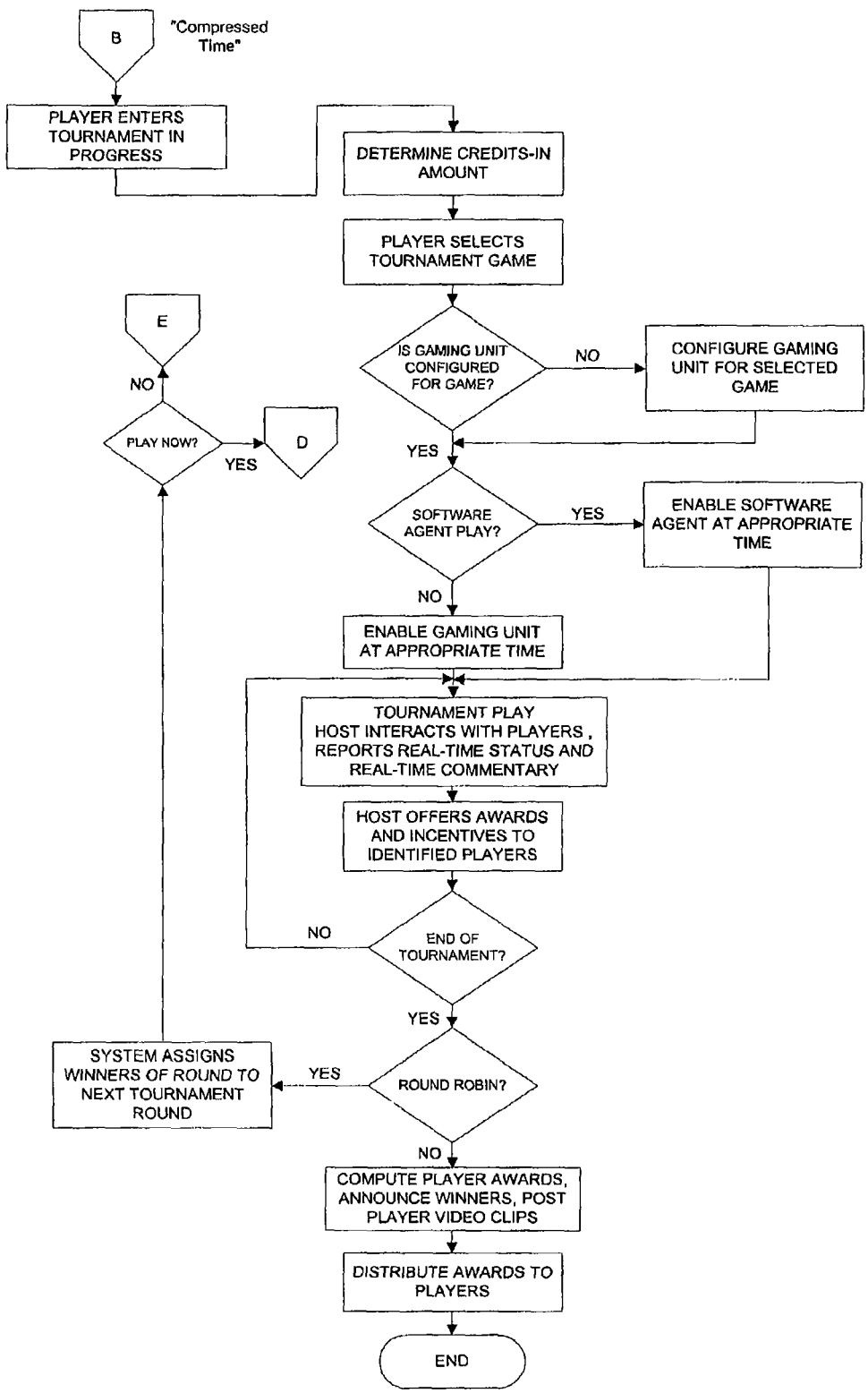
Figure 33E:
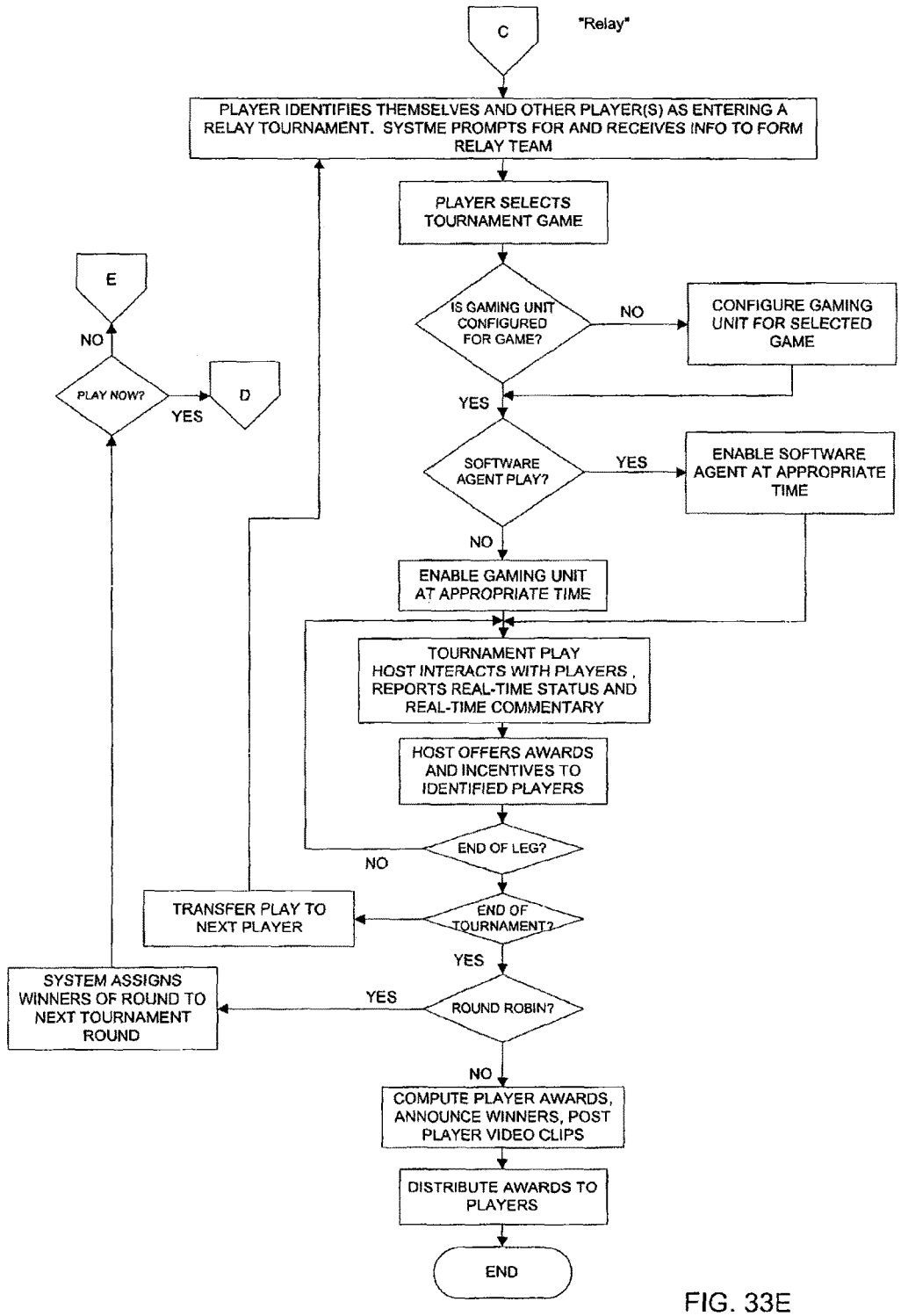

Referring now to FIG. 33B, if the player chooses to play immediately, the tournament server 44 may compute a required entry fee and cause the gaming unit 20 to display to the player potential awards in the tournament at block 1250. After receiving payment from the player, the server may then generate an "admission ticket" and send it to the gaming unit or player where the player may print out the "admission ticket" or a receipt. The "admission ticket" may include an identifier that may be used by the player to enter the tournament. If the player decides to play later, the player may pay an entry fee, and similarly receive an admission ticket.

At block 1254, the player may enter the identifier, submit the admission ticket itself, enter a password, etc., in order to enter the tournament. The flow of FIG. 33 may then proceed to an appropriate block based on the method(s) selected by the player at block 1236 of FIG. 33A.

In one embodiment, audio and/or visual communication from the player at the gaming unit 20, to the tournament server 44 and/or to a gaming host is permitted. Similarly, audio and/or visual communication from the gaming host to the player at gaming unit 20 may be permitted. If a player has chosen to remain anonymous during the gaming tournament, however, he may abstain from sending audio and/or visual communication to the tournament host. In this way, bidirectional audio and/or visual and/or data communication between the tournament host and the players provides tournament players with an interactive and therefore, an enhanced gaming experience. Further details of such unidirectional or bidirectional communication between a tournament host and a player is described in U.S. patent application Ser. No. 10/112,967, filed Mar. 29, 2002, and entitled "An Apparatus and Method for a Gaming Tournament Network." This application is hereby incorporated by reference herein in its entirety for all purposes.

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a read-only memory (ROM), etc. Further, although the examples described above were described with reference to various flow diagrams, one of ordinary skill in the art will appreciate that many other methods may alternatively be used. For example, the order of execution of the blocks may be changed, and/or some or all of the blocks may be changed, eliminated, or combined.

The invention is claimed as follows:

1. A method of operating a tournament gaming system, the method comprising:
   receiving, by a network interface, a first plurality of player identifiers that each identify a different one of a first plurality of different tournament players;
   responsive to receiving the first plurality of player identifiers, initiating a tournament period of a tournament, wherein the tournament period is not associated with a prescheduled start time;
   enrolling, by at least one processor, each of the first plurality of tournament players in the tournament;
   during a first subperiod of the tournament period:
   enabling each of the first plurality of tournament players to engage in tournament game play at one of a first plurality of electronic gaming machines, wherein each of the electronic gaming machines includes a payment acceptor, and wherein each of the electronic gaming machines, responsive to receipt, via the payment acceptor, of a physical item associated with a monetary value, is configured to establish a credit balance based on the monetary value associated with the physical item; and receiving, by the network interface and from the first plurality of electronic gaming machines, a tournament score for each of the first plurality of tournament players, each tournament player's tournament score based on that tournament player's tournament game play;

after the first subperiod, receiving, by the network interface, a second plurality of player identifiers that each identify a different one of a second plurality of different tournament players;

enrolling, by the at least one processor, each of the second plurality of tournament players in the tournament;

during a second subperiod of the tournament period that follows the first subperiod:

enabling each of the second plurality of tournament players to engage in tournament game play at one of a second plurality of electronic gaming machines; and receiving, by the network interface and from the second plurality of electronic gaming machines, a tournament score for each of the second plurality of tournament players, each tournament player's tournament score based on that tournament player's tournament game play;

following expiration of the tournament period, determining, by the at least one processor, a winning tournament player based on the tournament scores of all of the tournament players who participated in the tournament; and causing, by the at least one processor, a tournament award to be provided to the winning tournament player.

2. The method of claim 1, which includes causing a second tournament award to be provided to another tournament player, the second tournament award including a voucher usable for game play.

3. The method of claim 1, wherein the winning tournament player has a highest tournament score from among the tournament scores of all of the tournament players who participated in the tournament and the tournament award is a monetary award.

4. The method of claim 1, wherein each player identifier is read from a player card.

5. The method of claim 4, which includes receiving, by the network interface, the first plurality of player identifiers from the first plurality of electronic gaming machines and the second plurality of player identifiers from the second plurality of electronic gaming machines.

6. The method of claim 1, which includes enrolling, by the at least one processor, each of the first and second pluralities of tournament players in the tournament in exchange for a fee.

7. The method of claim 1, which includes enrolling, by the at least one processor, a third player in the tournament in exchange for a fee and enabling the third player to engage in tournament game play at an electronic gaming machine for a designated period of time during the tournament period.

8. The method of claim 7, wherein the designated period of time increases as the fee increases.

9. The method of claim 7, which includes enabling the third player to engage in tournament game play at an electronic gaming machine for the designated period of time during the tournament period in one or a plurality of tournament gaming sessions.

10. The method of claim 1, which includes transmitting, by the network interface, a result of the tournament to a mobile device of at least one of the tournament players.

11. A tournament gaming system comprising:
at least one processor;
a network interface; and
at least one memory device storing a plurality of instructions which, when executed by the at least one processor, cause the at least one processor to operate with the network interface to:

responsive to receiving a first plurality of player identifiers that each identify a different one of a first plurality of different tournament players, enroll each of the first plurality of tournament players in the tournament;

responsive to receiving the first plurality of player identifiers, initiate a tournament period of a tournament, wherein the tournament period is not associated with a prescheduled start time;

during a first subperiod of the tournament period:

enable each of the first plurality of tournament players to engage in tournament game play at one of a first plurality of electronic gaming machines, wherein each of the electronic gaming machines includes a payment acceptor, and wherein each of the electronic gaming machines, responsive to receipt, via the payment acceptor, of a physical item associated with a monetary value, is configured to establish a credit balance based on the monetary value associated with the physical item; and receive a tournament score for each of the first plurality of tournament players, each tournament player's tournament score based on that tournament player's tournament game play;

after the first subperiod, responsive to receiving a second plurality of player identifiers that each identify a different one of a second plurality of different tournament players, enroll each of the second plurality of tournament players in the tournament;

during a second subperiod of the tournament period that follows the first subperiod:

enable each of the second plurality of tournament players to engage in tournament game play at one of a second plurality of electronic gaming machines; and receive a tournament score for each of the second plurality of tournament players, each tournament player's tournament score based on that tournament player's tournament game play;

following expiration of the tournament period, determine a winning tournament player based on the tournament scores of all of the tournament players who participated in the tournament; and cause a tournament award to be provided to the winning tournament player.

12. The tournament gaming system of claim 11, wherein the plurality of instructions, when executed by the at least one processor, cause the at least one processor to cause a second tournament award to be provided to another tournament player, the second tournament award including a voucher usable for game play.

13. The tournament gaming system of claim 11, wherein the winning tournament player has a highest tournament score from among the tournament scores of all of the tournament players who participated in the tournament and the tournament award is a monetary award.

14. The tournament gaming system of claim 11, wherein each player identifier is read from a player card.

15. The tournament gaming system of claim 14, wherein the plurality of instructions, when executed by the at least one processor, cause the at least one processor to receive the first plurality of player identifiers from the first plurality of electronic gaming machines and the second plurality of player identifiers from the second plurality of electronic gaming machines.

16. The tournament gaming system of claim 11, wherein the plurality of instructions, when executed by the at least one processor, cause the at least one processor to enroll each of the first and second pluralities of tournament players in the tournament in exchange for a fee.

17. The tournament gaming system of claim 11, wherein the plurality of instructions, when executed by the at least one processor, cause the at least one processor to enroll a third player in the tournament in exchange for a fee and enable the third player to engage in tournament game play at an electronic gaming machine for a designated period of time during the tournament period.

18. The tournament gaming system of claim 17, wherein the designated period of time increases as the fee increases.

19. The tournament gaming system of claim 17, wherein the plurality of instructions, when executed by the at least one processor, cause the at least one processor to enable the third player to engage in tournament game play at an electronic gaming machine for the designated period of time during the tournament period in one or a plurality of tournament gaming sessions.

20. The tournament gaming system of claim 11, wherein the plurality of instructions, when executed by the at least one processor, cause the at least one processor to operate with the network interface to transmit a result of the tournament to a mobile device of at least one of the tournament players.

* * * * *